(12) United States Patent
Vernacchia et al.

(10) Patent No.: US 12,488,904 B2
(45) Date of Patent: Dec. 2, 2025

(54) TECHNIQUES FOR REMOVING A VACUUM VESSEL FROM A TOKAMAK AND RELATED SYSTEMS AND METHODS

(71) Applicant: Commonwealth Fusion Systems LLC, Devens, MA (US)

(72) Inventors: Matthew Vernacchia, Cambridge, MA (US); Theodore Wyeth, Brookline, MA (US)

(73) Assignee: Commonwealth Fusion Systems LLC, Devens, MA (US)

( * ) Notice: Subject to any disclaimer, the term of this patent is extended or adjusted under 35 U.S.C. 154(b) by 351 days.

(21) Appl. No.: 18/318,435

(22) Filed: May 16, 2023

(65) Prior Publication Data
US 2024/0387064 A1  Nov. 21, 2024

(51) Int. Cl.
*B66F 9/14* (2006.01)
*G21B 1/05* (2006.01)
*G21B 1/25* (2006.01)
*G21B 1/17* (2006.01)

(52) U.S. Cl.
CPC .............. *G21B 1/25* (2013.01); *G21B 1/057* (2013.01); *G21B 1/17* (2013.01)

(58) Field of Classification Search
CPC .................................. B66F 7/20; B66F 9/145
USPC ........................................................ 414/572
See application file for complete search history.

(56) References Cited

U.S. PATENT DOCUMENTS

| | | | | |
|---|---|---|---|---|
| 4,755,099 A * | 7/1988 | Belveal | ...................... | B66F 9/12 108/142 |
| 5,281,017 A * | 1/1994 | Geiss | ...................... | A61G 5/104 414/921 |
| 5,782,602 A * | 7/1998 | Mehta | ...................... | B65G 1/07 187/253 |
| 6,537,017 B2 * | 3/2003 | Stone | ...................... | B65G 1/07 414/673 |
| 7,383,923 B2 * | 6/2008 | Patten | ...................... | B66F 7/065 182/69.5 |
| 7,604,452 B2 * | 10/2009 | Stone | ...................... | B65G 1/07 187/390 |

OTHER PUBLICATIONS

U.S. Appl. No. 18/318,391, filed May 16, 2023, Sorbom et al.

* cited by examiner

*Primary Examiner* — Jonathan Snelting
(74) *Attorney, Agent, or Firm* — Wolf, Greenfield & Sacks, P.C.

(57) ABSTRACT

Techniques are described for automatically removing and replacing components, including a vacuum vessel, from a tokamak. The inventors have recognized that schemes for automatically removing and replacing components from a tokamak should preferably be simple (e.g., using proven equipment to perform a series of non-mechanically complex tasks) and have a very low risk of damaging components. Techniques described herein may include splitting a tokamak into multiple pieces, separating the pieces, and removing the now separate pieces of the vacuum vessel from within the pieces of the tokamak. A new vacuum vessel can be inserted in multiple pieces and the tokamak rejoined to complete the replacement process.

25 Claims, 39 Drawing Sheets

Top view

Side view

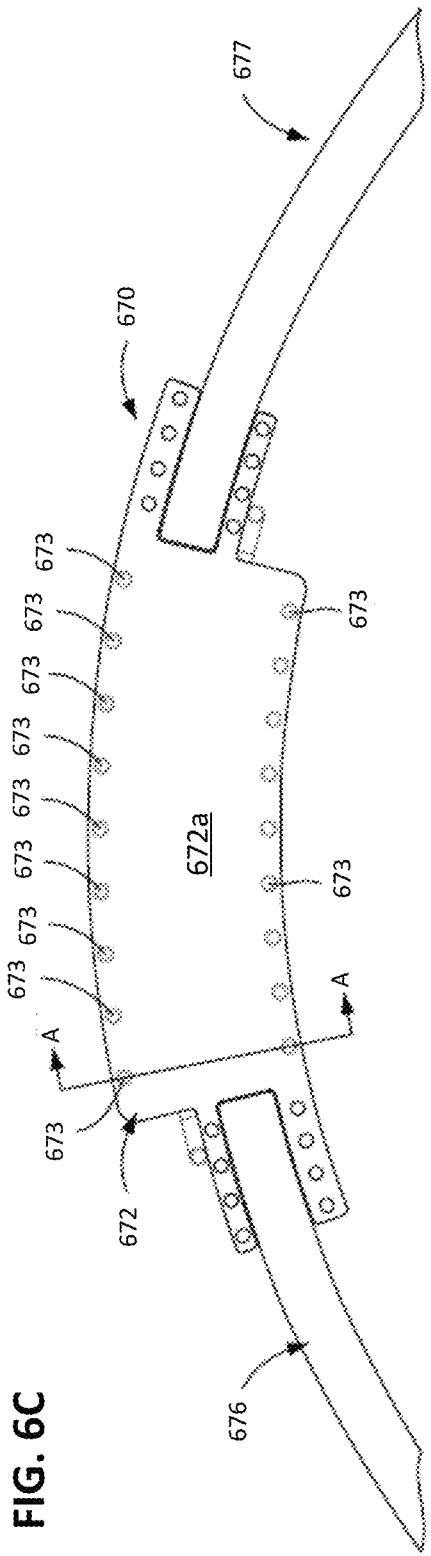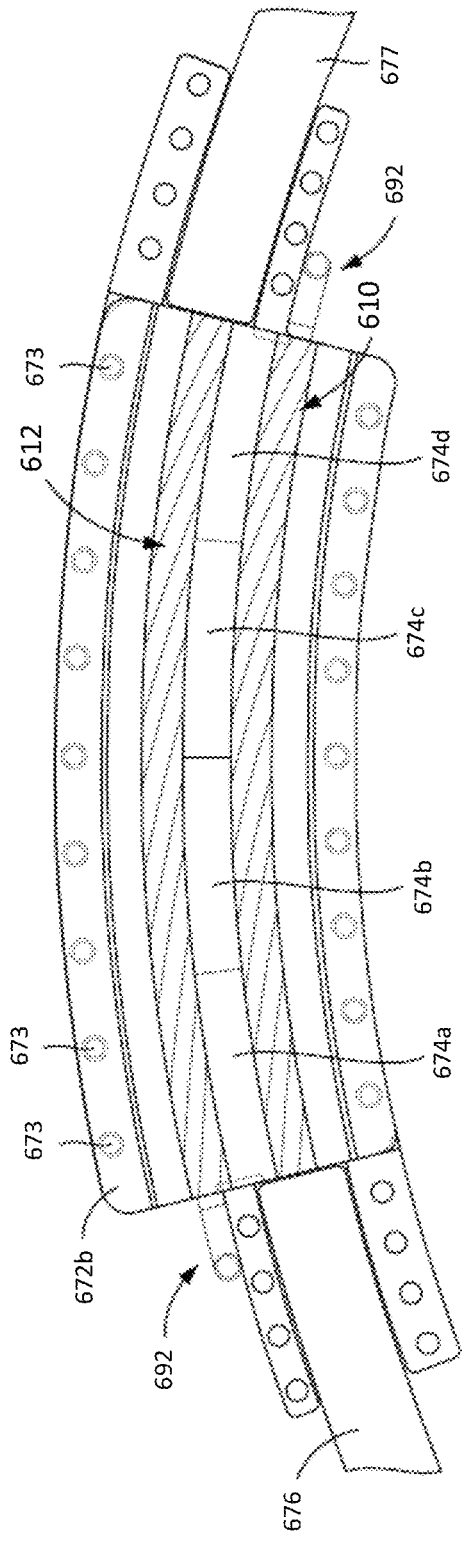
FIG. 6C
FIG. 6D

Top view

Side view

Top view

Side view

Top view

Side view

Top view

Side view

Top view

Side view

Top view

Side view

Top view

Side view

Top view

Side view

Top view

Side view

Top view

Side view

Top view

Side view

Top view

Side view

Top view

Side view

Top view

Side view

Top view

Side view

Top view

Side view

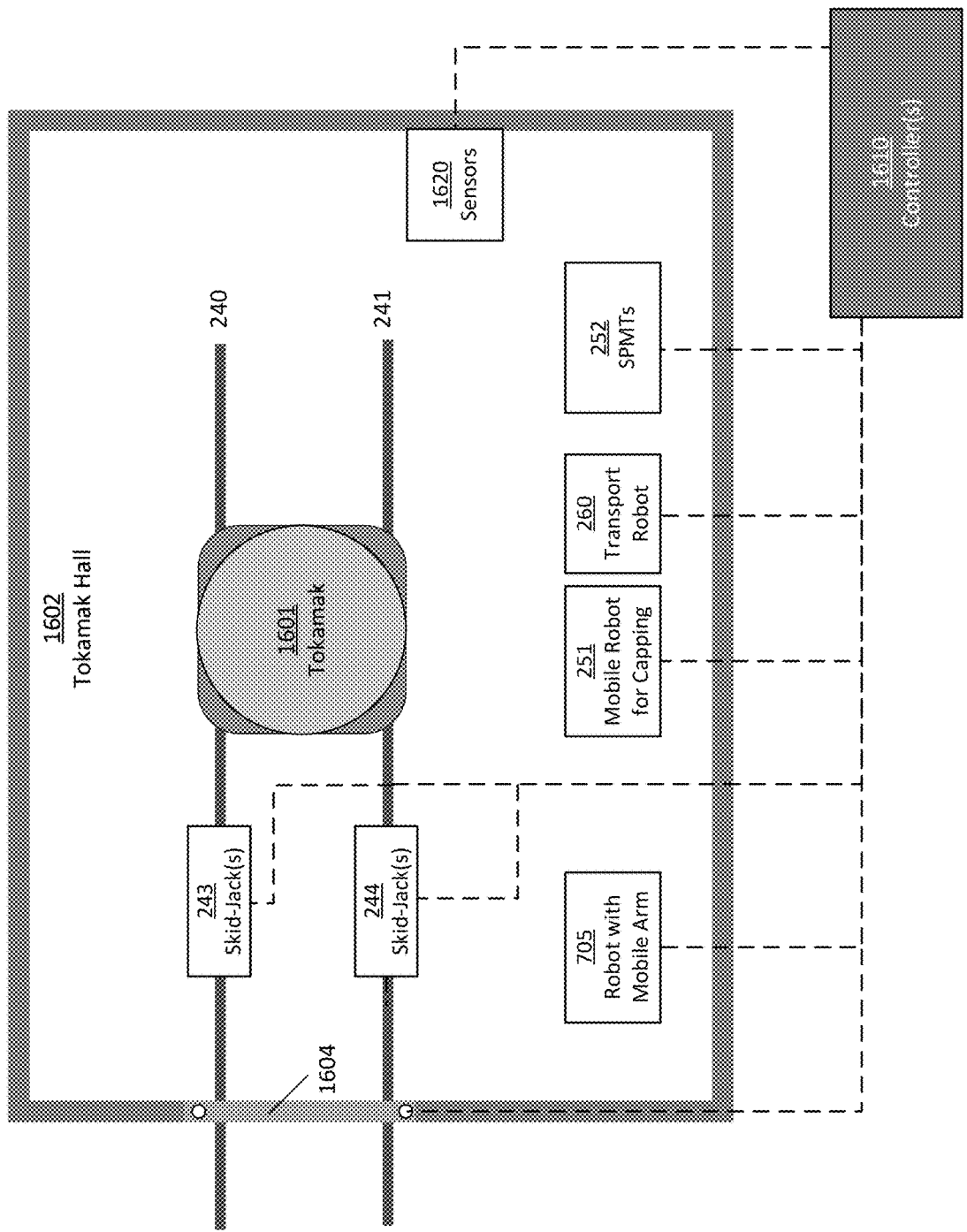

TECHNIQUES FOR REMOVING A VACUUM VESSEL FROM A TOKAMAK AND RELATED SYSTEMS AND METHODS

BACKGROUND

Magnetic confinement is an approach to generate fusion power that uses magnetic fields to confine a plasma to produce conditions under which the plasma will undergo fusion. Very high plasma temperatures, on the order of 150 million ° C., are required to initiate fusion reactions, and the plasma may be heated through operation of the magnetic fields and using external heating methods. Magnetic confinement of a plasma is challenging, as turbulence, instabilities, and other effects within the plasma can quickly reduce the efficiency of the fusion reaction, or even stop it completely.

The fusion plant design known as a tokamak is one approach to magnetic confinement that seeks to address the problematic instabilities that can result in the plasma during heating and/or during fusion reactions. In a tokamak, the plasma is confined in a toroid, and instabilities in the plasma are controlled by arranging magnetic fields to cause particles of the plasma to transit between the inner and outer sides of the toroid multiple times per orbit. This "twist' in the magnetic fields dramatically improves the stability of the plasma. To control the plasma in a tokamak, magnets are used to create toroidal and poloidal fields that shape and position the plasma within the toroid, as well as drive motion of the plasma around the toroid. The fusion reaction in a tokamak produces most of its energy as neutrons, which must be captured, and their kinetic energy turned into heat. Energy capture is typically performed using a structure containing low atomic number atoms, such as lithium, which will readily collide with neutrons in inelastic collisions. This material, often called a "blanket," can be directed to a heat exchanger to drive a conventional steam turbine or other generator.

SUMMARY

According to some aspects, a method is provided of removing a portion of a vacuum vessel from a portion of a tokamak, the method comprising operating a device to move alongside the portion of the tokamak, the device comprising a semi-annular plate comprising a rack, a plurality of jacks arranged over the semi-annular plate, and at least one mechanism configured to rotate the semi-annular plate in a circle, operating the at least one mechanism to rotate the semi-annular plate beneath the portion of the vacuum vessel within the portion of the tokamak, raising the plurality of jacks of the device to support the weight of the portion of the vacuum vessel, and operating the at least one mechanism to rotate the semi-annular plate out of the portion of the tokamak, thereby removing the portion of the vacuum vessel from the portion of the tokamak.

According to some aspects, a device for removing a portion of a vacuum vessel from a tokamak is provided, the device comprising one or more self-propelled modular transporters (SPMTs), a semi-annular plate comprising a rack, a plurality of jacks arranged over the semi-annular plate and configured to be actuated to raise a load on the device, and at least one actuatable pinion gear engaged with the rack on the semi-annular plate, wherein actuating the at least one actuatable pinion gear causes the semi-annular plate to rotate in a circle about its radial center, extending the semi-annular plate over the side of the device.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

FIGS. 6A-6E depict an illustrative poloidal field joint for a superconducting cable, according to some embodiments;

FIG. 16 depicts an illustrative system tokamak suitable for practicing aspects of the invention described herein, according to some embodiments.

DETAILED DESCRIPTION

Figure 1A:
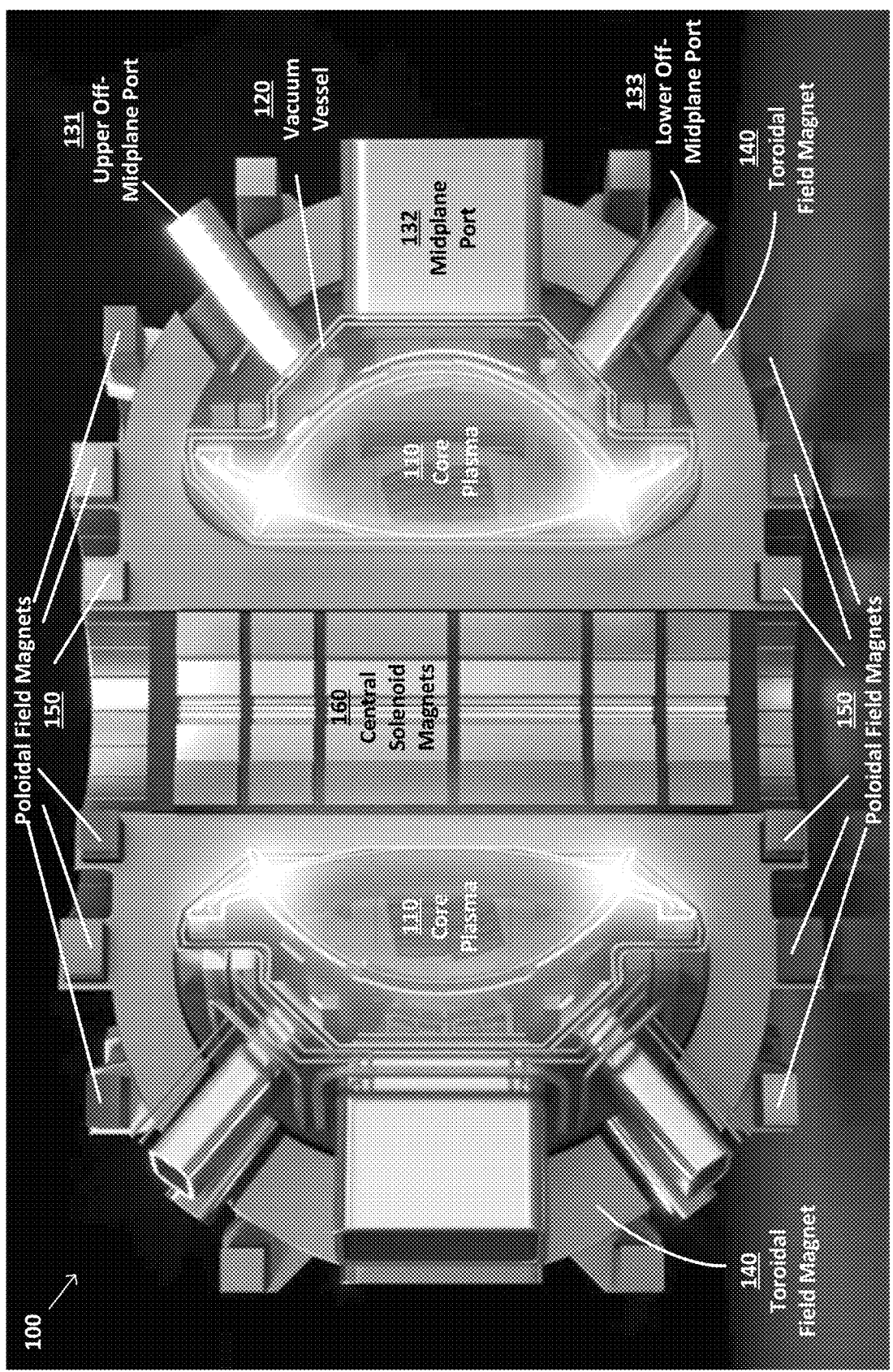
FIGS. 1A-1B depict cross-sectional views of an illustrative tokamak, according to some embodiments.

As described above, the fusion plant design known as a tokamak is one approach to magnetic confinement for fusion power. For purposes of explanation, FIG. 1A depicts a cross-sectional view of an illustrative tokamak, according to some embodiments. As shown in FIG. 1A, in tokamak 100, the core plasma 110 circulates within a vacuum vessel 120, which is shaped as a toroid (or approximately as a toroid). There are numerous ports integrally formed within, or otherwise coupled to, the vacuum vessel that provide access to the vacuum vessel from outside of the tokamak, including ports 131, 132 and 133, which are situated at various points around the tokamak. The tokamak 100 also includes a plurality of toroidal field (TF) magnets 140, a plurality of poloidal field (PF) magnets 150, and one or more central solenoid (CS) magnets 160. The TF magnets 140 are D-shaped (or approximately D-shaped) magnets that are configured to confine the plasma 110 in a desired region of the vacuum vessel 120. The PF magnets 150 are roughly ring-shaped magnets that are configured to shape and position the plasma 110. The CS magnet(s) 160 are arranged in the center of the tokamak and are configured to inductively drive the plasma current. The tokamak may also comprise, or may otherwise be coupled to, a source of auxiliary heating to bring the plasma to a desired temperature (e.g., an ion cyclotron resonance heating system, alpha particles produced during fusion, and/or ohmic power).

Figure 1B:
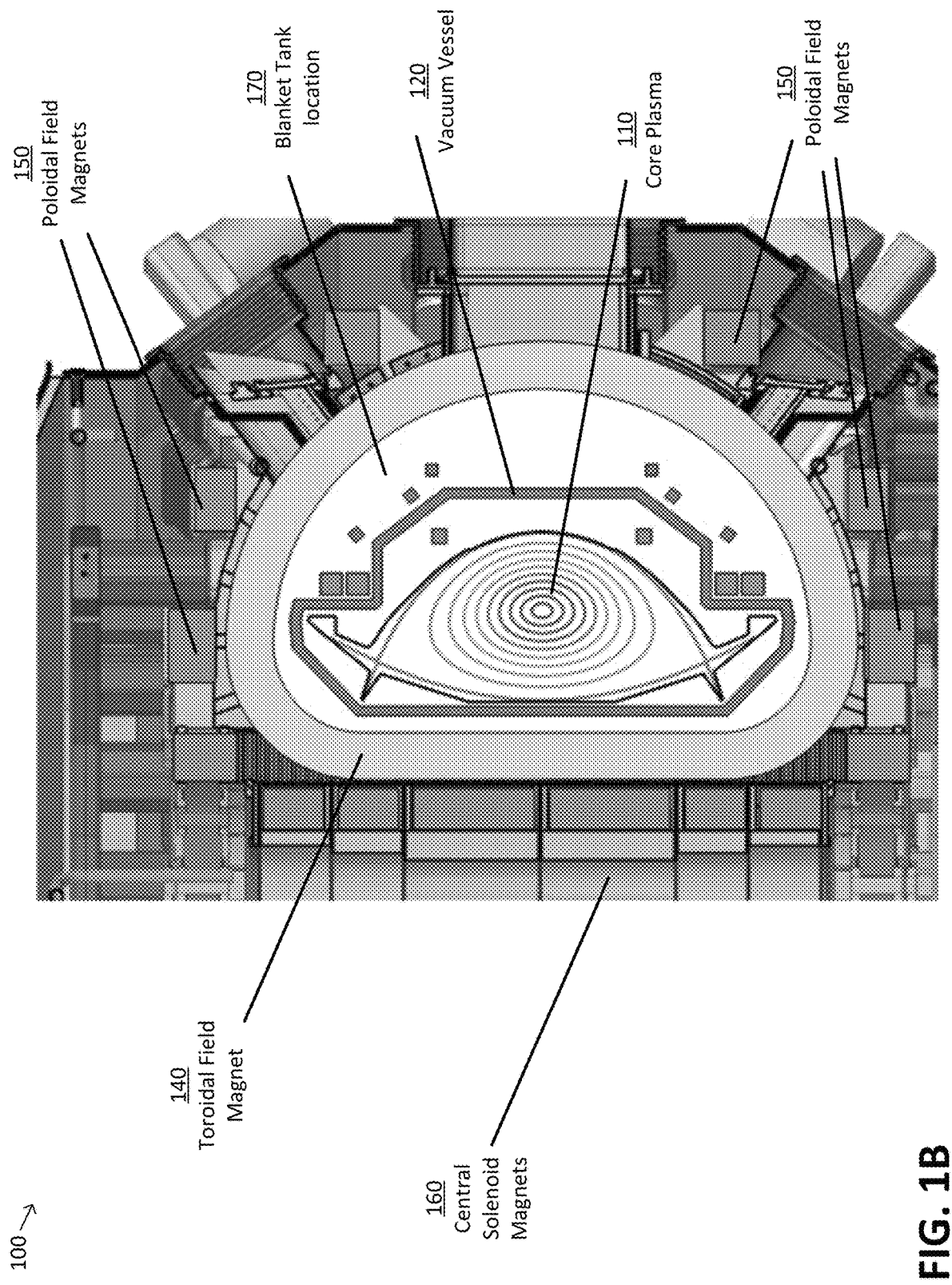

Some of the components shown in FIG. 1A are also shown in a more detailed cross-sectional view in FIG. 1B, which depicts a cross-sectional view through one side of the tokamak, according to some embodiments. In addition to the plasma 110, vacuum vessel 120, and magnets 140, 150 and 160 also shown in FIG. 1A, FIG. 1B depicts a space 170 in which a blanket tank may be arranged, as described further below. During operation of the tokamak 100, an axisymmetric toroidal plasma 110 is produced in the vacuum vessel 120. This plasma carries a toroidal current, which in turn creates a poloidal magnetic field, providing confinement of the plasma. The toroidal field magnets 140 provide stability to the plasma current, with the poloidal field magnets and the central solenoid shaping and controlling the position of the plasma. The plasma is heated by the central solenoid, RF and/or high energy neutral beams to initiate fusion, and energy from the resulting neutrons are captured in the blanket as described above.

In some cases, one or more thermal shields may be arranged within the tokamak. During operation of the tokamak, the magnets are cryogenically cooled to approximately 8K, whereas the vacuum vessel 120 is held at around room temperature or higher. This temperature difference is exacerbated during baking of the vacuum vessel, during which the vacuum vessel is heated to around 350° C. while the magnets are cooled to around 8K. A thermal shield may be provided to maintain an intermediate temperature (e.g., around 80K) between the vacuum vessel and magnets, so that the thermal shield can be cooled rather than the magnets themselves. This process is easier, as it is more efficient to cool an element at 80K than an element at 8K. The thermal shield thus minimizes (or otherwise reduces) the cryogenic load on the system. In some embodiments, inner and outer thermal shields may be arranged to provide intermediate temperature stages on either side of the magnets, with an inner thermal shield arranged interior to the toroidal field magnets 140, and an outer thermal shield arranged exterior to the toroidal field magnets.

During operation of a power plant comprising a tokamak such as those shown in FIGS. 1A-1B, the inner components of the tokamak close to the fusion plasma, such as the vacuum vessel, will be bombarded by large amounts of neutron radiation from the fusion plasma. This neutron bombardment will cause transmutations in the elements that the inner components are made from, sometimes producing radioactive isotopes. The neutron bombardment may also cause physical damage to some of the components. In a commercial fusion power plant this damage might become severe after a few years, requiring downtime and lost power generating opportunity to replace and/or repair damaged components. As a result of these effects, it may be economically beneficial to design a tokamak so that components expected to be damaged during operation can be easily removed and replaced periodically (e.g., every few years), so as not to limit the overall lifetime of the rest of the plant.

The components that are expected to be damaged or that may become radioactive over time include the vacuum vessel, which is a large and heavy component arranged within the interior of the tokamak. However, as shown in FIGS. 1A-1B, the vacuum vessel runs through the center of all of the TF magnets, and cannot simply be removed without some part of the tokamak being disassembled. In addition, the neutron activation is expected to make this component sufficiently radioactive that removal operations cannot be safely performed by plant personnel close to the tokamak. This makes removal and replacement of the vacuum vessel physically challenging, as it requires cutting and removing heavy, radioactive components from the tokamak without a human presence proximate to the tokamak itself.

The inventors have recognized and appreciated techniques for automatically removing and replacing components, including a vacuum vessel, from a tokamak. The inventors have recognized that schemes for automatically removing and replacing components from a tokamak should preferably be simple (e.g., using proven equipment to perform a series of non-mechanically complex tasks) and have a very low risk of damaging components. Techniques described herein may include splitting a tokamak into multiple portions, separating the portions, and removing the now separate portions of the vacuum vessel from within the portions of the tokamak. A new vacuum vessel can be inserted in multiple portions and the tokamak rejoined to complete the replacement process.

The inventors have recognized and appreciated that it is desirable for any scheme to remove and replace activated components to be as simple as possible. Maintenance schemes can easily get complex and expensive. A simple replacement scheme should allow the internal components to be replaced quickly, thereby reducing the downtime of the fusion power plant and making the plant more economical. In addition, a simplified replacement scheme should have replacement components that can be assembled with a minimum number of joints (e.g., welds). This will allow the internal components to be fabricated and tested as much as possible offsite. Fabricating and testing these components outside of the plant environment carries many advantages. Often these components require tight tolerances to fit inside of the tokamak assembly and the more assembly work that can be done in a controlled, centralized location the better. This approach lends itself to a more efficient production line type of fabrication for replaceable components. In addition, it also allows most quality control of the replaceable components to be performed at a location (e.g., a factory) where conditions are more controlled, and rework can be performed far more easily.

The inventors have further recognized and appreciated that maintenance processes performed within the tokamak room should have a very low risk of damaging components. The use of proven equipment to perform a series of non-mechanically complex tasks, with a substantial amount of the maintenance process being performed away from the tokamak, as described above, is an advantageous approach to achieving this goal.

Figure 2:
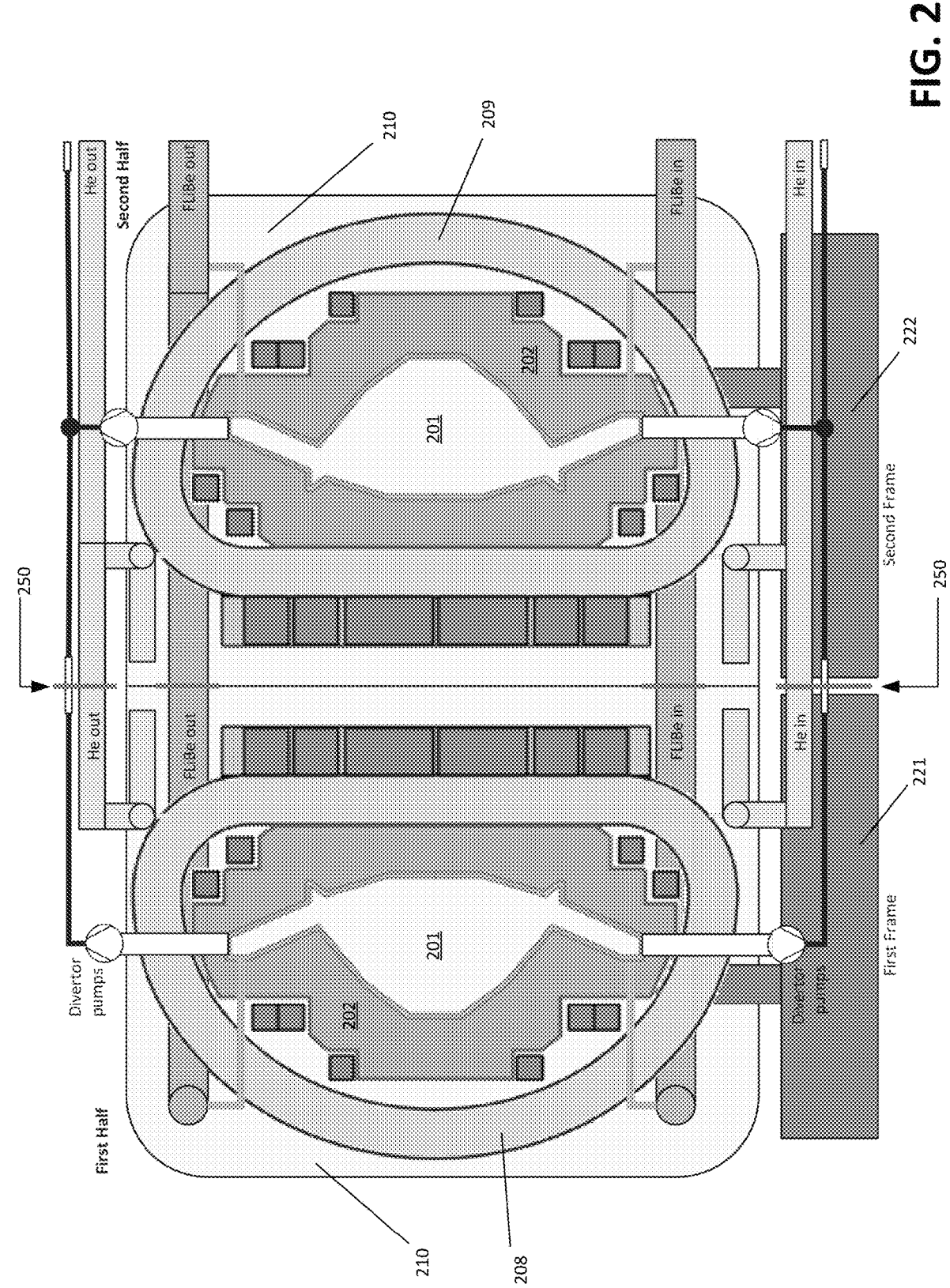
FIG. 2 depicts a cross-sectional view of the vacuum vessel and blanket tank of an illustrative tokamak, according to some embodiments.

To further describe the techniques for automatically removing and replacing components from a tokamak, FIG. 2 depicts a cross-sectional view of an illustrative tokamak, according to some embodiments. In the example of FIG. 2, a cross-section through the tokamak is shown, with cross-sections of the vacuum vessel 201 and blanket tank 202 shown in the center regions on each side. As described above, energy capture in a tokamak is typically performed using a material, typically a lithium-containing compound for breeding tritium in deuterium-tritium fusion, referred to as a "blanket," which contains low atomic number atoms that will readily collide with neutrons in elastic and inelastic collisions. The blanket in the example of FIG. 2 is FLiBe, a molten salt comprising a mixture of lithium fluoride (LiF) and beryllium fluoride ($BeF_2$). The blanket material is held within a tank referred to as the "blanket tank" 202. Cross-sections of two separate toroidal field magnets 208 and 209 are shown. The entire tokamak is held within a cryostat 210 into which helium is supplied for cooling of certain components (e.g., the superconducting magnets). The FLiBe blanket material is also circulated through the blanket tank via the depicted input and output channels. Any number of such input and output channels may be connected to the blanket tank to circulate the blanket material in and out of the blanket tank.

The denoted axis 250 highlights a section along which the tokamak may be split during maintenance processes, described below. Although in the example of FIG. 2, the tokamak is depicted as being separated into two portions along the meridional plane, it may be appreciated that the techniques described here are not necessarily limited to separation at the exact meridional plane, and the tokamak could instead be split along a different section (or sections) into multiple pieces (not just into two), so long as taking apart the tokamak allows access to the vacuum vessel. That being said, in the case of a tokamak that is symmetric about a horizontal plane (e.g., the meridional plane) splitting the tokamak into two halves along that plane may be advantageous as it may both simplify the maintenance process and allow for easier construction of components and joints between components. However, it may be appreciated that the techniques described herein are not limited to any particular manner of splitting a tokamak, nor to a symmetric tokamak and may be equally applied to an asymmetric tokamak. Returning to the example of FIG. 2, the tokamak is held on two separate platforms (also referred to herein as "frames"), with opposing halves of the tokamak across the axis 250 supported on separate platforms 221 and 222. As such, when the tokamak is split in two, each side of the split tokamak will be supported by a separate platform.

Figure 3:
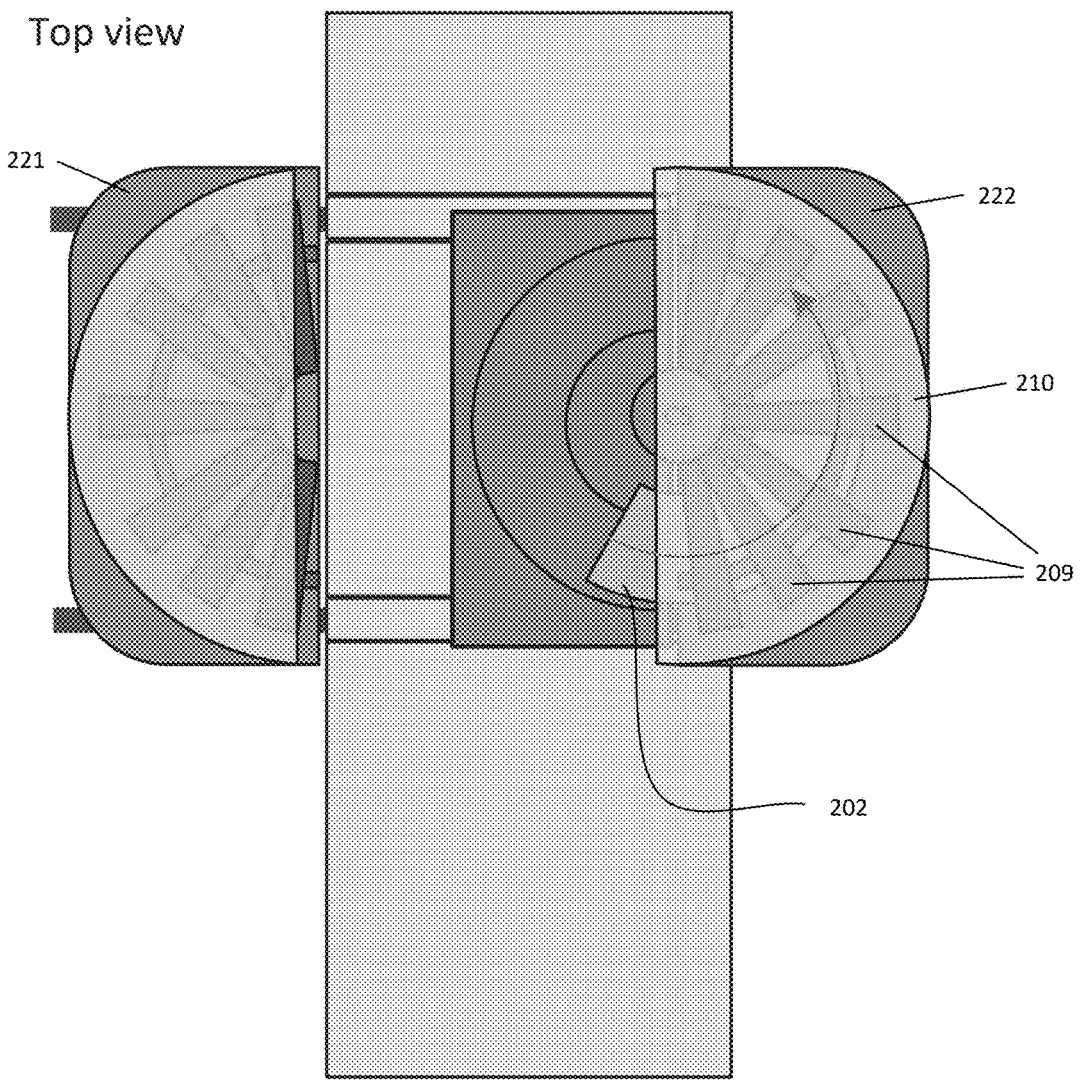
FIG. 3 depicts a view of an intermediate stage in a maintenance process, for purposes of illustration.
Figure 3:
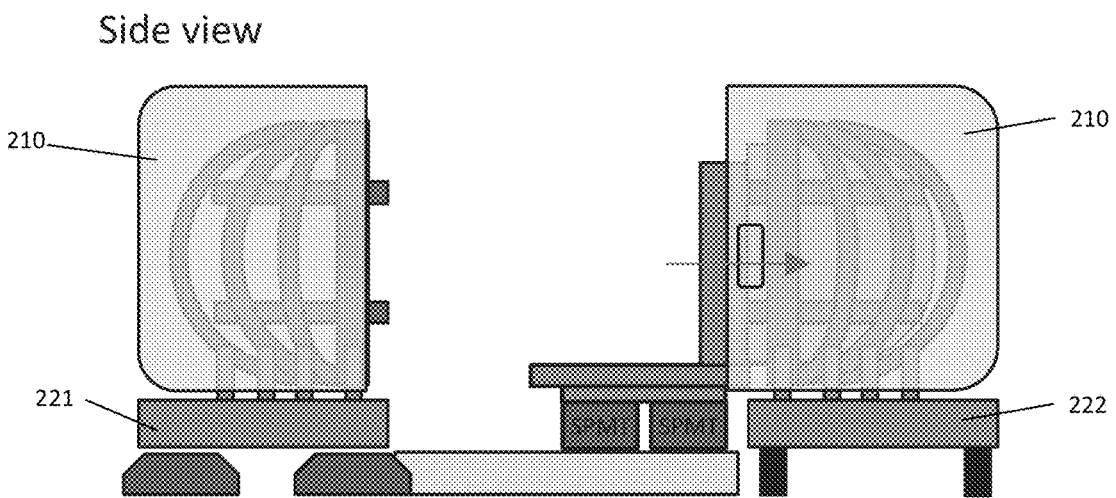

FIG. 3 depicts a view of an intermediate stage in the maintenance process, for purposes of illustration. A more detailed description of the process is provided below. As shown in FIG. 3, subsequent to separation of the two halves of the tokamak, the halves have been moved away from one another, allowing access to the vacuum vessel and blanket tank within the interior of each half. In the example of FIG. 3, the blanket tank 202 is in the process of being rotated around the toroidal field magnets 209 (not all are labeled in the drawing) and onto a platform.

Two different configuration options for the vacuum vessel and blanket tank are described herein, and the techniques described herein are generally applicable to both configurations, except where otherwise noted. The configurations differ with respect to whether the vacuum vessel and blanket tank are separate components in the tokamak (a "separate" blanket tank and vacuum vessel configuration), or are mechanically coupled to one another (a "combination blanket tank and vacuum vessel" configuration). Each configuration may have certain advantages and disadvantages, as described below. In each of FIGS. 4A and 4B, the vacuum vessel and blanket tank are each represented as a toroid, although it will be appreciated that this is a representational shape for illustration, and not intended to reflect the actual shape of the blanket tank or vacuum vessel.

Figure 4A:
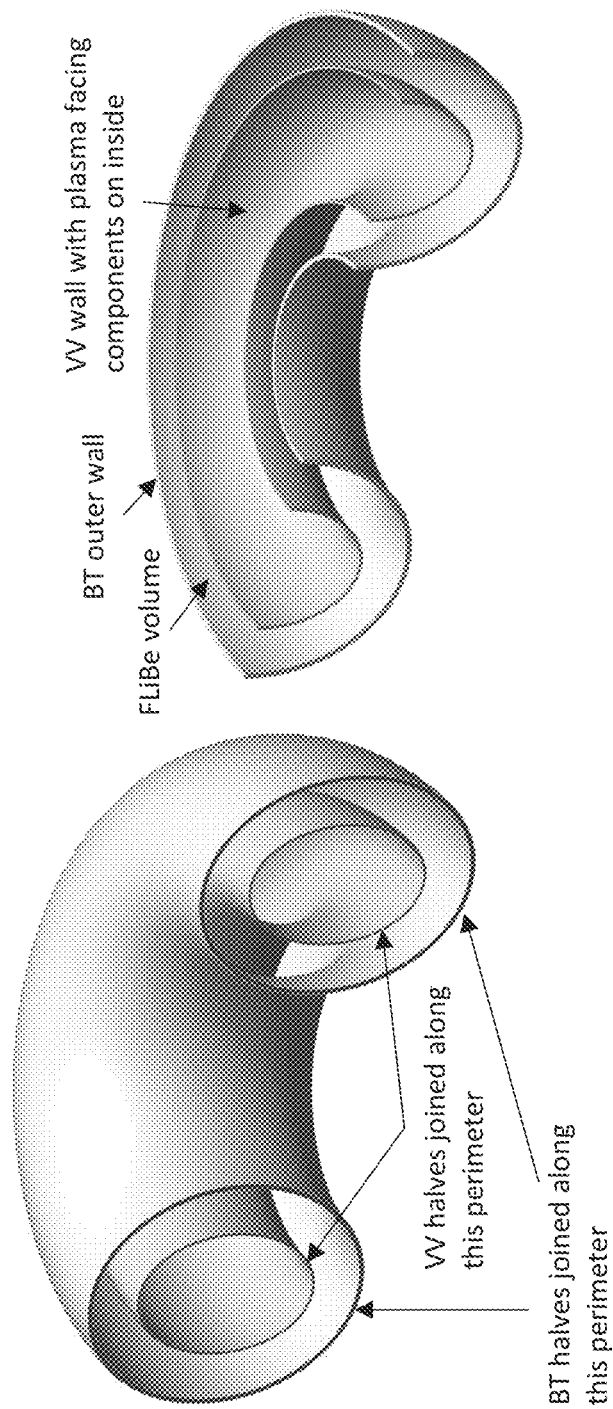
FIGS. 4A-4B depict alternative configurations of a blanket tank and vacuum vessel of a tokamak, according to some embodiments.

In the separate blanket tank and vacuum vessel configuration, depicted in FIG. 4A, two halves of the vacuum vessel may be joined along the identified perimeter along the meridional plane and sit inside the blanket tank. The two halves of the blanket tank are separately joined along a perimeter along the meridional plane. As such, the vacuum vessel sits inside the blanket tank, and each are joined and separately independently of one another.

In the configuration of FIG. 4A, the blanket tank may be considered to be a lifetime component that is not replaced during maintenance, whereas the vacuum vessel is replaced during maintenance. According to some embodiments, the vacuum vessel may sit on a track built into the blanket tank, allowing the vacuum vessel to move within the blanket tank during maintenance (the tracks are not shown in FIG. 4A). One disadvantage of this configuration may be contamination risk from the blanket. Even after draining the blanket tank, the molten salt used as the blanket may coat the vacuum vessel, leading to possible contamination of the facility when the vacuum vessel is extracted during maintenance.

Figure 4B:
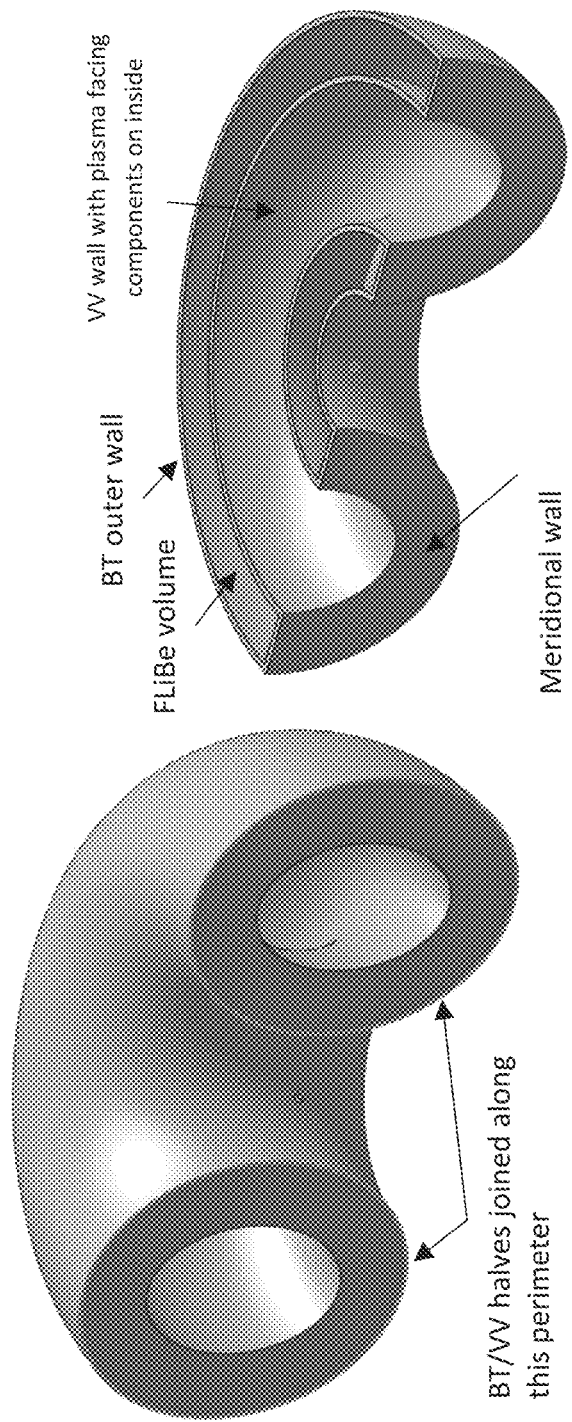

The combination blanket tank and vacuum vessel configuration is depicted in FIG. 4B. In this configuration, each blanket tank/vacuum vessel half is a single component in which the blanket tank and vacuum vessel are joined along the meridional wall as shown. As such, when the halves are joined, the resulting vacuum vessel is a single volume, but the blanket tank is arranged in (at least) two separate volumes, through which the blanket material may be separately circulated. During maintenance, each half of the combination blanket tank and vacuum vessel components is removed and replaced as a separate element. According to some embodiments, the combination blanket tank and vacuum vessel may sit on a track built into the toroidal field coil housing, allowing the combination blanket tank and vacuum vessel to move within the toroidal field coil during maintenance (the tracks are not shown in FIG. 4B). In this configuration, the aforementioned contamination risk with the configuration of FIG. 4A may be significantly reduced because any remaining blanket material is enclosed within one half of the combination blanket tank and vacuum vessel. On the other hand, the blanket tank in this configuration is replaced as well, in contrast to the separate blanket tank and vacuum vessel configuration in which the blanket tank may be considered a lifetime component, leading to a larger section of the tokamak being replaced during maintenance.

Figure 4C:
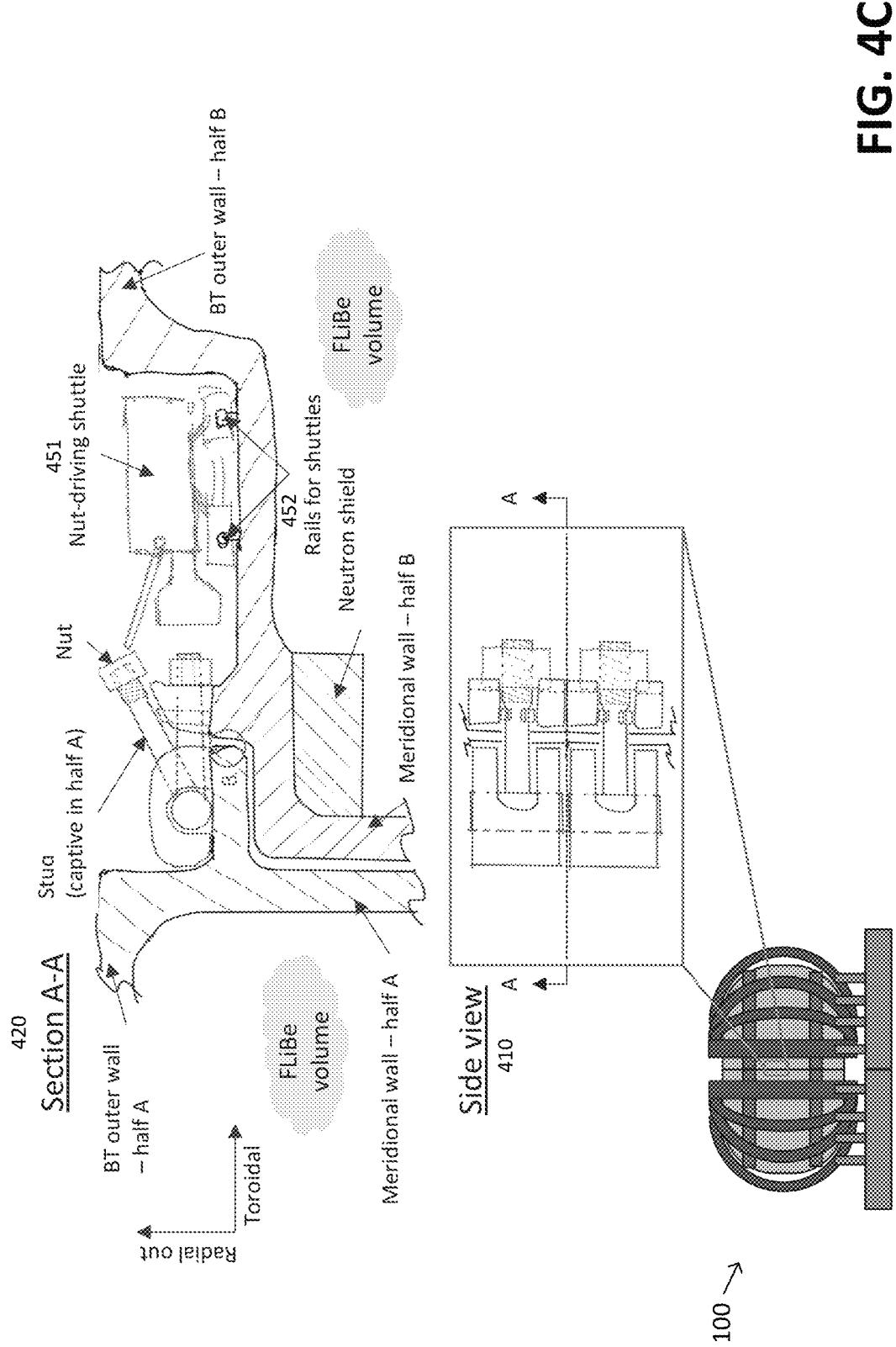
FIG. 4C depicts an illustrative connection that may be made between two halves of a combination blanket tank and vacuum vessel, according to some embodiments.

With respect to the combination blanket tank and vacuum vessel configuration, FIG. 4C depicts an illustrative connection that may be made between the two halves of the combination blanket tank and vacuum vessel, according to some embodiments. In the example of FIG. 4C, tokamak 100 includes two halves of a combination blanket tank and vacuum vessel that are sealed together via a series of connectors along the seam, two of which connectors are shown in side view 410. A cross section A-A through these connectors is shown in the inset 420, in which the vertical direction on the page is the radial direction (towards or away from the center of the tokamak) and the horizontal direction on the page is the toroidal direction (along the exterior circumference of the tokamak). As shown, the two halves of the blanket tank may be connected by a captive stud with a nut that is threaded onto or off of the captive stud during maintenance. As shown in FIG. 4C, a robotic nut-driving shuttle 451 may traverse a rail 452, threading on or off the nut of each captive stud as it travels poloidally around the joint. A bolted joint such as that shown in the example of FIG. 4C, may have an advantage that it allows the two halves of the combination blanket tank and vacuum vessel to be gradually brought together by incrementally tightening the joint in multiple passes. In some embodiments, halves of a combination blanket tank and vacuum vessel may comprise one or more alignment features (e.g., on the meridional wall) that engage with one another as the joint is tightened.

According to some embodiments, the vacuum vessel may be supported within the tokamak by one or more support structures. These support structures may be configured so that, during maintenance, they can be disengaged, and the load of the vacuum vessel transferred to another device for removal of the vacuum vessel. Support structures may be provided at any one or more locations around the tokamak, including at the top, side and/or bottom of the tokamak. The support structures provide structural support due to the weight of the tokamak components and also due to forces applied to those components during operation of the tokamak.

Figure 5A:
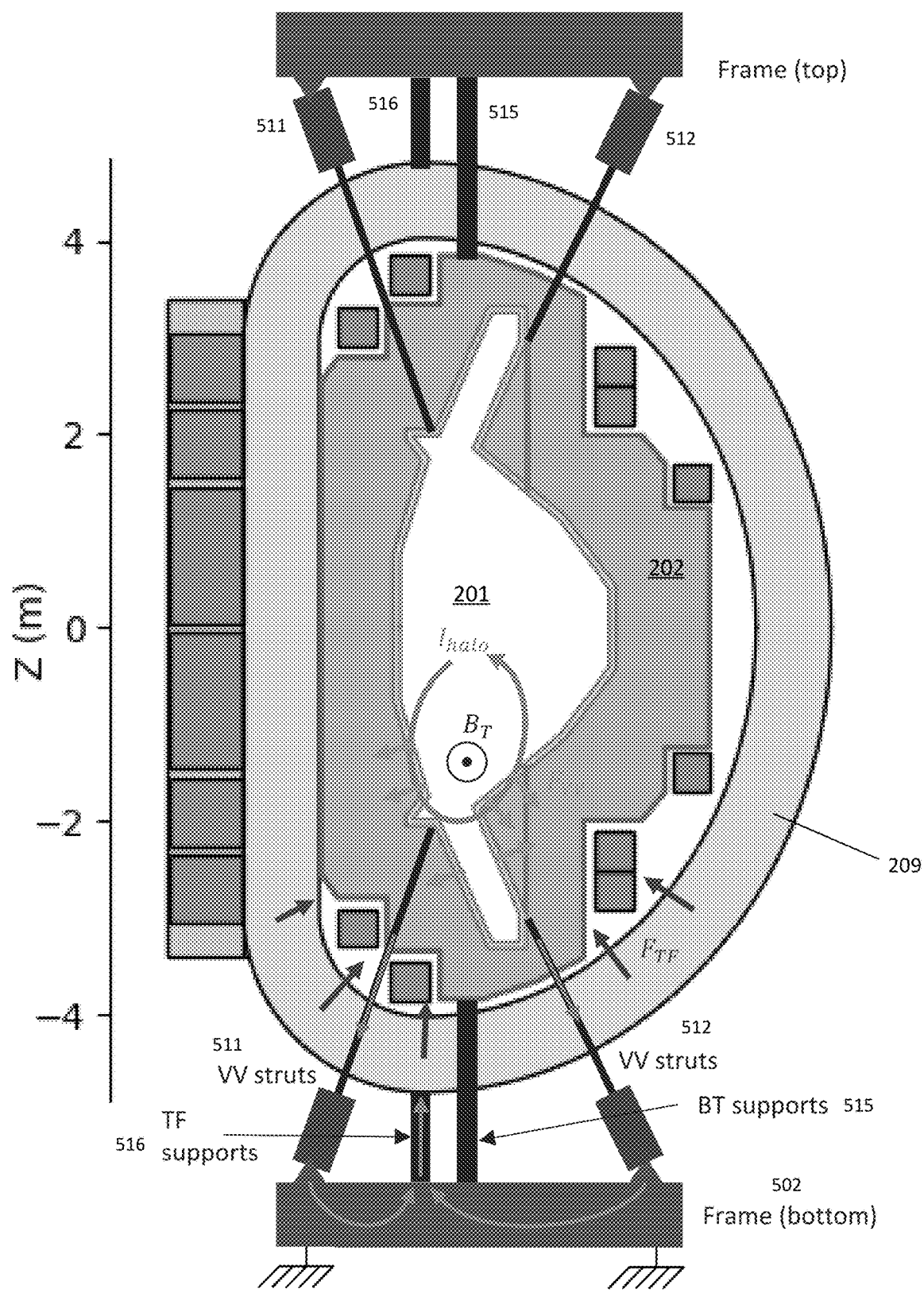
FIG. 5A depicts various loads applied to a set of supports of a tokamak, according to some embodiments.

FIG. 5A depicts various loads applied to a set of supports of a tokamak, according to some embodiments. In the example of FIG. 5A, the vacuum vessel and blanket tank are arranged in the "separate" configuration as per FIG. 4A. The tokamak is supported below by struts 511 and 512 that are connected to the frame 502 at one end, and the vacuum vessel 201 at the other end. In addition, one or more blanket tank supports 515 are connected to the frame 502 at one end, and the blanket tank 202 at the other end; and one or more toroidal field supports 516 are connected to the frame 502 at one end, and the toroidal field coil 209 at the other end.

According to some embodiments, the support structure arrangement in the tokamak may exhibit N-fold symmetry, where N is the number of toroidal field magnets in the tokamak. For instance, a tokamak with 18 toroidal field magnets may comprise 18 support structures that are arranged to exhibit 18-fold symmetry. In some embodiments, for each toroidal field coil, the tokamak may comprise one pair of vacuum vessel struts and one blanket tank support arranged between adjacent toroidal field magnets and one toroidal field coil support attached to the toroidal field coil.

Figure 5B:
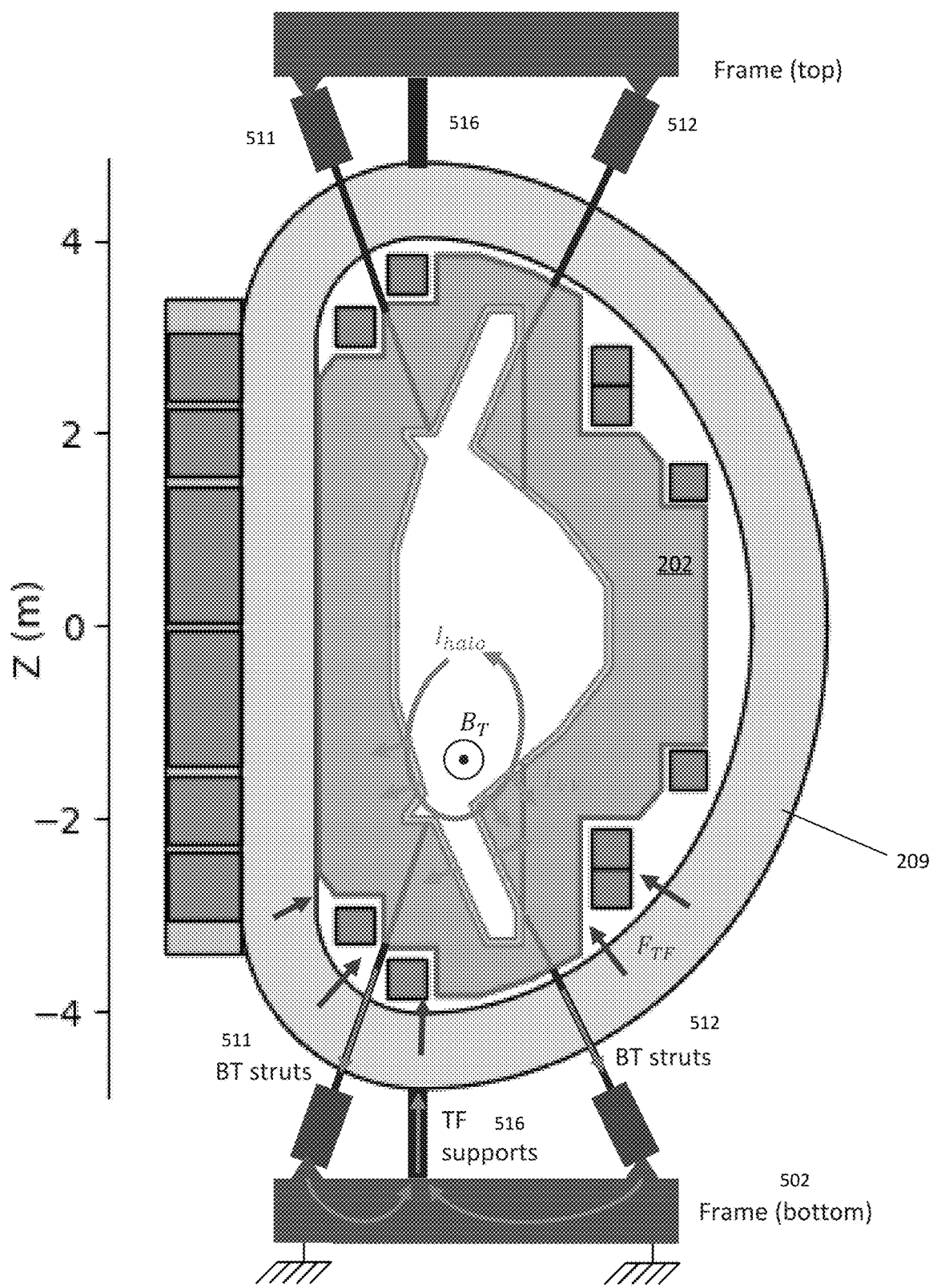
FIG. 5B depicts various loads applied to a set of supports of a tokamak where the vacuum vessel and blanket tank are arranged in a combined configuration, according to some embodiments.

FIG. 5B depicts various loads applied to a set of supports of a tokamak where the vacuum vessel and blanket tank are arranged in the "combined" configuration as per FIG. 4B, according to some embodiments. In the example of FIG. 5B, the tokamak is supported below by struts 511 and 512 that are connected to the frame 502 at one end, and the combination blanket tank and vacuum vessel 202 at the other end. In addition, one or more toroidal field supports 516 are connected to the frame 502 at one end, and the toroidal field coil 209 at the other end.

According to some embodiments, the support structure arrangement in the tokamak may exhibit N-fold symmetry, where N is the number of toroidal field magnets in the tokamak. For instance, a tokamak with 18 toroidal field magnets may comprise 18 support structures that are arranged to exhibit 18-fold symmetry. In some embodiments, for each toroidal field coil, the tokamak may comprise one pair of blanket tank/vacuum vessel struts arranged between adjacent toroidal field magnets and one toroidal field coil support attached to the toroidal field coil.

In both of the examples of FIGS. 5A and 5B, a top frame also includes supports and struts as described in relation to the bottom frame. These supports and struts provide mechanical support to the tokamak structure, and do not significantly support the weight of the tokamak components. The weight of the top frame itself may be supported by the tokamak, such as by the structure of the toroidal field magnets.

Irrespective of which of the support approaches of FIGS. 5A and 5B are deployed, during operation of the tokamak, a plasma moving into the vacuum vessel produces a poloidal halo current $I_{halo}$ as shown in the drawings through the wall of the vacuum vessel and the plasma. This current produces a Lorentz force $F_{VV}$ on the vacuum vessel as a result of the magnetic field produced by the toroidal field magnets. This force is balanced by an equal and opposite force in the toroidal field magnets $F_{TF}$, and may be expected to be of the order of tens of MegaNewtons (MN), such as 20-30 MN. The total weight of the blanket tank, vacuum vessel and blanket material may be expected to be around 5 MN.

According to some embodiments, the vacuum vessel struts (or combined blanket tank/vacuum vessel struts) 511 and 512 are configured to hold the vacuum vessel (or blanket tank and vacuum vessel) in place under nominal loads during operation so that the vacuum vessel remains in its desired location relative to the poloidal field magnets of the tokamak. Maintaining a desired location of the vacuum vessel relative to the poloidal field magnets is desirable for proper control of the plasma.

According to some embodiments, the vacuum vessel struts (or combined blanket tank/vacuum vessel struts) 511 and 512 may allow the vacuum vessel to move in the case of higher than typical loads so that the vacuum vessel can 'float' to reduce peak stresses from impulsive loads. For example, the vacuum vessel struts 511 and 512 may comprise one or more hydraulic cylinders that may be compressed to shorten the struts. A relief valve (e.g., poppet relief valve) on the vacuum vessel strut may lock the position of the hydraulic cylinder at low loads, but allow the cylinder to open and allow damping motion at high loads. In some embodiments, the struts may comprise buckling flexures or any other mechanism(s) that provide compliance at high loads, in addition to or alternatively to hydraulic cylinders. In some implementations in the example of FIG. 5A, the vacuum vessel struts 511 and 512 may comprise a bellows that allows the strut to move relative to the wall of the blanket tank.

Since, during maintenance, a new vacuum vessel is installed from multiple pieces, it may be beneficial for the supports that will support the new vacuum vessel to allow for motion of the vacuum vessel pieces for alignment purposes.

As shown in FIGS. 1A and 1B, the tokamak includes poloidal field magnets 150. These magnets are approximately ring-shaped and arranged at various poloidal positions, and with different diameters, around the magnet. For example, cross-sections through poloidal field magnets 150 are shown in FIG. 1B. To split a tokamak into multiple pieces, the poloidal field magnets must also be split into multiple pieces due to them having a cross-section at every toroidal position around the tokamak. In the example of FIG. 1B, the poloidal field magnets are arranged within the toroidal field magnets, such that they must be split into multiple pieces to be removed from the tokamak. However, the tokamak may additionally, or alternatively include one or more poloidal field magnets that are arranged exterior to the toroidal field magnets, such that they can be removed from the tokamak without it being necessary to split the poloidal field magnets into multiple pieces.

According to some embodiments, the tokamak may comprise one or more poloidal field magnets that comprise one or more joints at which the poloidal field magnet may be demounted and remounted, thereby allowing the poloidal field magnets to be split and rejoined without significantly comprising the electrical characteristics of the poloidal field magnets. Such joints may be referred to herein as "poloidal field joints." In some implementations a poloidal field magnet may comprise windings of a superconducting cable, and the poloidal field joints may joint together sections of the superconducting cable. According to some embodiments, a poloidal field coil may comprise one or more poloidal field joints on opposing sides where the coil intersects with the meridional plane of the tokamak.

Figure 6A:
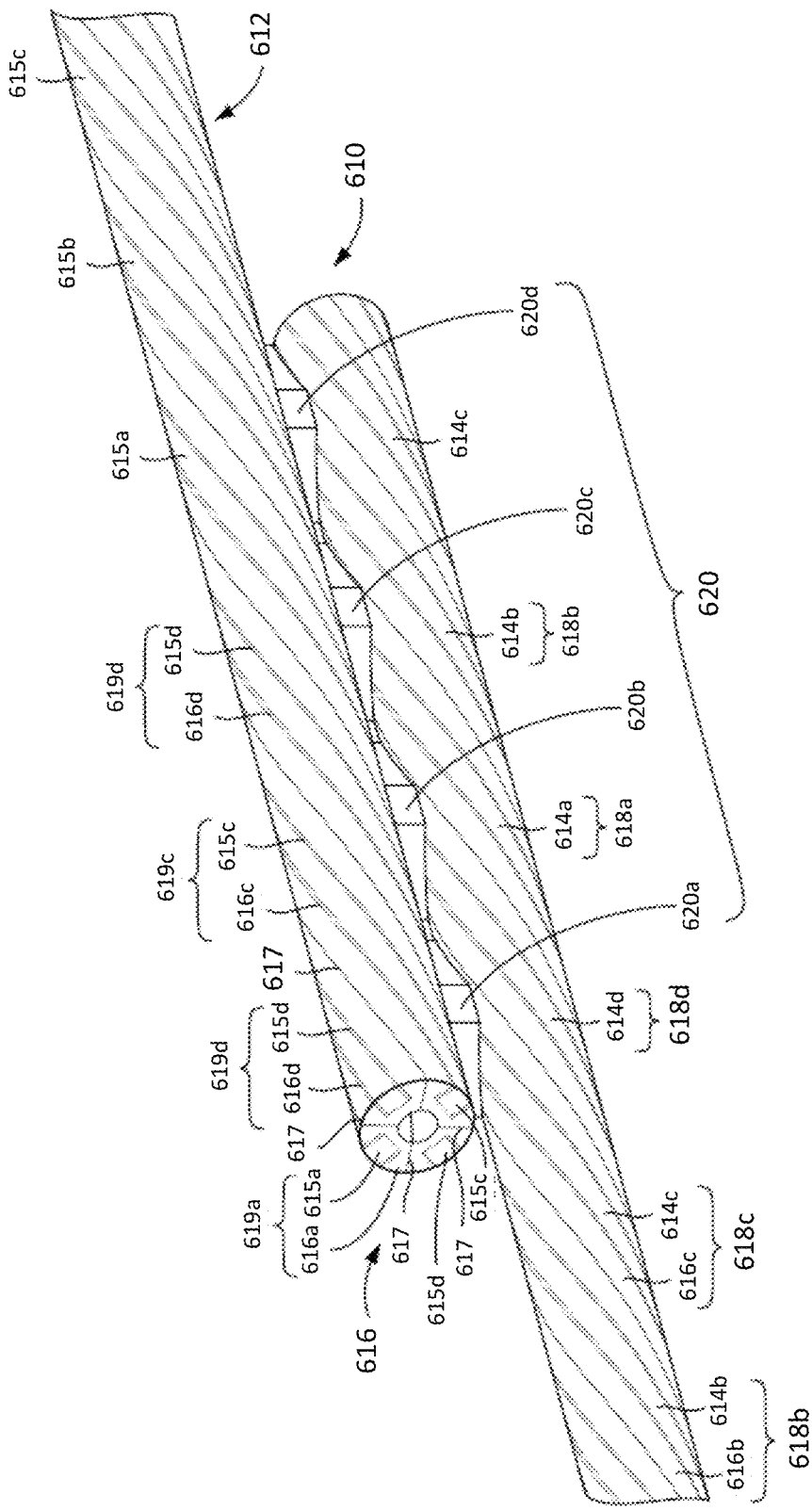
Figure 6B:
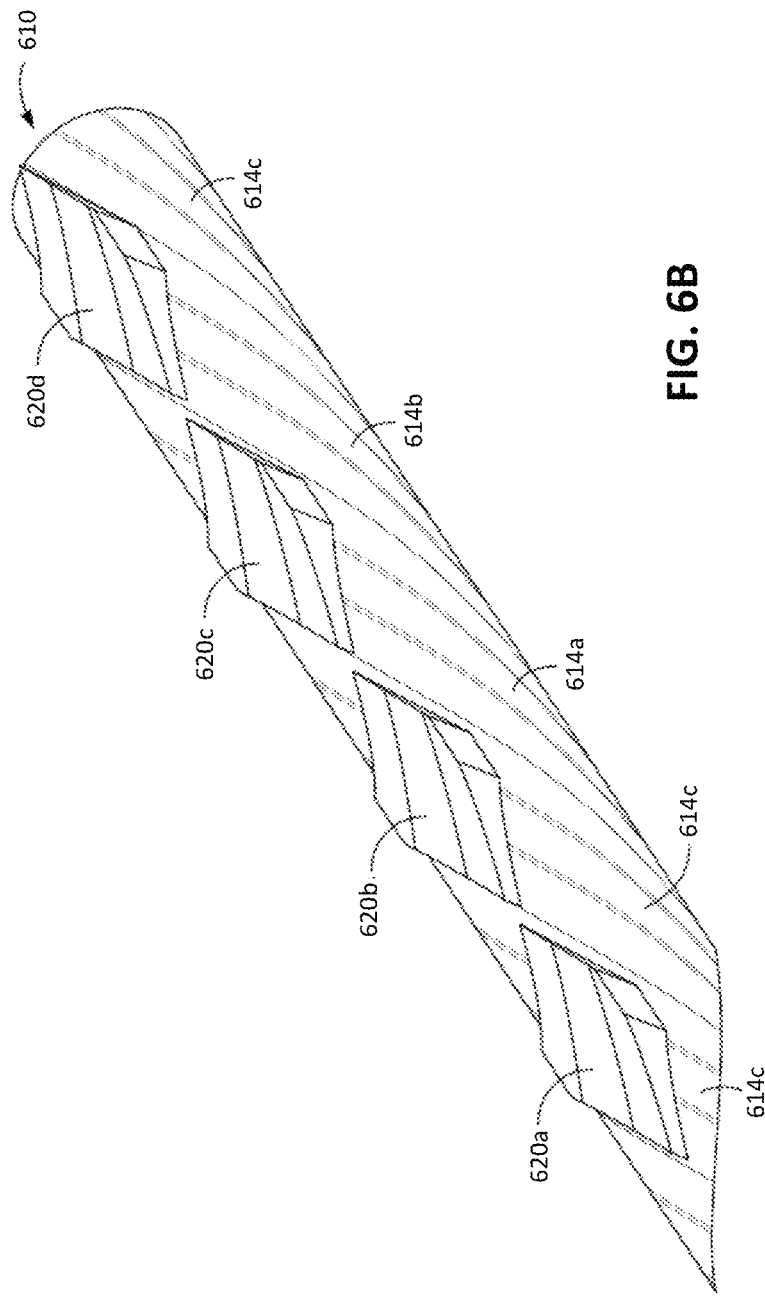

FIGS. 6A-6E depict an illustrative poloidal field joint for a superconducting cable, according to some embodiments. In the example of FIGS. 6A-6B, a pair of superconducting cables 610 and 612 are coupled via a partitioned (or distributed) joint 620 comprising a plurality of partitioned (or distributed) joint elements (or joint members) 620a-620d. In some embodiments, cables 610 and 612 may comprise a high temperature superconductor (HTS). In the illustrative example of FIGS. 6A-6B, cables 610 and 612 comprise HTS material 614 and 615, which are insulated from each other. In some embodiments, the HTS material 614 and 615 may be provided in the form of a stack of HTS tapes.

In the example of FIGS. 6A-6B, superconducting cables 610 and 612 are provided as partitioned, twisted, superconducting cables 610 and 612 each of which comprises a carrier (or former) 616. The carrier 616 comprises electrically conducting structures (also sometimes referred to herein as "partitions," "stabilizer structures," or more simply "stabilizers"). In this example embodiment, carrier 16 comprises four stabilizers 616a, 616b, 616c and 616d with each stabilizer electrically insulated from each other via intervening layers of electrically insulating material 617. Cables 610 and 612 may therefore be referred to herein as "partitioned" cables. In the example of FIGS. 6A-6B, stabilizers 616a, 616b, 616c and 616d (and thus the current-carrying HTS tape stacks 614 and 615) are twisted about a common axis. Each stabilizer may, for instance, follow a helical path while supporting a respective one of the current-carrying HTS tape stacks.

In the example of FIG. 6A, each of stabilizers 616a, 616b, 616c and 616d has a channel or opening provided therein in which an HTS material is disposed. In the example of FIG. 6A, stabilizers of cable 610 comprise HTS material 614a, 614b, 614c and 614d (e.g., an HTS tape or an HTS tape stack) and stabilizers of cable 612 comprises HTS material 615a, 615b, 615c and 615d. In some embodiments, carrier 616 may comprise a single conductor (e.g., a single stabilizer) having four channels provided therein. A combination of an HTS material (e.g., an HTS tape stack 614a, 614b, 614c or 614d) disposed or otherwise integrated into a stabilizer (e.g., one of stabilizers 616a, 616b, 616c or 616d) may be referred to herein as a "petal" or a "segment" generally denoted 618 or 619 in respective ones of cables 610 and 612. As noted above, petals are separated by insulating material (e.g., insulating material 617). Thus, in the example of FIG. 6A, cables 610 and 612 each comprise four superconducting petals (618a, 618b, 618c and 618d) and (619a, 619b, 619c and 619d), respectively.

In the example of FIG. 6A, partitioned joint 620 comprises joint elements 620a, 620b, 620c and 620d (which may also be referred to as "joint partitions") disposed between cables 610 and 612 such that each joint element electrically couples one of the petals 618a, 618b, 618c and 618d on cable 610 to one of the petals 619a, 619b, 619c and 619d on cable 12. In some embodiments, each joint element 620 electrically couples only a single one of the HTS tape stacks 614a, 614b, 614c and 614d in cable 10 to a single one of the HTS tape stacks 615a, 615b, 615c and 615d in cable 12. As noted above, each joint element 620a, 620b, 620c and 620d may be electrically insulated from the other joint elements and electrically insulated from other HTS tape stacks (e.g., each joint element is electrically coupled to only one HTS tape stack on each cable and is electrically isolated from other HTS tape stacks). Such a combination of joint elements is sometimes referred to herein as a "partitioned joint."

Since in the example of FIG. 6A, cables 610 and 612 each have four HTS tape stacks, then four joint elements may be arranged to couple the two cables. In general, the number of joint elements to use in an application corresponds to the number of petals (or the number of HTS tape stacks) in the cables being joined. Thus, the example of FIG. 6A shows a partitioned (or distributed) joint with single connection paths between the same partitions in two four-partition cables 610 and 612. In this way, each petal 618a, 618b, 618c and 618d (e.g., each HTS tape stack 614a, 614b, 614c and 614d) in cable 610 is physically and electrically coupled (e.g., galvanically connected) to a single corresponding one of the petals 619a, 619b, 619c and 619d (e.g., a single one of the HTS tape stacks 615a-615d) in cable 612 thereby providing a 1:1 connection between petals 618 and 619 (and a 1:1 connection between HTS tape stacks 614 and 615) of each cable 610 and 612. Providing a 1:1 connection between petals (or HTS material) of a partitioned cable may reduce (and ideally minimize) eddy currents, which may reduce joule heating in the joint.

In the example of FIG. 6A, joint elements 620a, 620b, 620c and 620d are disposed on respective ones of petals 618a, 618b, 618c and 618d of cable 610. In some embodiments, joint elements 620a, 620b, 620c and 620d may comprise any conductive material including, but not limited to, copper. Materials having a relatively high electrical conductivity are preferred. In some embodiments, joint elements 620a, 620b, 620c and 620d may be provided in whole or in part from an electrically conductive material. For example, joint elements 620a, 620b, 620c and 620d may comprise copper. One class of conductive materials which may be used includes oxygen free high conductivity (OFHC) copper. Joint elements 620a, 620b, 620c and 620d may comprise, for example, a high conductivity copper such as C101 copper, to name one specific alloy as an example. Other materials having electrical and mechanical/structural characteristics which are the same as or similar to the electrical and mechanical/structural characteristics of C101 copper may, of course, also be used including, but not limited to, alloyed coppers (for example: bronze, copper doped with silver, etc.). Other alloys (including other copper alloys) could, of course, also be used. In some applications, a tradeoff between material strength and material conductivity may be made in selecting a material. For example, in some applications it may be desirable to select a material (e.g., a copper alloy) which provides higher strength but at the expense of conductivity while in other applications it may be desirable to select a material which provides higher conductivity but at the expense of strength. Thus, when selecting a material from which to provide a joint element for use in a particular application, a trade-off may be made between material characteristics (e.g., between conductivity and strength characteristics in this example).

According to some embodiments, the joint members and/or the petals may be plated with a conductive material (e.g., copper, silver, alloys, or any other appropriately selected plating material). In some embodiments, in which petals are exposed after removing an outer jacket of a cable, it may be desirable to sand (or otherwise treat) an exterior surface to expose the former (assuming the former is provided from a material which can be plated—e.g., copper) such that the former can thereafter be plated (e.g., using a silver plate). It should, of course, be appreciated that in some embodiments, it may not be possible plate the solder above the HTS stacks. In some embodiments, the joint members may be impregnated or co-wound with HTS tape or even bulk superconductors.

In the example of FIG. 6A-6B, the joint elements 620a, 620b, 620c and 620d are physically spaced apart from each such other (e.g., joint elements 620a, 620b, 620c and 620d do not physically touch one another) and each joint element 620a, 620b, 620c and 620d is in physical contact with only a single petal (and in some embodiments, in physical contact with only a single HTS tape stack). Hence, in this embodiment, the partitions between the joint elements are provided by physically spacing the joint elements (with air or other electrically insulating material existing between the joint elements) to thus provide the portioned joint. In this way, a 1:1 connection between superconducting material 614a, 614b, 614c and 614d, 615a, 615b, 615c and 615d of each cable 610 and 612 (via joint elements 620a, 620b, 620c or 620d) may be ensured. In some embodiments, the joint partitions 620a, 620b, 620c and 620d may be coupled, secured, fastened, or otherwise attached to the cables 610 and 612 using any removable, permanent, or semi-permanent means. For example, joint partitions 620a, 620b, 620c and 620d may be secured to the cables 610 and 612 via tape, epoxy, or solder while the joint is assembled. Then, compression pressure from a surrounding case, fixture or clamp structure keeps the joint partitions 620a, 620b, 620c and 620d secured to the cables 610 and 612 thereafter.

Figure 6E:
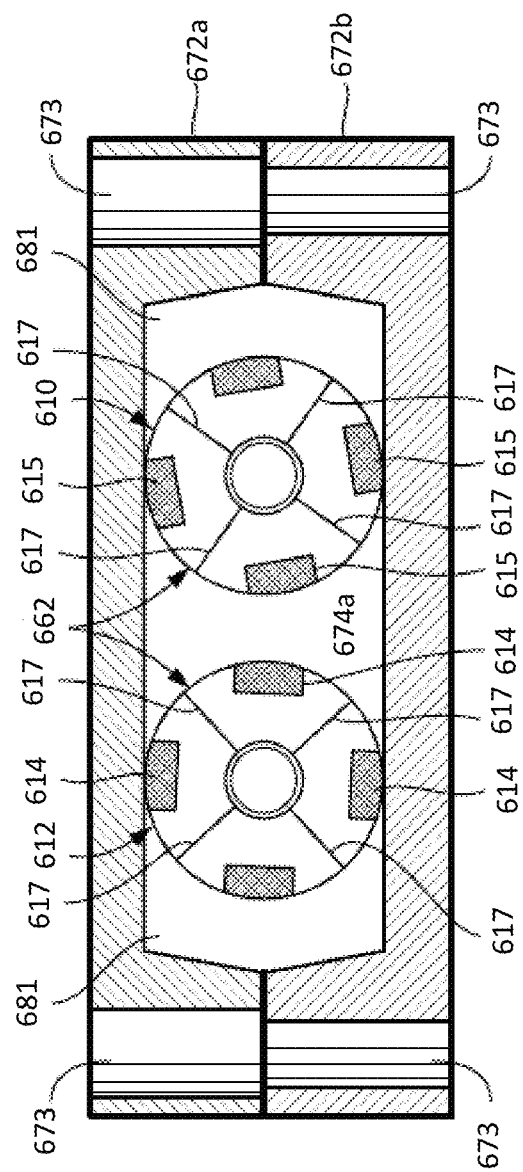

Referring now to FIGS. 6C-6E, a joint 670, which couples a pair of superconducting cables 610 and 612 to one another, may include a curved joint case or housing (or more generally a curved joining member) 672 comprising upper and lower covers (or brackets) 672a and 672b, and a curved partitioned joint 674 comprising a plurality of curved joint blocks 674a, 674b, 674c and 674d. In the example of FIG. 7D, cover 672a of curved joint case 672 has been omitted to illustrate curved partitioned joint 674 coupled to first and second superconducting cables 610 and 612 along a radius. In some embodiments in which joint case 772 comprises first and second parts, the first and second parts may be secured by fasteners (e.g., screws, nuts and bolts, rivets or other types of fasteners) disposed through holes 773 in the upper and lower covers. In some embodiments, some of holes 673 may be threaded (partially or fully threaded).

According to some embodiments, curved joint 70 may maintain continuity of the conductors 610 and 612 while reducing (and ideally minimizing) overall footprint. In some cases, each unique radii in a tokamak may have a new housing 672 having the requisite radius.

In the example of FIGS. 6C-6E, cable jackets 676 and 677 are disposed about the petals of respective ones of petals of cables 610 and 612 to structurally support the cables. Portions of cable jackets 676 and 677 are removed in the joint region to thereby expose the petals for contact with appropriately shaped joint elements (e.g., the saddle-shaped joint elements 674a, 674b, 674c and 674d). In the example of FIG. 6C-6E, the cable jacket may be provided having a square cross-sectional shape. In some embodiments, the jackets 676 and 677 each comprises steel. Referring now to FIG. 7E, superconducting cables 610 and 612 may be secured via a nut and bolt disposed in through holes 673 in respective upper and lower covers 672a and 672b to form a clamping structure. In some embodiments, other joining structures may, of course be used. For example, screws which coupled to threaded bores in the covers may be used. Alternatively, the joining means may comprise spring-type structures. Alternatively still, in some embodiments, a permanent coupling means (e.g., a welded structure) may be used to secure the superconducting cables to the partitioned cable joint and/or may be used to secure cables within a joint case. In the example of FIG. 6E, securing structures 681 help secure the cable within the joint case 672.

In some embodiments, covers 672a and 672b may comprise stainless steel. In some embodiments in which the two HTS cables are compressed into a partitioned cable joint, any clamping or holding structure capable of providing up to 40 MPa of pressure to ensure mechanical contact between the cables and the partitioned cable joint may be used.

In some embodiments, a malleable conductive material 662 (e.g., indium) is disposed on conductive mounting surfaces of the mounting regions in each joint element. In some embodiments, the conductive material 662 may be spread or otherwise disposed on conductive surfaces of the mating surface of each joint element (and ideally all conductive surfaces of the mating surface of each joint element) and preferably does not contact the insulating material. In some embodiments, the conductive material may comprise an electrically conductive metal configured as strips or lines disposed in mounting surfaces. In some embodiments, the malleable conductive material may comprise indium. In some embodiments, indium may be placed or otherwise disposed on the mounting surfaces. In some embodiments, one or more indium wires may be used. In some embodiments, a substantially pure indium wire may be used. When an indium wire is used the wire is spaced wires such that the wires can be deformed to form a conductive layer upon insertion of a cable in the mounting region. It should be noted that the conductive material can be placed in any orientation (i.e., lengthwise or crosswise or at any angle) within mounting regions. As noted above, in some embodiments, a copper wire mesh may be combined with indium to form the conductive layer. In general, the conductive layer enhances the electrical contact between the mounting surfaces of the joint elements and corresponding petals of the cables to be joined.

In some embodiments, the wire may be wrapped around each conductor (e.g., spiral wrapped around each conductor such as cables 610 and 612 and then placed in mounting regions of the partitioned joint. Upon placement of the respective cables in the mounting regions, the conductive material deforms to provide an electrically conductive layer (and ideally a conductive layer having a substantially uniform thickness). This technique holds or otherwise secures the indium in place during assembly and excess indium (i.e., those portions of the indium which are not disposed between a surface of the cable and partitioned joint mounting surfaces) is removed.

In some embodiments, the conductive material may be provided as a soft metal. For example, a metal being malleable at room temperature (e.g., temperatures in the range of about 55 F to about 90 F) may be used. The purpose here is that a soft metal should be able to be handled, molded, and then squeezed tightly between the two surfaces (i.e., a surface of the conductor to be joined and mounting surfaces) to form a continuous surface, preferably without a heat treatment process. Conductive material may be disposed on mounting surfaces or on conductors 610 and 612 such that when conductors 610 and 612 are disposed in respective ones of the mounting regions, the conductive material is disposed between a surface of the conductor (e.g., an HTS cable) and a surface of the mounting regions.

In some embodiments, a metal capable of deforming to provide a substantially uniform metal layer (and ideally a highly uniform metal layer) on a mounting surface of the mounting region is preferred. Such a substantially uniform deformation and resulting layer results in a substantially uniform contact between a surface of a conductor disposed in the mounting region and a surface of the mounting region. It should, however, be appreciated that in some embodiments a substantially uniform layer thickness is not necessarily needed since total joint resistance does not directly depend greatly upon the thickness or the layer.

In some embodiments in which wires are used, it is desirable that all of the wires (e.g., indium wires) deform in a manner which results in no gaps between the deformed wires (i.e., after wire deformation, the resulting metal should be contiguous and ideally cover the entire mounting surfaces). Thus, it is desirable to have a continuous, uninterrupted sheet or interface layer of a conductive material (e.g., indium) at the end of the process to ensure a large (and ideally the largest) contact area between surfaces of the conductor 610 and 612 and mounting surfaces of the partitioned joint.

The particular amount of pressure to use to deform the conductive materials depends upon a variety of factors including, but not limited to the materials from which the cable, saddle member and conductive material are provided in addition to the size (e.g., diameter, cross-sectional area, etc. . . . ) and configuration of the conductors being joined. In some embodiments 30 MPa of contact pressure is desired to compress conductive material 662 disposed between surfaces of the cables and mounting regions of the partitioned cable joint 630 to form a good electrical connection.

The conductive metal may be provided having any shape. For example, as noted above, conductive metal may be provided as one or more wires. The wires may be provided having any regular or irregular cross-sectional shape including, but not limited to oval, circular, rectangular, square, triangular or any other cross-sectional shape. Alternatively, conductive metal may be provided in the form of (or as a type of) a conductive paste or a conductive liquid metal. The particular type and shape of conductive metal to use is selected such that a substantially contiguous and substantially continuous contact layer exists between the conductor (e.g., one of cables 610 and 612) and mounting surfaces of the partitioned joint.

A metal which deforms to provide a contact layer results in a low resistivity path between the cable and partitioned joint. In principle, resistance of the joint will decrease approximately linearly with the available area through which the current can flow. Thus, it is desirable to cover as much of the mounting region surface area which will be in contact with the conductor to be joined as is practically possible. Ideally, once the cable to be joined is disposed in the mounting region, the interface layer covers the entire surface area of the mounting region.

In some embodiments, conductive metal could be disposed or applied (or spread) over the mounting surface of the cable rather than the mounting surfaces of the partitioned joint. In some embodiments, conductive metal could be disposed or applied (or spread) over portions of both the mounting surface of the cable and the mounting surfaces of the conductive member (e.g., the saddle member). In some embodiments, it may be necessary to heat the cable and/or the mounting surface to promote or facilitate the deformation characteristic of the metal which forms the conductive interface layer.

Having described various components that facilitate the techniques described herein for automatically removing and replacing components from a tokamak, a process of splitting a tokamak into multiple portions, separating the portions, and removing the now separate portions of the vacuum vessel from within the tokamak will now be described. In the drawings, FIGS. 7A-7F relate to acts of splitting and separating portions of a tokamak; FIGS. 11A-11F relate to acts of removing a vacuum vessel (and optionally, a blanket tank) from the tokamak; and FIGS. 15A-15D relate to acts of rejoining portions of a tokamak. Processes and components that may be employed to perform these acts, in at least some embodiments, are described below. It should be appreciated that operation of any apparatus or portion thereof described below, including but not limited to robots, robot arms, cutting devices, welding devices, skid jacks, other actuators, etc., may be performed automatically (e.g., by one or more controllers based on sensor information gathered within the tokamak hall) and/or manually by a user that is remote to the tokamak hall (e.g., by one or more controllers based on user input). Accordingly, while this method of operating an apparatus or portion thereof may not be explicitly described below in all instances, any such apparatus or portion thereof may nonetheless be operated as such. In addition, processes that are described as being performed by a single device, such as a robot, may in any suitable case be performed by multiple such robots (e.g., cutting the vacuum vessel may be described as being performed by a robot, but could instead be performed by two robots that each cut one side).

In each of FIGS. 7A-7F, FIGS. 11A-11F, and FIGS. 15A-15D, a top view and side view of the tokamak are shown. In some cases, components are shown with partial transparency so that otherwise-hidden components may be visible, for purposes of illustration. For example, in FIG. 7A, the toroidal field coils 209 are shown through the cryostat 210, but it will be understood that the cryostat may not actually exhibit the transparency shown in the drawings.

Figure 7A:
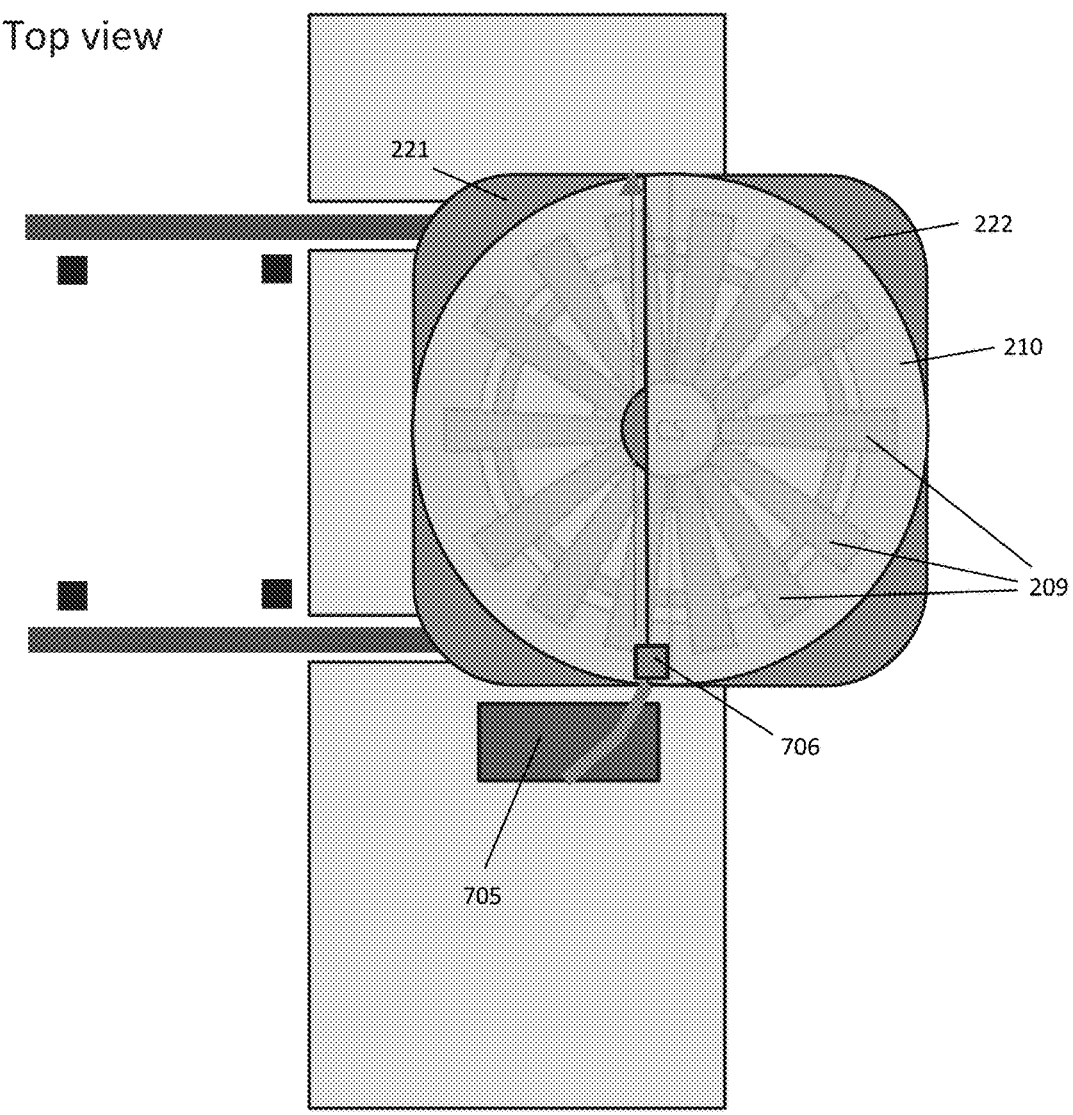
FIGS. 7A-7F depict illustrative acts of splitting and separating portions of a tokamak, according to some embodiments.
Figure 7A:
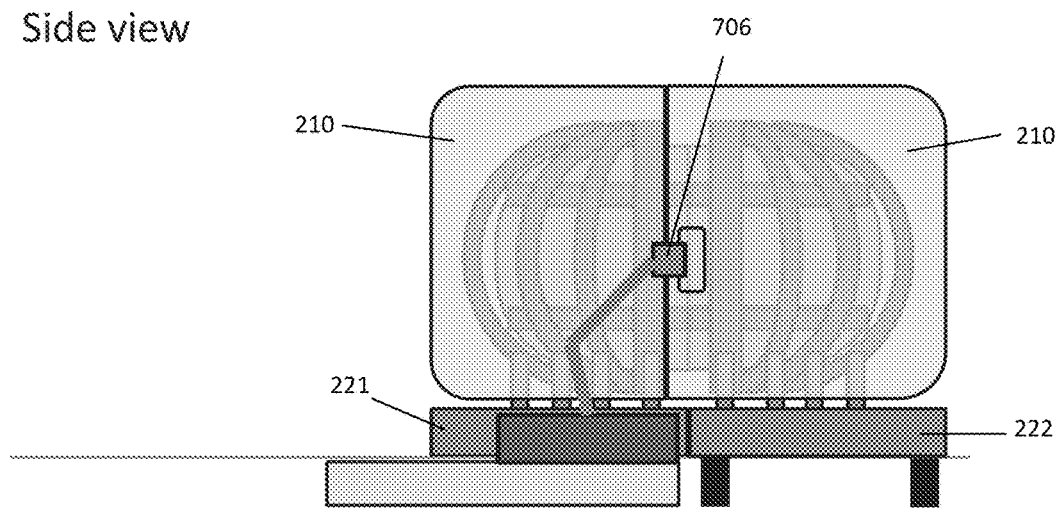

Beginning with FIG. 7A, a tokamak is depicted arranged on platforms 221 and 222, enclosed in cryostat 210, and comprising toroidal field magnets 209. A cutting robot 706 is shown being placed on the exterior of the cryostat 210 by a robot 705 having a remotely maneuverable arm. The cutting robot 706 may be operated to move around the meridional axis of the cryostat 210 (path shown as an arrow in FIG. 7A), cutting through the cryostat as it goes.

According to some embodiments, prior to initiating cutting of the cryostat in FIG. 7A, one or more preparatory tasks may be performed. Each of these tasks may be performed from a location outside of the tokamak hall (e.g., in a control center in the same building, but outside of the tokamak hall to avoid radiation exposure within the hall).

In some embodiments, the one or more preparatory tasks may include draining the blanket material from the blanket tank of the tokamak. For example, one or more valves may be controlled to drain the blanket material, leaving the blanket tank empty, or close to empty. In some embodiments, the one or more preparatory tasks may include heating ('baking') the blanket tank and/or vacuum vessel and/or performing a gas flush of the vacuum vessel to remove any residual tritium gas within the vacuum vessel. In some embodiments, the one or more preparatory tasks may include examining one or more sensor readings produced by sensors (e.g., beryllium sensors, tritium sensors) within the blanket tank and/or the vacuum vessel to determine whether the blanket tank and vacuum vessel are sufficiently clean and empty to continue with the maintenance process. In some embodiments, the one or more preparatory tasks may include cooling the vacuum vessel and blanket tank to room temperature (e.g., via active convection, passive convection, passive thermal radiation to surrounding components, or combinations thereof).

In some embodiments, the one or more preparatory tasks may include de-energizing the magnets of the tokamak, including the toroidal field magnets, the poloidal field magnets, and the central solenoid. In some embodiments, the one or more preparatory tasks may include warming the magnets of the tokamak and the tokamak's thermal shield to room temperature (whether through operating one or more heaters, or ambiently). In some embodiments, the one or more preparatory tasks may include allowing air into the cryostat, and examining one or more sensor readings produced by one or more pressure sensors in the cryostat to determine whether there is a pressure difference across the cryostat.

Returning to FIG. 7A, the cutting robot 706 may for instance comprise an orbital cutter. In some cases, the cutting robot 706 may comprise a combination orbital cutter and orbital welder, so that the same device can be used to rejoin the cryostat later in the maintenance process. According to some embodiments, the cryostat 210 may comprise a track along (or proximate to) the meridional axis of the tokamak (or cryostat) that the cutting robot may attach to and move along. In some cases the cutting robot may detach from the robot 705 after the robot 705 places the cutting robot onto the track, or instead may remain attached during its motion. The track may, for example, include one or more rails along which the cutting robot can be driven. In some embodiments, the cutting robot may collect metal debris (e.g., dust, chips) produced during cutting, since these may need to be disposed of as radioactive waste. In some embodiments, the cutting robot may include one or more cameras that produce image data indicative of whether cutting of the cryostat has been performed correctly.

Figure 8:
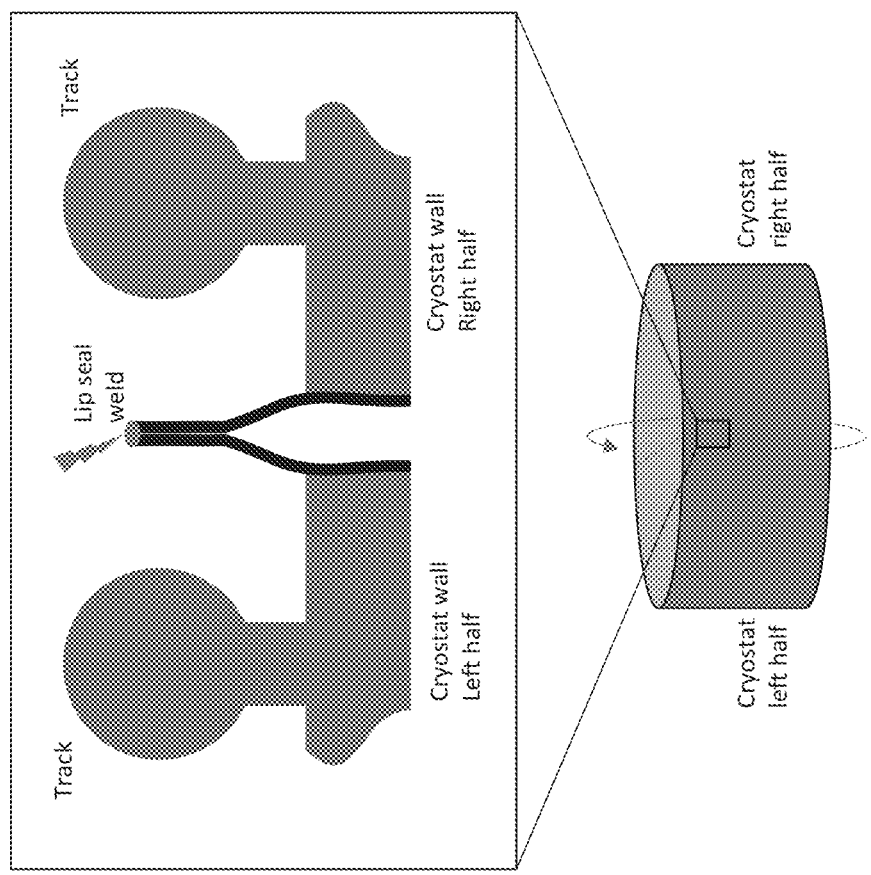
FIG. 8 depicts an example a weld of a cryostat along with a track along which a cutting or welding robot may traverse, according to some embodiments.

According to some embodiments, the cryostat may be cut along, or near to, an existing weld between halves of the cryostat. FIG. 8 depicts an example of such a weld along with a track along which the cutting robot 706 (and/or a welding robot) may traverse.

Figure 7B:
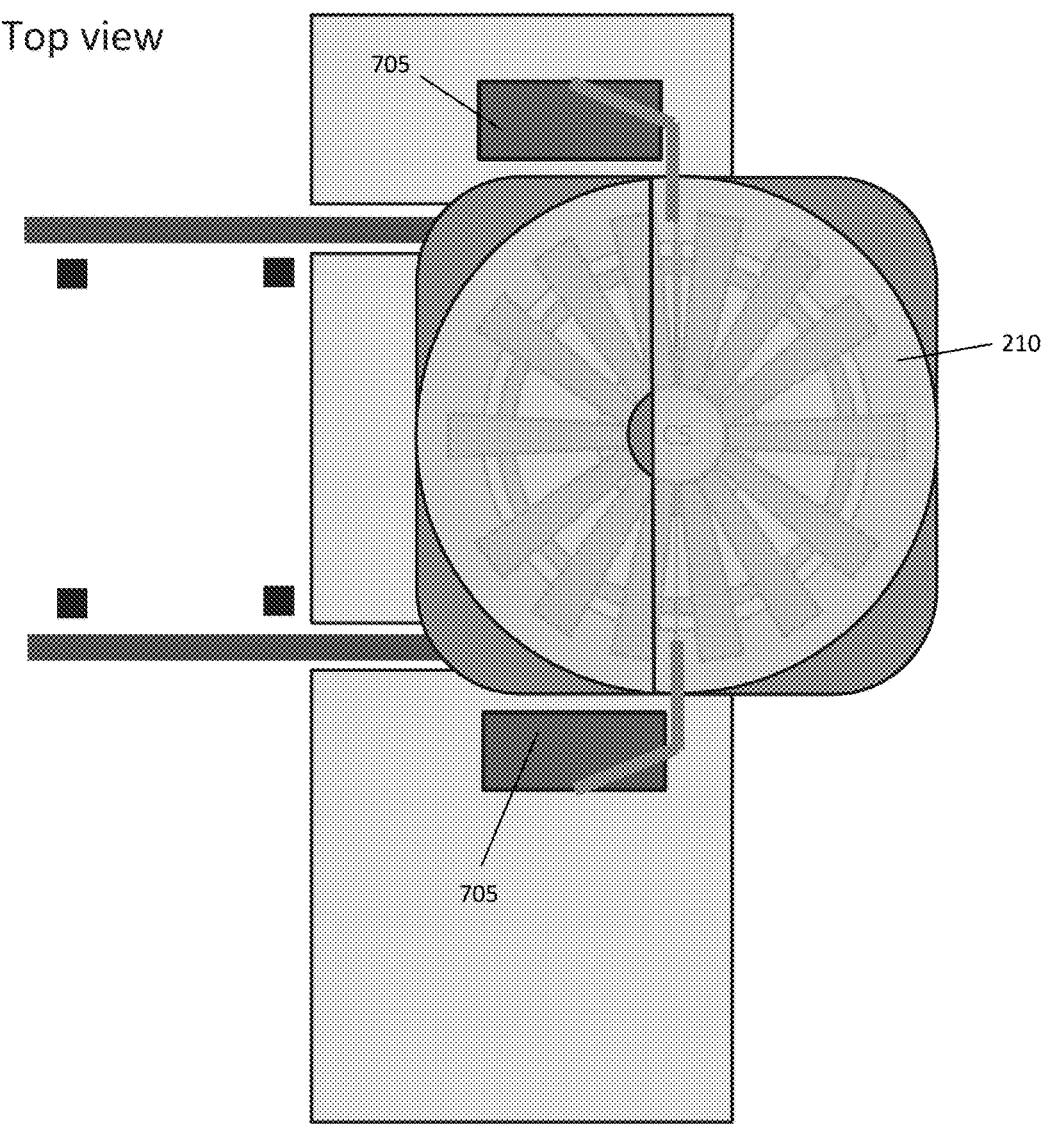
Figure 7B:
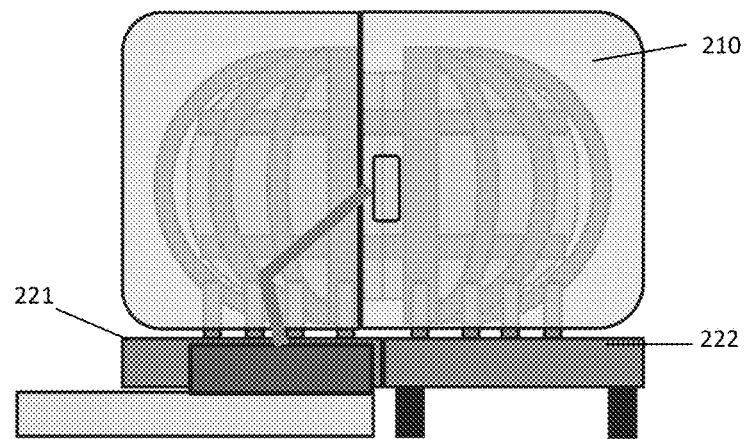

Once confirmation is produced that the cutting robot has fully cut through the cryostat (e.g., by inspection through various image capture devices on the cutting robot, on the robot arm 705, or locations in the tokamak hall, or combinations thereof), maintenance may proceed to FIG. 7B.

According to some embodiments, one or more tasks may be performed subsequent to cutting the cryostat. These tasks may include detaching any fluid and/or electrical connections between the halves of the tokamak, and unlocking joints on the poloidal field magnets (e.g., the joints described above in relation to FIGS. 6A-6E). As with other tasks performed during the maintenance process, these tasks may be performed remotely to the tokamak hall using any number of suitable remote-controllable and/or automated devices.

According to some embodiments, subsequent to cutting the cryostat, one or more thermal shields may be cut by the same or a different cutting robot(s) that cut through the cryostat. As described above, thermal shields may for instance be arranged exterior to the toroidal field coils and/or between the toroidal field coils and the blanket tank. To access the blanket tank and vacuum vessel in subsequent acts, described below, the thermal shields may be cut in the same manner as the cryostat, as described above. In some cases, the thermal shields may comprises multiple components that can be removably decoupled and coupled together, rather than being cut during this process.

According to some embodiments, before and/or after cutting the cryostat, one or more ports or other connections that provide access to the vacuum vessel and/or blanket tank from outside of the tokamak may be removed. For example, extensions of the vacuum vessel or blanket tank that protrude outwards in a space between adjacent toroidal field coils may be removed using a suitable robotic device.

Turning to FIGS. 7B, robots 705, each having a remotely maneuverable arm, are controlled to split the vacuum vessel into two portions. Either of robots 705 may be the same or a different robot that was used to cut the cryostat in the step of FIG. 7A. Each of robots 705 may cut one seam of the vacuum vessel.

In the case of the "separate" blanket tank and vacuum vessel configuration shown in FIG. 4A, cutting a seam of the vacuum vessel comprises cutting the vacuum vessel, which may be performed from either the interior of the vacuum vessel, or from within the space between the vacuum vessel and blanket tank. In the case that the vacuum vessel is to be cut into two portions from within the interior of the vacuum vessel, the robot 705 may open an access port through the blanket tank and vacuum vessel, by cutting the vacuum vessel and/or by removing one or more plugs or other removable structures to allow access into the interior of the vacuum vessel. In some cases, the robot arm may reach through an existing port in the vacuum vessel (e.g., a port within a thermal shield). Cutting of the vacuum vessel may then proceed by directing the arm of robots 705 into the vacuum vessel, to perform cutting as described below. In the case that the vacuum vessel is to be cut into two portions from the exterior of the vacuum vessel, the robots 705 may cut a door in the blanket tank and cryostat to allow the robot to reach into the blanket tank volume and access the vacuum vessel for cutting.

Figure 9A:
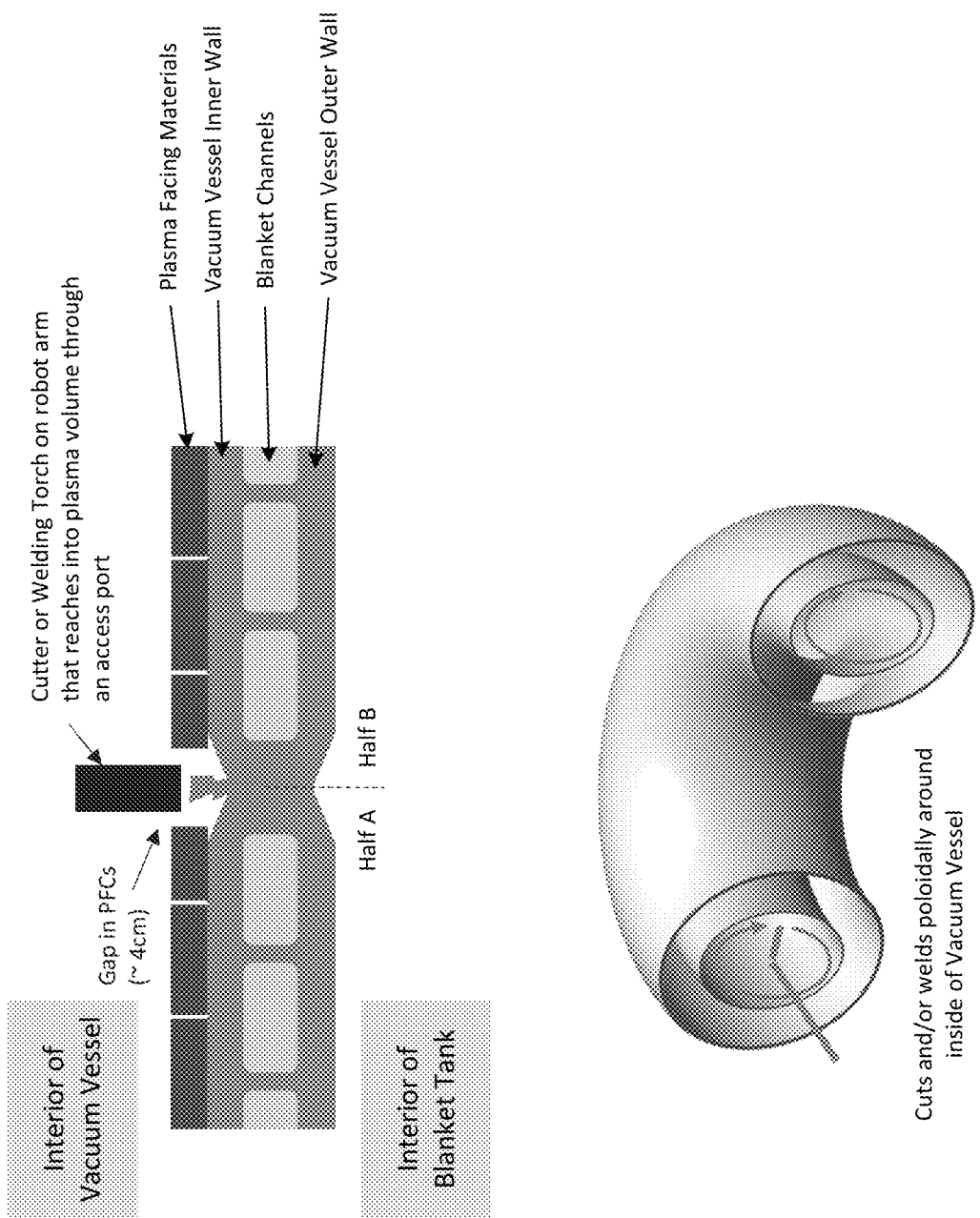
FIG. 9A depicts an illustrative example of cutting a vacuum vessel from within the interior of the vacuum vessel, according to some embodiments.

FIG. 9A depicts an illustrative example of cutting a vacuum vessel from within the interior of the vacuum vessel, according to some embodiments. In the example of FIG. 9A, a cutting torch (e.g., an oxy-acetylene torch) may be arranged on the end of an arm of robot 705 (the arm and robot are not shown in FIG. 9A). The cutting torch may be maneuvered to a cutting position on the interior of the vacuum vessel and operated to cut through the vacuum vessel along a poloidal direction as shown. As shown in FIG.

9A, the cutting torch may be positioned to cut the vacuum vessel so that the cutting occurs within a gap between portions of plasma facing materials. In some cases, for example, the plasma facing materials may include a plurality of tiles and the cutting may occur between such tiles. In some cases, the plasma facing materials additionally or alternatively include a coating or sheet applied to the interior of the vacuum vessel. According to some embodiments, plasma facing materials may include materials such as tungsten.

Figure 7C:
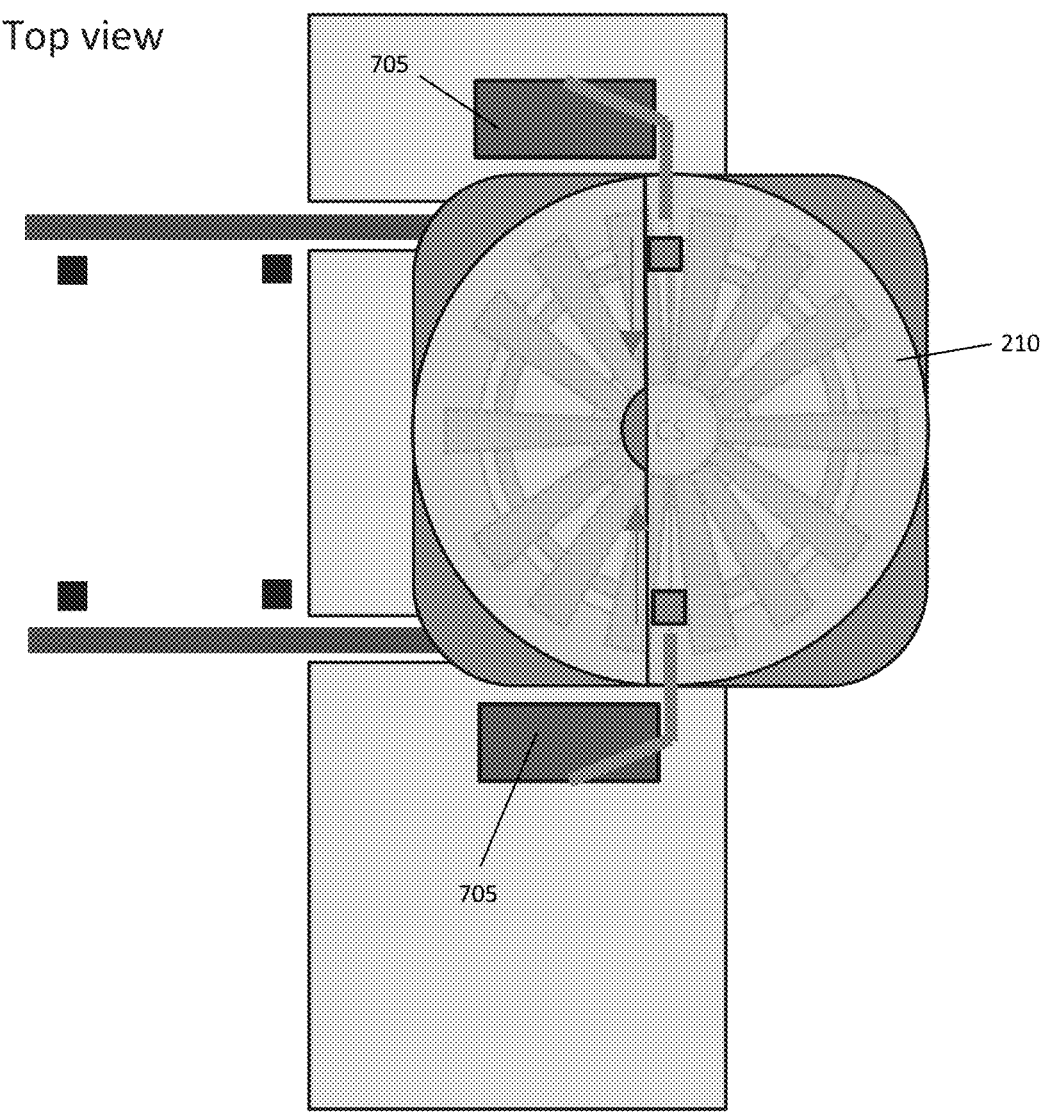
Figure 7C:
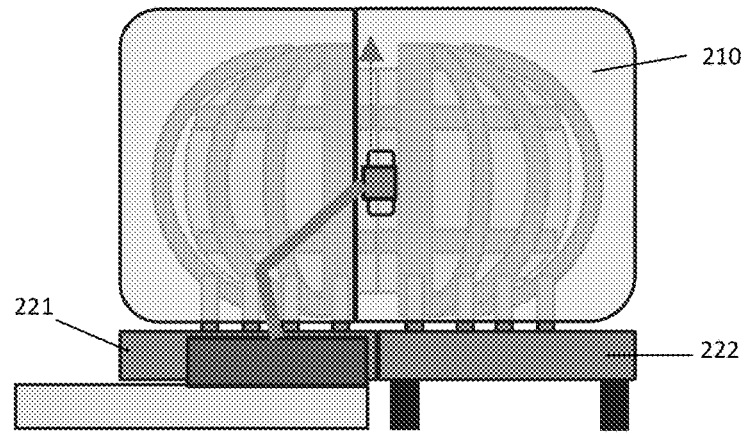
Figure 7D:
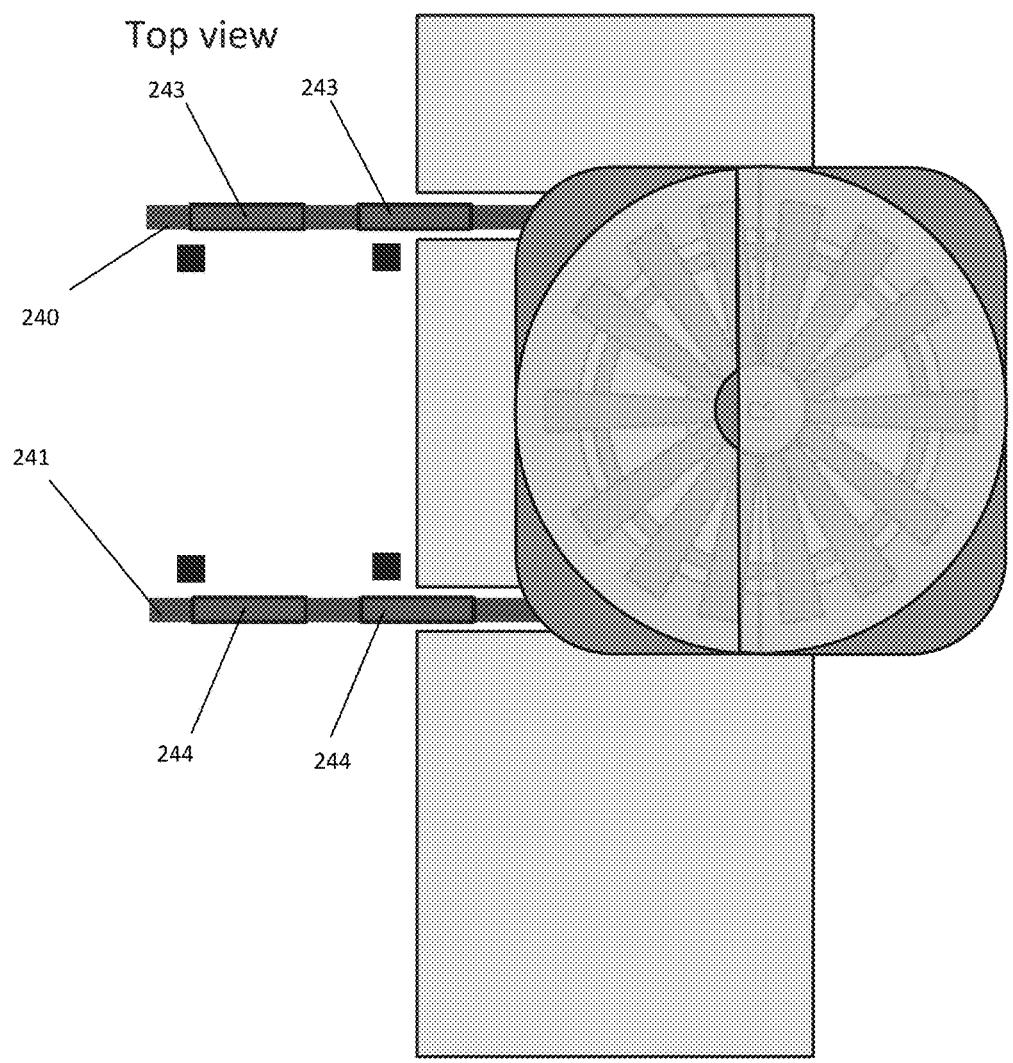
Figure 7D:
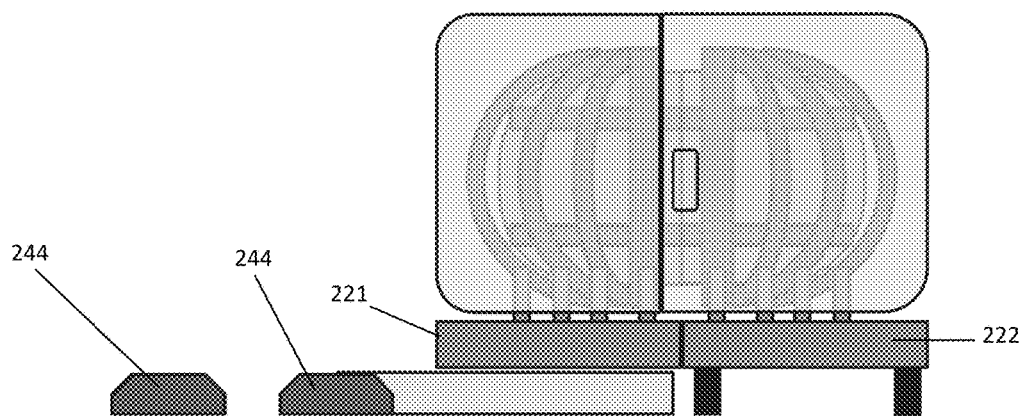
Figure 7E:
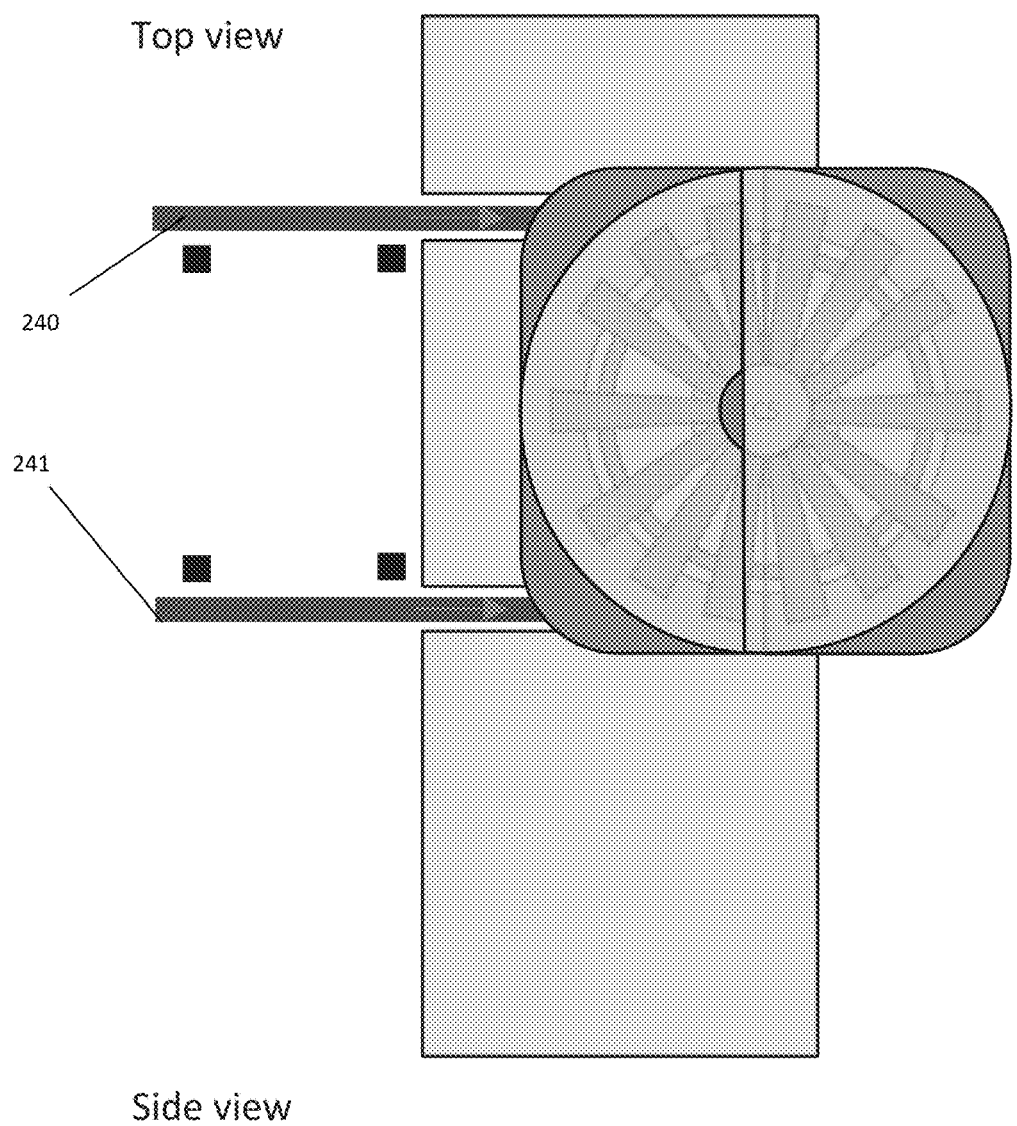
Figure 7E:
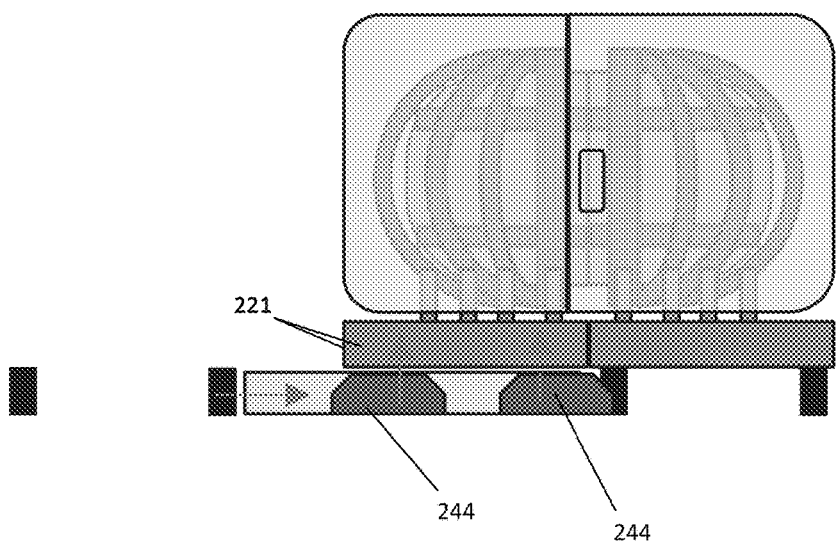
Figure 9B:
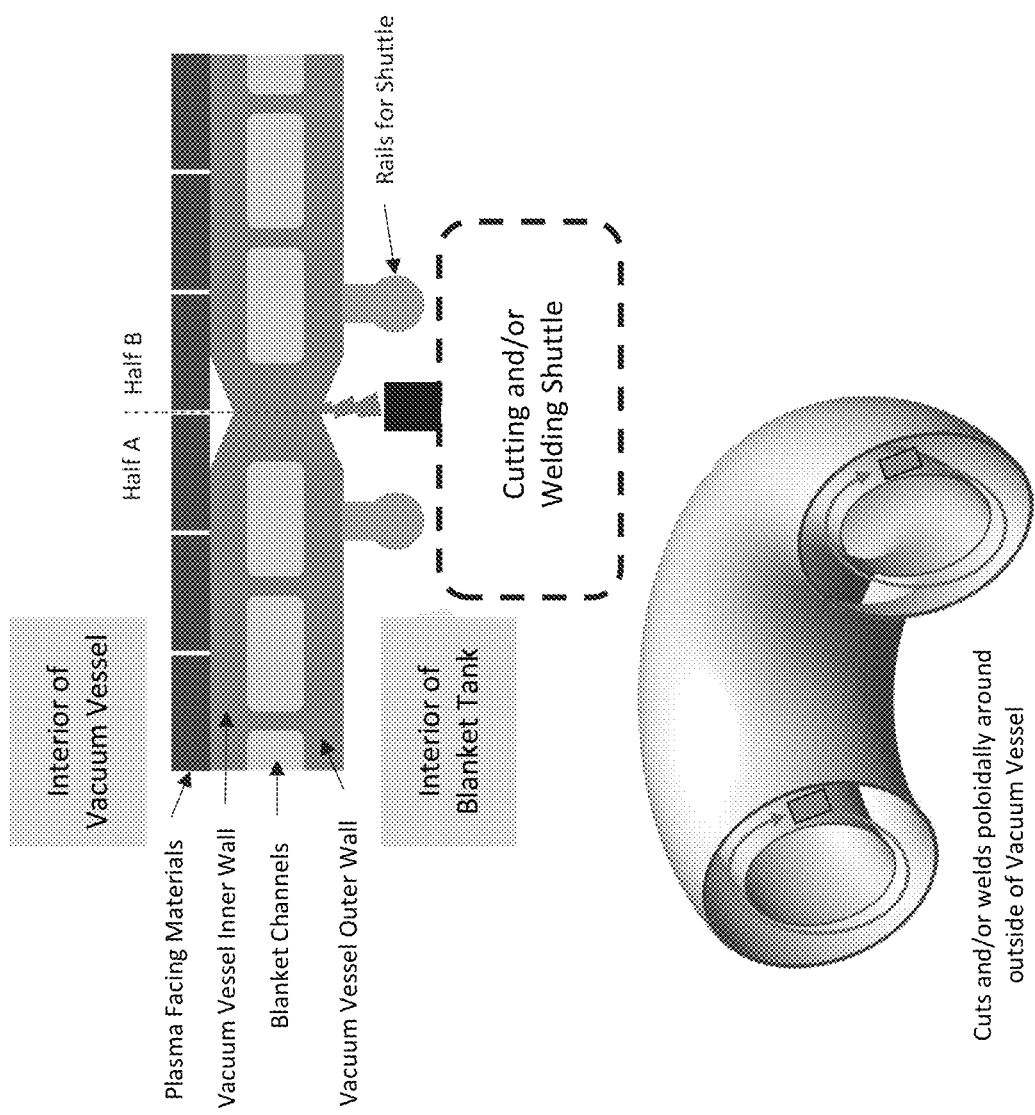
FIG. 9B depicts an illustrative example of cutting a vacuum vessel from the exterior of the vacuum vessel, according to some embodiments.

FIG. 9B depicts an illustrative example of cutting a vacuum vessel from the exterior of the vacuum vessel, according to some embodiments. In the example of FIG. 9B, a cutting shuttle may be placed by the arm of robot 705 on a pair of rails located on either side of the seam for cutting. The cutting shuttle may then be operated to traverse along the rails, poloidally around the exterior of the vacuum vessel (and in the interior of the blanket tank), while cutting the vacuum vessel. According to some embodiments, the cutting shuttle may comprise a cutting torch, such as an oxy-acetylene torch. FIG. 7C depicts an example of a robot poloidally traversing the vacuum vessel, which may occur during cutting of the vacuum vessel from its exterior, according to some embodiments. In some embodiments, the cutting shuttle may be operated to cut through the plasma facing materials (e.g., sheets, layers and/or tiles of materials such as tungsten and/or vanadium) in addition to the material (e.g., a structural alloy) that forms the vacuum vessel. Alternatively, in some embodiments, the cutting shuttle may be operated to cut through the material that forms the vacuum vessel without also cutting through the plasma facing materials by selecting a location for cutting that is aligned with a gap between portions of the plasma facing materials.

Irrespective of whether the vacuum vessel is cut from the interior or exterior of the vacuum vessel, subsequently the robots 705 may be operated to cut the blanket tank into two portions. In some embodiments, the blanket tank may comprise a pair of rails located on either side of the seam for cutting, and the arm of a robot 705 may place a cutting shuttle (whether the same or different cutting shuttle than was used to cut the vacuum vessel) onto the rails. The cutting shuttle may then be operated to cut the blanket tank while traversing along the rails, poloidally around the exterior of the blanket tank.

In the case of the "combination" blanket tank and vacuum vessel configuration shown in FIG. 4B, cutting the vacuum vessel into two portions may comprise removing fasteners holding the blanket tank and vacuum vessel portions together. For instance, in this case, the robot 705 may deploy a nut-driving shuttle as described above in relation to FIG. 4C. FIG. 7C depicts an example of a robot poloidally traversing the vacuum vessel, which may occur during automatic removal of fasteners holding portions of a combination blanket tank and vacuum vessel, according to some embodiments.

Returning to FIG. 7B, subsequent to splitting the vacuum vessel into two portions, structures that couple the toroidal field coils on one side of the tokamak to toroidal field coils on the other side of the tokamak may be decoupled, thereby mechanically detaching the toroidal field coils into two groups. According to some embodiments, this act may comprise utilizing a robot arm (e.g., an arm of a robot 705) to insert a robotic shuttle through the cryostat and onto a toroidal field coil joint. The shuttle may be operated to traverse the joint poloidally, removing fasteners along the path.

Subsequent to the acts of FIGS. 7A-7C, the tokamak may have been separated into two separate pieces, and as a result the two pieces can then be move away from one another. One illustrative way to move the halves of the tokamak is to utilize a skidding system, an example of which is depicted in FIG. 7D, according to some embodiments. In the example of FIG. 7D, skid-jacks 243 and 244 are arranged over tracks 240 and 241, respectively. The tracks may be arranged to run beneath the tokamak platforms 221 and 222 so that the skid-jacks can travel along the tracks to a position beneath one or both of the platforms.

Figure 10:
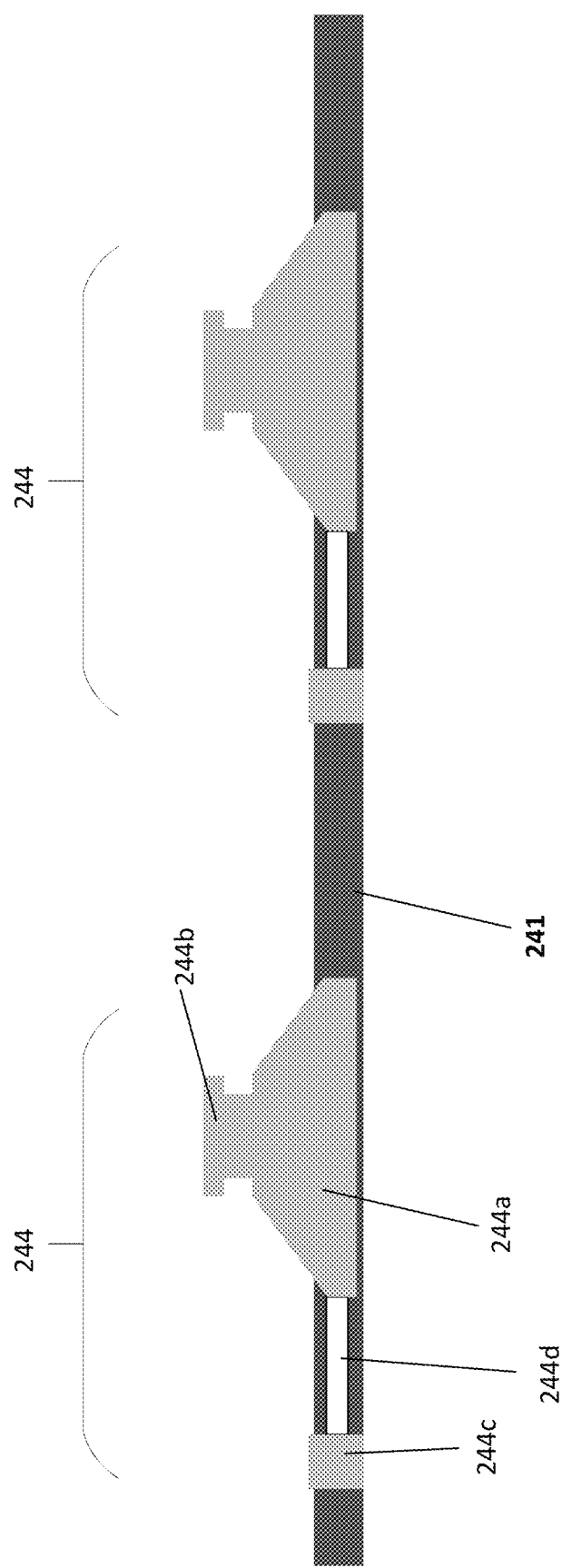
FIG. 10 depicts an illustrative example of a skid-jack system, according to some embodiments.

An illustrative example of a suitable skid-jack system is depicted in FIG. 10, according to some embodiments. In the example of FIG. 10, a pair of skid-jacks 244 are configured to travel along a track 241. Each of the skid-jacks 244 include a body 244a, and an actuatable piston 244b (e.g., a hydraulic jack) that may be (at least) raised and lowered. Each skid-jack is operable to move horizontally along the track 241 (to the right as shown in the drawing) via a mechanism which includes an actuatable piston (e.g., a hydraulic jack) 244d coupled to an element 244c. The element 244c may be configured to be lockable in a position so that, when the element is locked, extension of the piston 244d pushes the body 244a along the track. The element 244c may then be unlocked and the piston 244d retracted, the element 244c locked again and extended to move the body 244a further along the track, etc. To move the skid-jacks in the opposite direction, each skid-jack is operable to move horizontally along the track 241 (to the left as shown in the drawing) by again locking the element 244c in position and retracting the piston 244d.

In some embodiments, the skid-jacks 244 may have a smooth lower 'shoe' surface which may be formed from, or comprise, a metal (e.g., a smooth stainless-steel surface). In some embodiments, the track 241 may comprise one or more low friction surfaces on which the body 244a sits and moves, such as a plurality of PTFE blocks or a graphite surface. Alternatively, it may be desirable to arrange these components in the reverse positions since it may not be desirable to arrange certain material, such as PTFE, within the tokamak hall due to radiation exposure. For instance, the skid-jacks 244 may comprise a non-friction lower 'shoe' surface comprising PTFE and/or graphite, and the track 241 may comprise a smooth metal (e.g., smooth stainless-steel) surface on which the show of the skid-jacks sit and move.

According to some embodiments, each skid-jack 244 may be operated to move along the track 241 via a jack and ratchet mechanism. For instance, the element 244c may be locked in position by being positioned adjacent to protruding structures on the track 241. In these positions, extending the piston 244d pushes the element 244c against one or more protruding structures, causing the body 244a to be pushed away due to the track 241 being fixed in place and the body 244a having a comparatively low frictional interface with the track. As a result, the skid-jack moves in one direction (to the right in FIG. 10). To move in the opposite direction, the piston 244d may be extended just past one or more protruding structures. Retracting the piston 244d then pulls the body 244a along the track.

Returning to FIG. 7D, skid-jacks 243 and 244 may be arranged on the tracks 240 and 241. In some cases, the tracks 240 and 241 may extend out of the tokamak hall into another room (e.g., an antechamber) with a shielded door between the tokamak hall and the other room. Personnel may arrange the skid-jacks on the tracks while the door is closed, thereby providing radiation safety, then after the personnel have left, the door may be opened remotely, and the skid-jacks operated to move along the tracks into the tokamak hall. Alternatively, the skid-jacks can be moved into the tokamak hall and arranged on the tracks using a suitable automated or remotely controllable device.

As shown in FIG. 7E, the skid-jacks may be maneuvered beneath the platform 221 which supports one half of the tokamak, and the skid-jacks operated to raise the platform 221 (e.g., by extending pistons 244b on both skid-jacks in a synchronized manner). In some cases, the platform 221 may be raised by a distance of a few centimeters. In some embodiments, the tokamak hall may comprise one or more sensors (e.g., cameras, lidar surveyors, load sensors) and confirmation that the tokamak half is supported by the skid-jacks may be confirmed based on sensor data received from one or more such sensors.

Figure 7F:
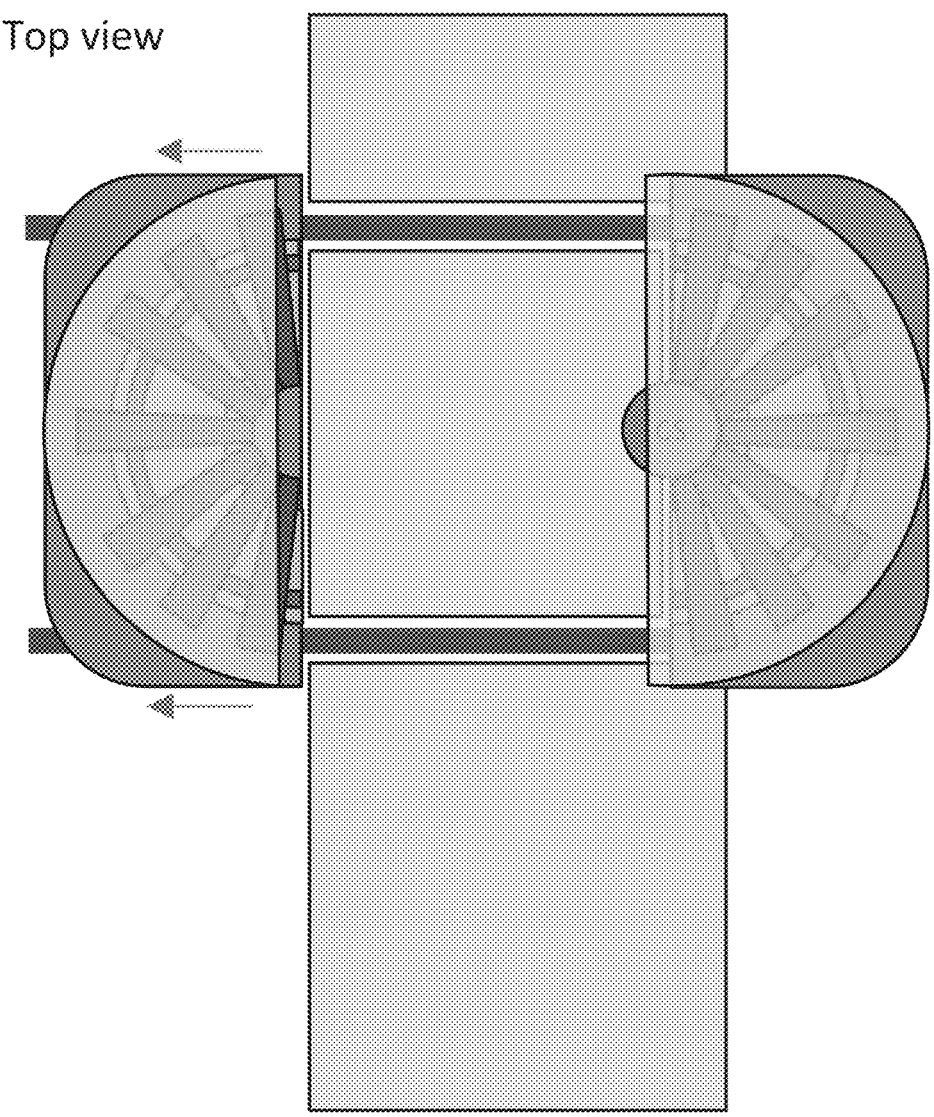
Figure 7F:
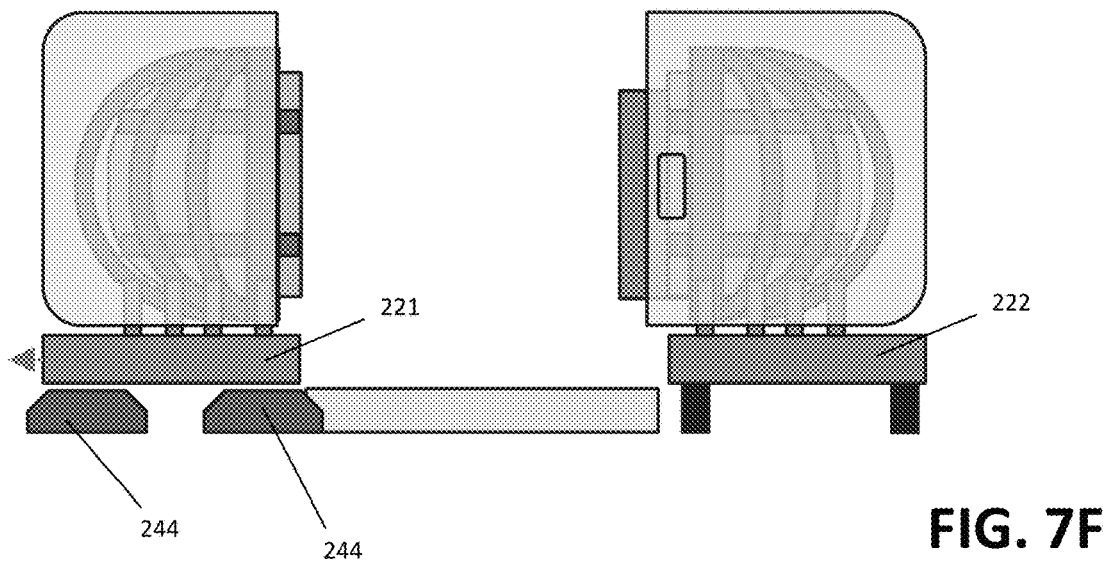

The skid-jacks may then be operated to move back along the track to separate the two portions of the tokamak, as shown in FIG. 7F.

Having described an illustrative process of splitting and separating portions of a tokamak, FIGS. 11A-11F relate to acts of removing a vacuum vessel (and optionally, a blanket tank) from the tokamak.

Figure 11A:
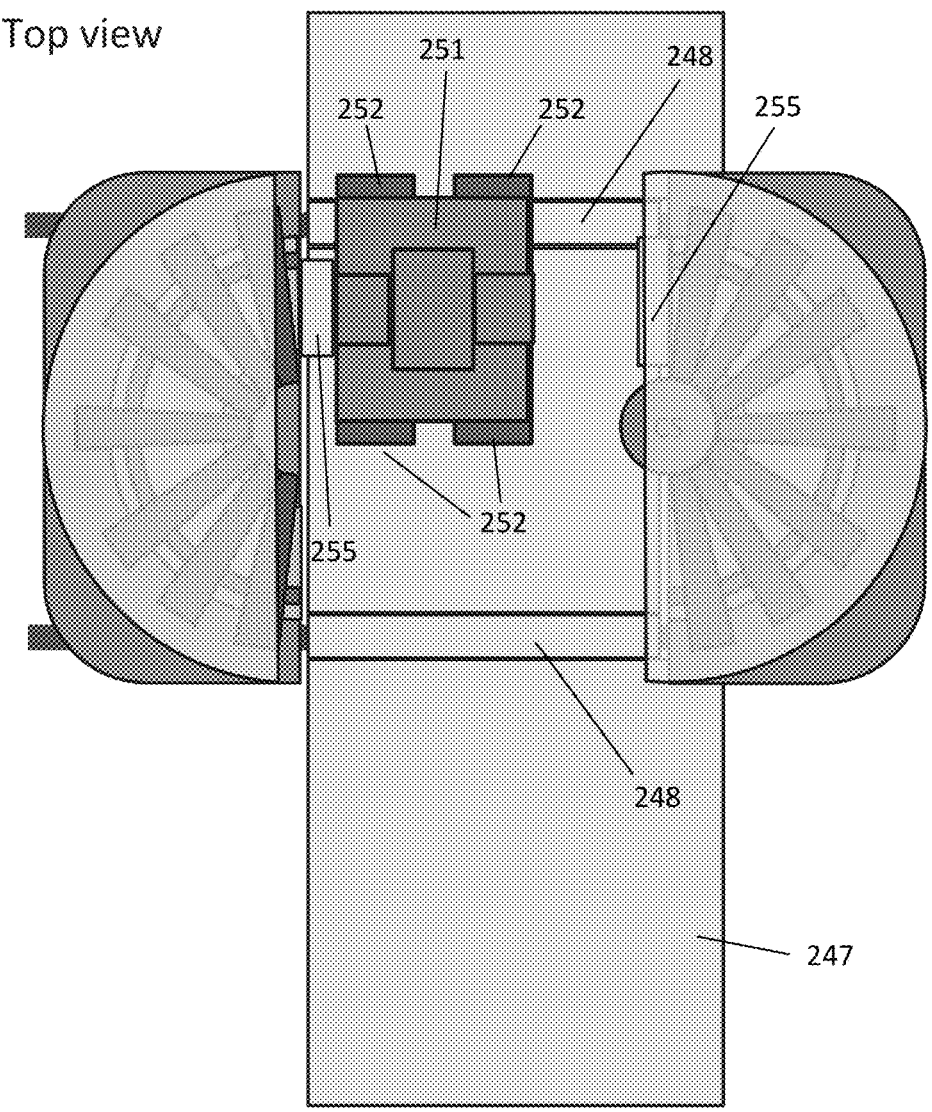
FIGS. 11A-11F depict illustrative acts of removing a vacuum vessel (and optionally, a blanket tank) from the tokamak, according to some embodiments.
Figure 11A:
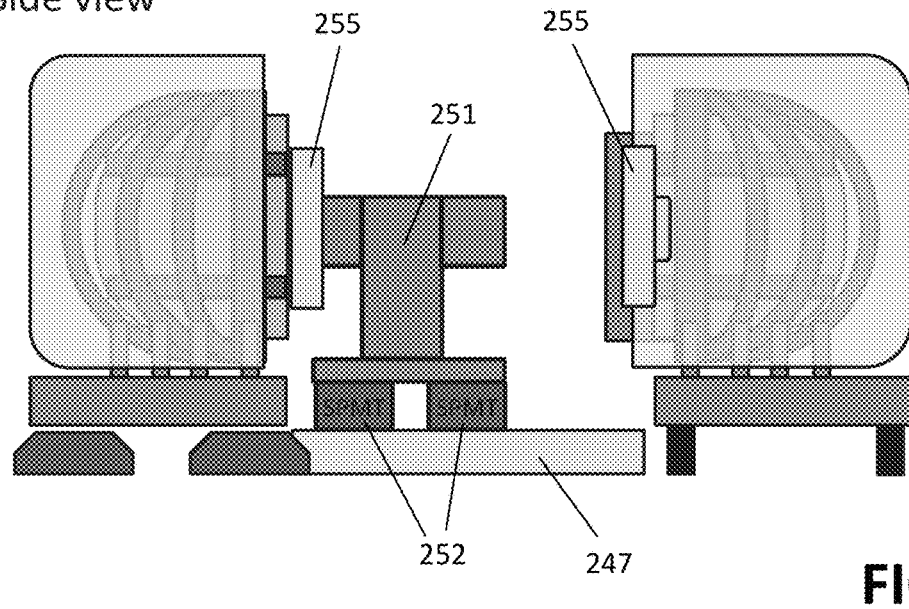

According to some embodiments, prior to removing the vacuum vessel from the tokamak portions, one or more covers may be placed over the tracks 240 and 241 (e.g., by a remotely operable manipulator vehicle). As shown in FIG. 11A, covers 248 may be placed over the tracks to provide a sufficiently flat surface that a mobile robot 251 can drive over the platform 247 (which may have a sloped ramp portion leading up to the tracks) to the tokamak portions without the robot slipping into a gap in the platform in which the tracks 240 and 241 are arranged. As described above, skid-jacks are directed along the tracks to support and move a tokamak half; however, it may be desirable for these tracks to not be exposed during movement of the vacuum vessel, and as such one or more covers (e.g., planks) may be arranged over the tracks. Alternatively, the tracks may be configured to be at the height of the platform and without sufficiently large gaps between the tracks and the platform so that no covers are necessary to ensure the mobile robot 251 can drive over the tracks and platform.

In the example of FIG. 11A, the mobile robot 251 is arranged on one or more Self Propelled Modular Transports (SPMTs) 252. An SPMT 252, as referred to herein, may comprise any mobile robot, including any modular platform vehicle with multi-directional (e.g., omni-directional) steering. The SPMT 252 may comprise a plurality of axles, such as a grid of computer-controlled axles (e.g., a plurality of axles across the SPMT and a plurality of axles along the SPMT). The axles may be independently controllable. The SPMT 252 may be configured to be operable to raise and lower a platform height (e.g., by actuating a hydraulic lift) to lift or lower a load. In some embodiments, the SPMT 252 may be configured to move the platform along any of multiple axes. For example, the SPMT 252 may be configured to move the platform with six degrees of freedom, e.g., along x- and y-axes and rotating in a yaw direction using torque vectoring and/or swivel wheels; and along the z-axis and rotating in roll and pitch directions using differential raising of the platform.

Before removal of the vacuum vessel portion from the tokamak portion, it may be beneficial to enclose the vacuum vessel portion's volume to, for example, prevent tritium escaping from the inside of the vacuum vessel and contaminating the facility, and/or to provide shielding of radioactive material within the vacuum vessel. As shown in FIG. 11A, the mobile robot 251 may be driven via one or more SPMTs 252 (e.g., driven by a remote pilot) to an opening of the vacuum vessel, and operated to place a cap 255 over the opening of the vacuum vessel. In some embodiments, alignment of the cap with the vacuum vessel may be provided by motion of the SPMT 252 to arrange the platform of the SPMT at a desired position and orientation, thereby arranging the portion of the mobile robot 251 holding the cap at a desired position. Caps may be placed on both openings on both portions of the vacuum vessel (four caps total). The mobile robot 251 may be operated to collect one or more of the caps 255 from outside of the tokamak hall and carry the one or more caps to the tokamak portion as shown. The caps 255 may weight, for example, around 100 tons each. In some embodiments, a cap may comprise one or more mechanical fasteners, such as pins, hook, detents, or combinations thereof, that may be coupled to suitable structures on the vacuum vessel to cause the cap to attach to the vacuum vessel.

Figure 11B:
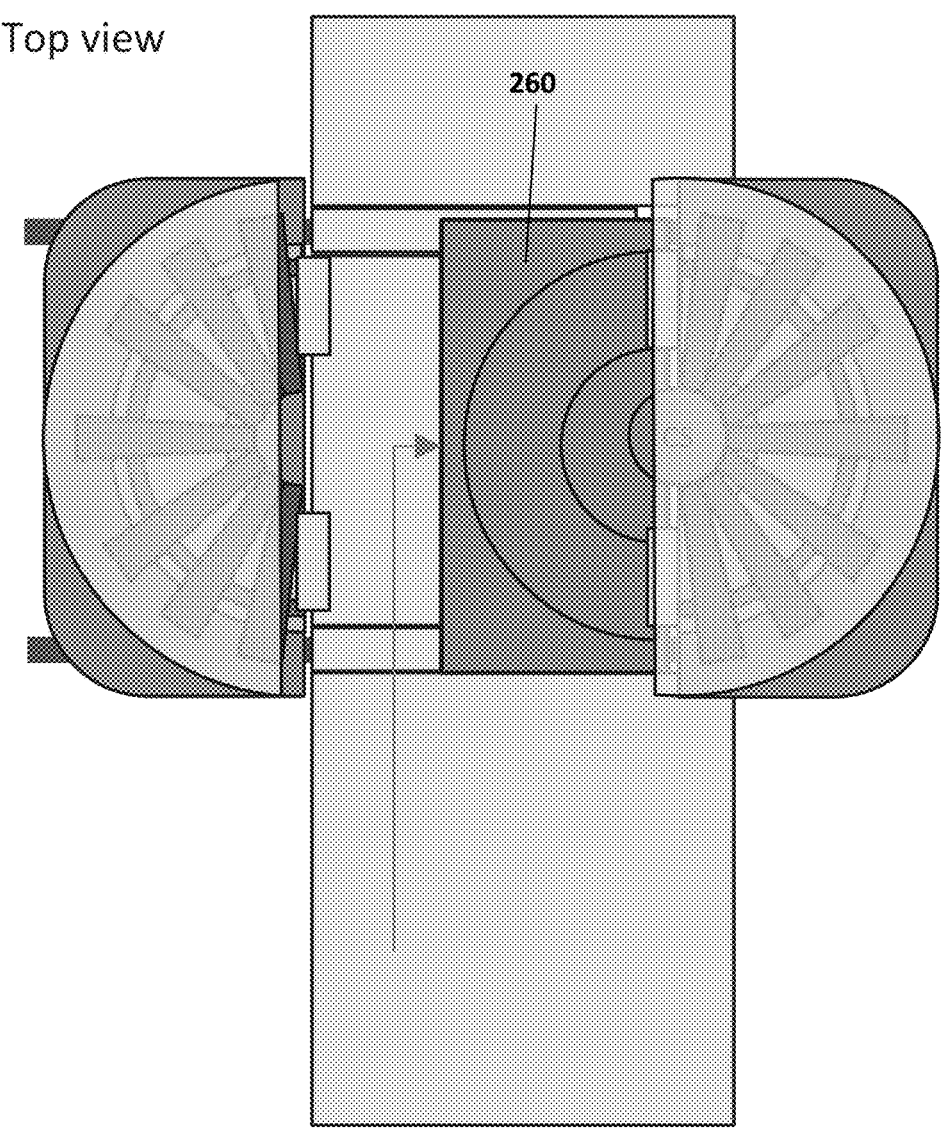
Figure 11B:
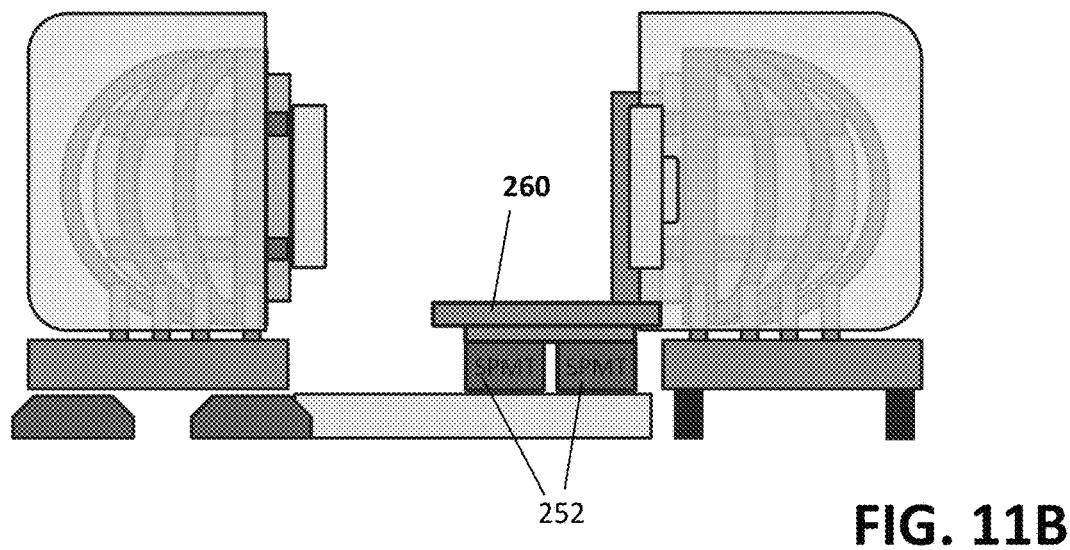

Subsequent to attaching the caps to the vacuum vessel, a transport robot 260 arranged on one or more SPMTs 252 is driven adjacent to a portion of the tokamak, as shown in FIG. 11B. The SPMTs may be operated to maneuver the combination of SPMTs 252 and robot 260 to the appropriate position. The SPMTs 252 in FIG. 11B may be the same or different SPMTs as were used to cap the vacuum vessel in FIG. 11A. The transport robot 260 is configured to remove a vacuum vessel portion from the tokamak (or a portion of a combined vacuum vessel and blanket tank in the case of the "combination" design described above). The SPMTs may then be operated to carry the portion of the vacuum vessel (or combined vacuum vessel and blanket tank) away from the tokamak. The transport robot 260 may also be configured to insert a new vacuum vessel portion into the tokamak (or a new portion of a combined vacuum vessel and blanket tank in the case of the "combination" design).

At a high level, the transport robot 260 comprises a semi-annular platform (also referred to herein as a plate) arranged over a plurality of rollers. The transport robot 260 is controllable to rotate the semi-annular platform about its center and over the side of the body of the robot. The platform may be positioned so that it slides beneath the vacuum vessel portion (or portion of the combined vacuum vessel and blanket tank) when rotated as such. The transport robot 260 may comprise one or more actuatable devices that can be raised to support a load (e.g., one or more jacks) on the semi-annular platform. When the platform is slid beneath the vacuum vessel portion (or portion of the combined vacuum vessel and blanket tank), the actuatable devices may be raised to support the vacuum vessel portion (or portion of the combined vacuum vessel and blanket tank). The semi-annular platform may then be rotated back over the body of the transport robot 260, thereby extracting the vacuum vessel (or combined vacuum vessel and blanket tank) from the tokamak portion.

Figure 12A:
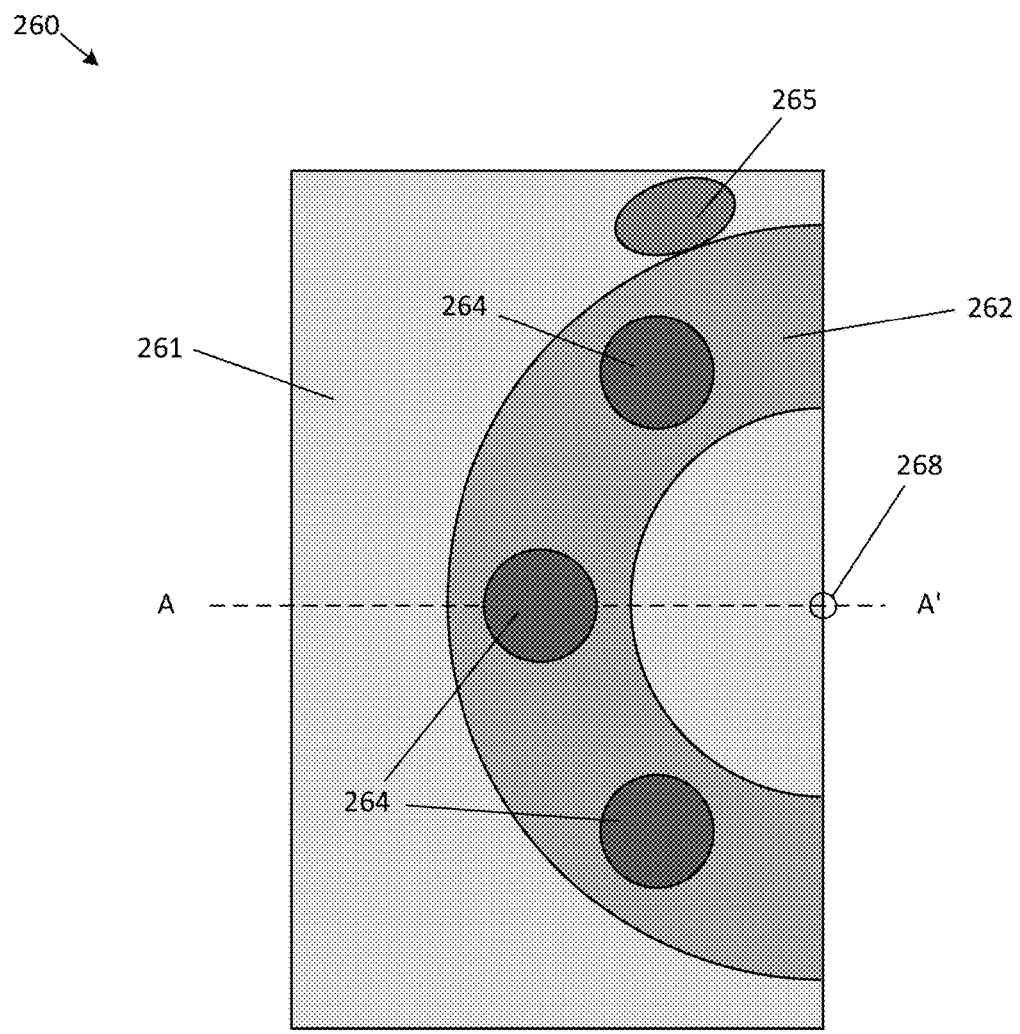
FIG. 12A depicts an illustrative implementation of a transport robot, according to some embodiments.
Figure 12A:
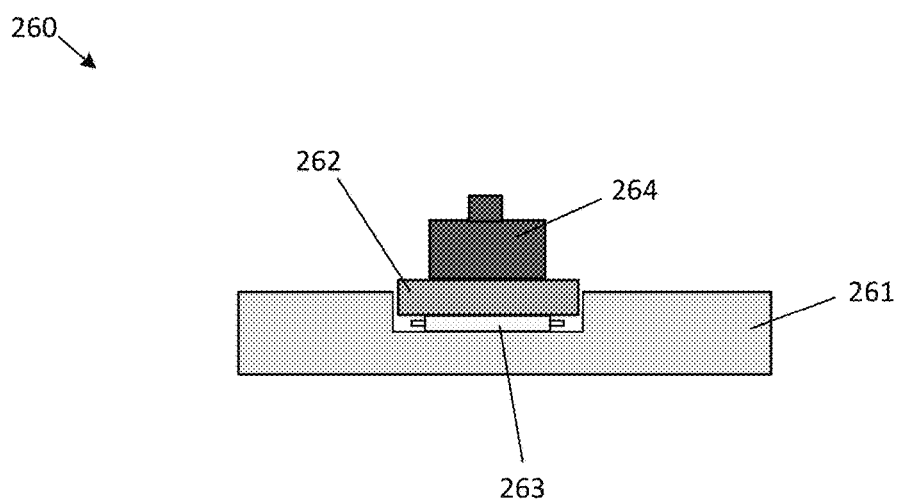

FIG. 12A depicts an illustrative implementation of a transport robot 260, according to some embodiments. In the example of FIG. 12A, a top view of the robot 260 is shown in the upper part of the drawing, and a cross-sectional view through the cross-section A-A' identified in the top view is shown in the lower part of the drawing. Robot 260 includes a base portion 261 which may be arranged on one or more SPMTs, as shown and described above in relation to FIG. 11B. Semi-annular platform (or semi-annular plate) 262 is arranged within a semi-annular groove within the base portion 261, with a plurality of rollers 263 arranged between the base portion and the platform 262. The semi-annular platform may be rotated about its center (that is, about the axis 268) by operating an actuator 265, which produces rotation of the semi-annular platform. Examples of suitable actuators are described below. Three jacks 264 are arranged on the platform 262, with one of the jacks shown in cross-section in FIG. 12A (although in general any suitable number of jacks may be arranged on the semi-annular platform).

According to some embodiments, the rollers 263 may be coupled to the semi-annular platform 262 so that when the semi-annular platform rotates about the axis 268, the rollers also move with the semi-annular platform and into a portion of the tokamak. Alternatively, the rollers 263 may be coupled to the base 261 so that when the semi-annular platform rotates about the axis 268, the rollers 263 remain in place on the base and the semi-annular platform is received by another suitable low friction surface (e.g., low friction skid pads comprising, or formed from, PTFE or graphite) within the portion of the tokamak. Moreover, it may be appreciated that the rollers 263 may be replaced with other low-friction surfaces, such as low friction skid pads comprising, or formed from, PTFE or graphite, which may be coupled to the semi-annular platform 262.

In some implementations, contrary to the example of FIG. 12A, the base 261 may have a flat upper surface and the semi-annular platform 262 and rollers 263 arranged on the flat upper surface, with one or more guidance elements restricting the motion of the semi-annular platform as it rotates.

Figure 12B:
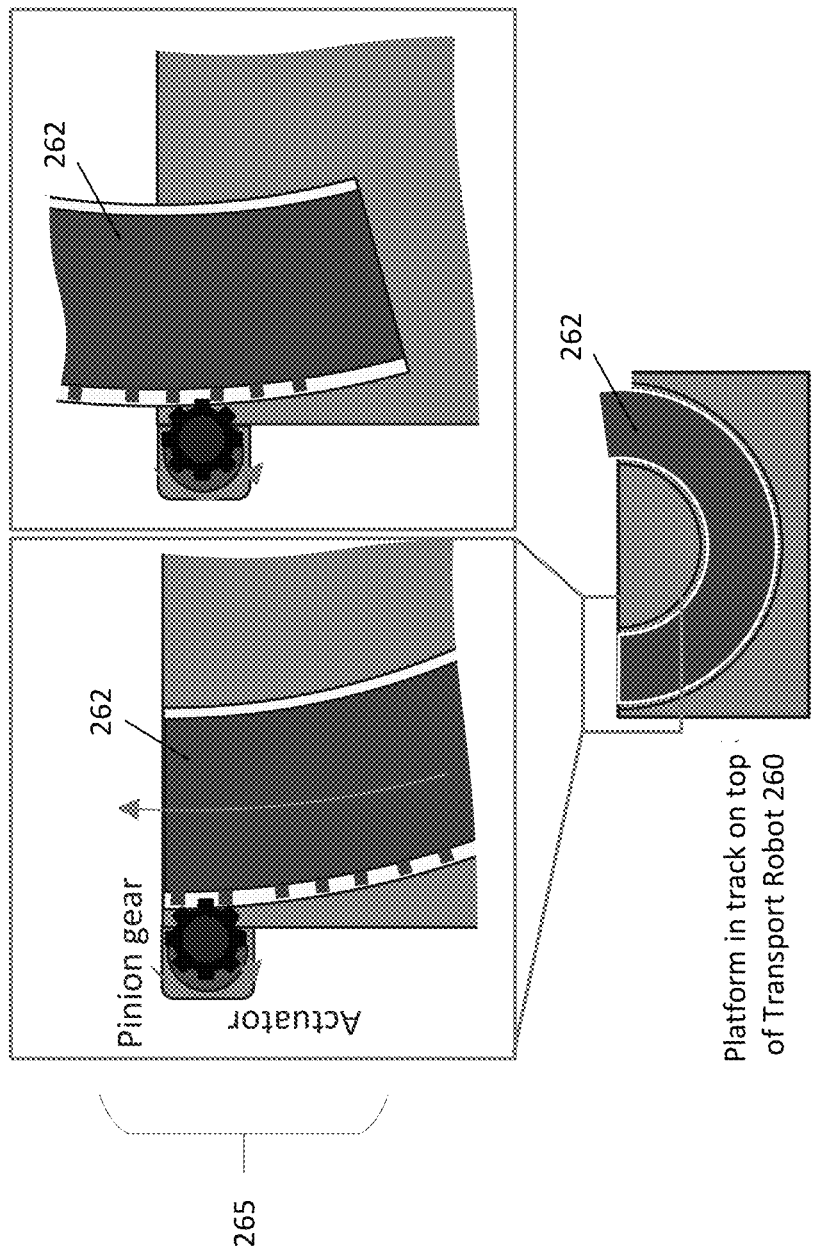
FIGS. 12B-12C depict illustrative actuatable mechanisms suitable for rotating a platform of a transport robot, according to some embodiments.
Figure 12C:
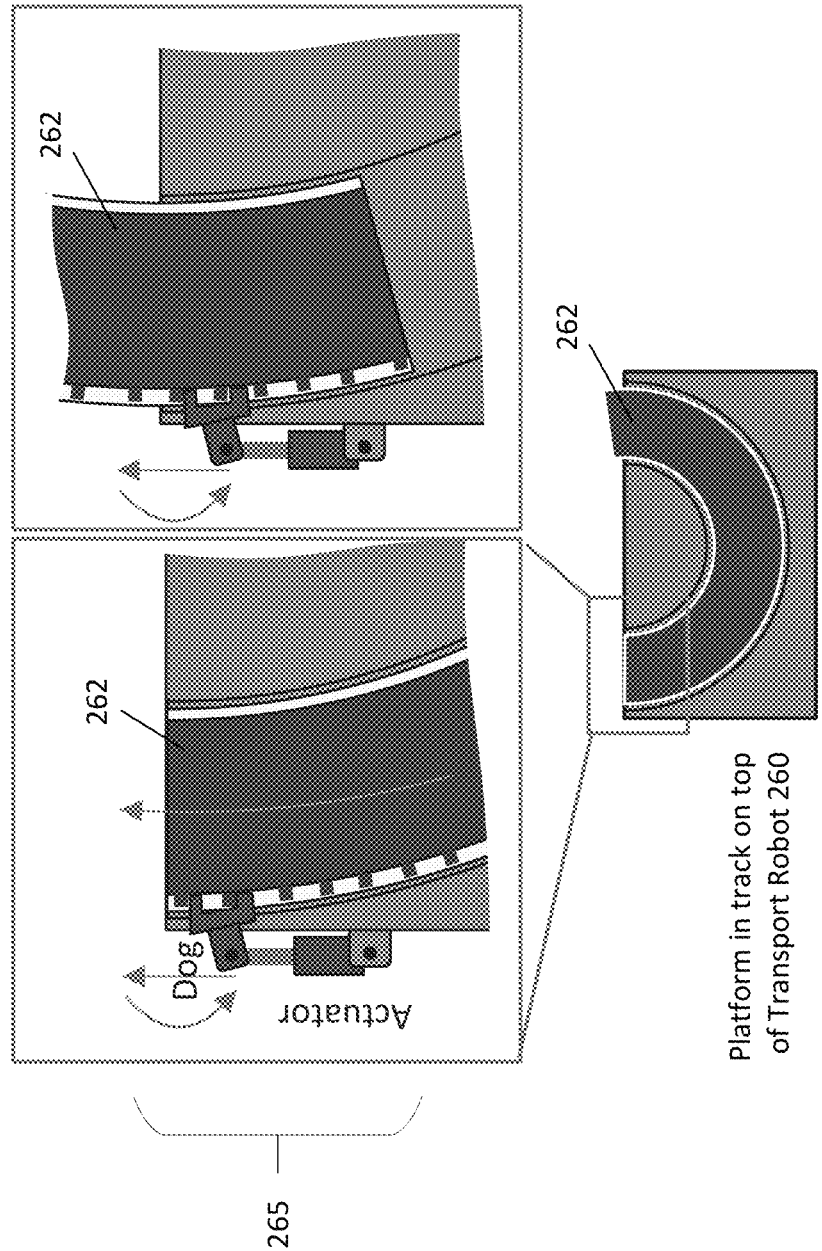

According to some embodiments, the semi-annular platform 262 may comprise a plurality of teeth that engage with a mechanism within the actuator 265 to produce rotation of the semi-annular platform. One such mechanism is depicted in FIG. 12B, which shows an actuatable pinion gear that couples to the teeth on the semi-annular platform 262. In this example, the actuator 265 comprises an actuatable pinion gear that, when operated, rotates the semi-annular platform via a rack and pinion mechanism. Another example is shown in FIG. 12C, which shows an actuatable dog that couples to the teeth on the semi-annular platform 262. In this example, the actuator 265 comprises an actuatable dog that, when operated, moves back and forth to rotate the semi-annular platform.

According to some embodiments, the transport robot 260 comprises one or more alignment features that are configured to mate with complementary features on the tokamak so that proper alignment of a vacuum vessel portion may be produced and/or detected for insertion of the vacuum vessel portion into the tokamak.

Figure 12D:
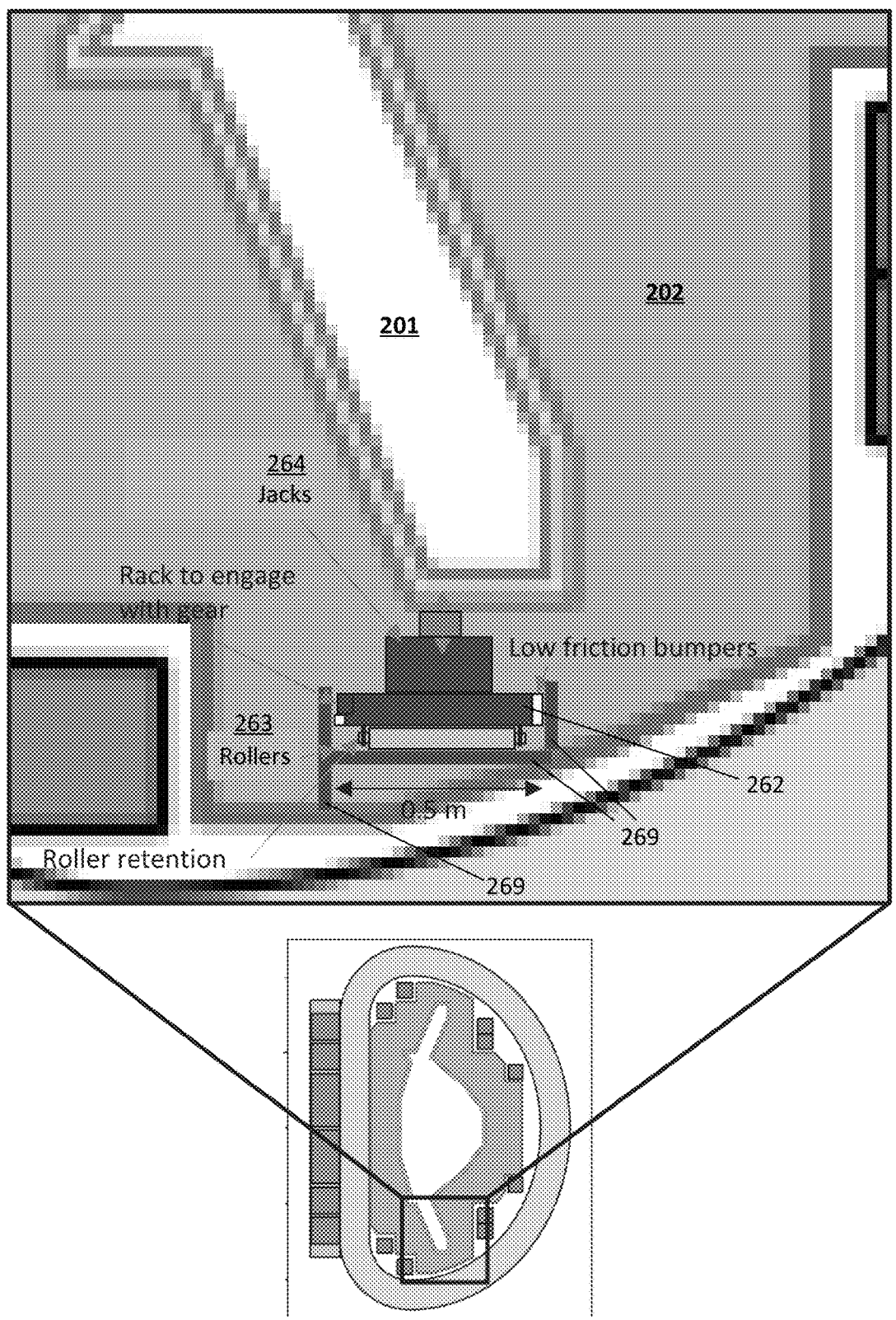
FIG. 12D depicts a semi-annular platform of a transport robot inserted into a portion of a tokamak, according to some embodiments.

FIG. 12D depicts the semi-annular platform 262 of transport robot 260 inserted into a portion of a tokamak, according to some embodiments. In the example of FIG. 12D, the semi-annular platform 262 has been rotated into a portion of a tokamak beneath vacuum vessel 201 and within the blanket tank 202. In the example of FIG. 12D, the semi-annular platform 262 is coupled to rollers 263, which move into the portion of the tokamak with the semi-annular platform as described above. The tokamak comprises walls 269 which constrain the motion of the semi-annular platform within the tokamak, to guide the semi-annular platform to a desired position beneath the vacuum vessel 201. Once beneath the vacuum vessel, the jacks 264 may be raised to support the weight of the vacuum vessel.

As described above, the vacuum vessel may be supported by a plurality of struts that may be decoupled from the vacuum vessel to provide clearance to remove the vacuum vessel from the tokamak. In some embodiments, once the vacuum vessel is supported by the jacks 264, such supports may be decoupled, thereby allowing the semi-annular platform 262 to rotate back over the body of the transport robot 260.

According to some embodiments, one or more toroidal field coils of a tokamak may comprise a track that provides a space into which the semi-annular platform 262 may be moved. Such a track may for instance be formed within the housing of one or more toroidal field coils. An example of such a track is depicted in each of FIGS. 13 and 14, which each shows a track built into a toroidal field coil housing that guides a semi-annular platform 262 when removing a portion of a combination vacuum vessel and blanket tank from a portion of the tokamak.

Figure 14:
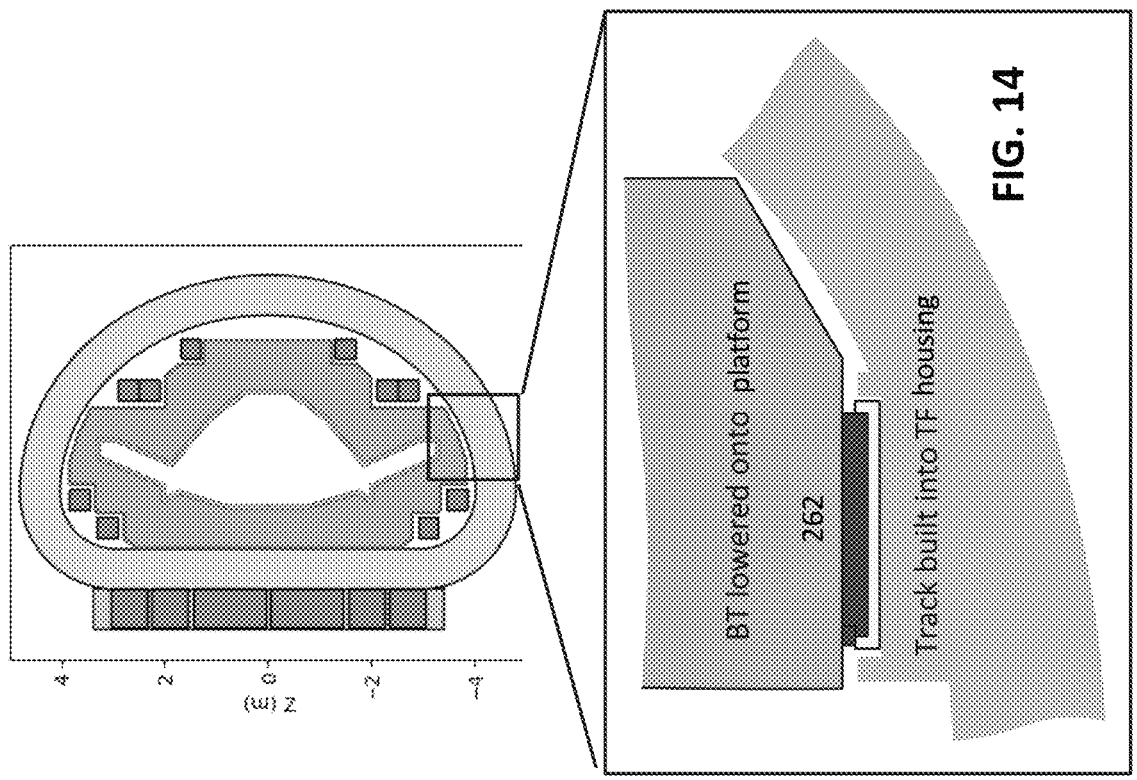
FIG. 13 and FIG. 14 each depicts a track built into a toroidal field coil housing, according to some embodiments.
Figure 13:
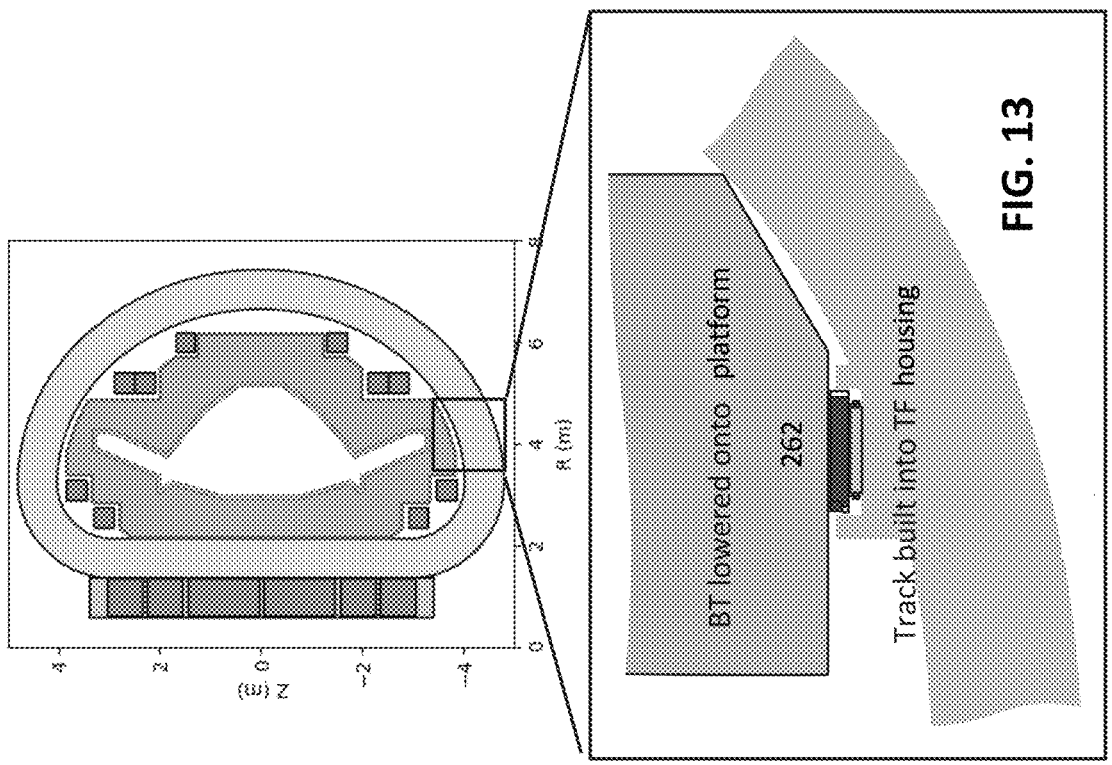

In the example of FIG. 13, the semi-annular platform 262 is coupled to rollers which roll into the grooved track built into the toroidal field (TF) coil housing as shown. In the example of FIG. 14, the semi-annular platform 262 is coupled to a low-friction surface that moves over a grooved track built into the toroidal field (TF) coil housing (or alternatively the semi-annular platform 262 moves over a grooved track built into the TF coil housing that includes a low-friction interior surface). In both cases, the blanket tank (BT) may then be lowered onto the semi-annular platform (and/or jacks on the semi-annular platform raised to meet the tank).

Figure 11C:
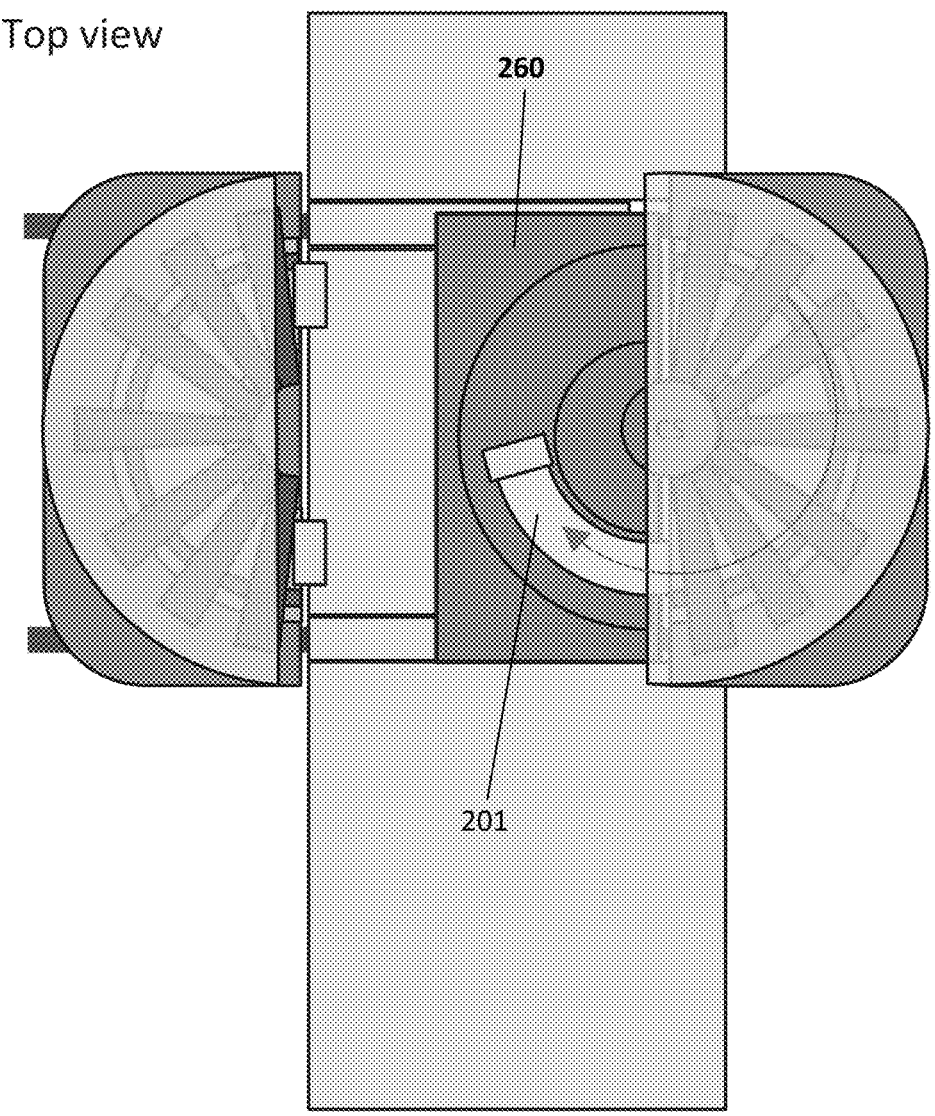
Figure 11C:
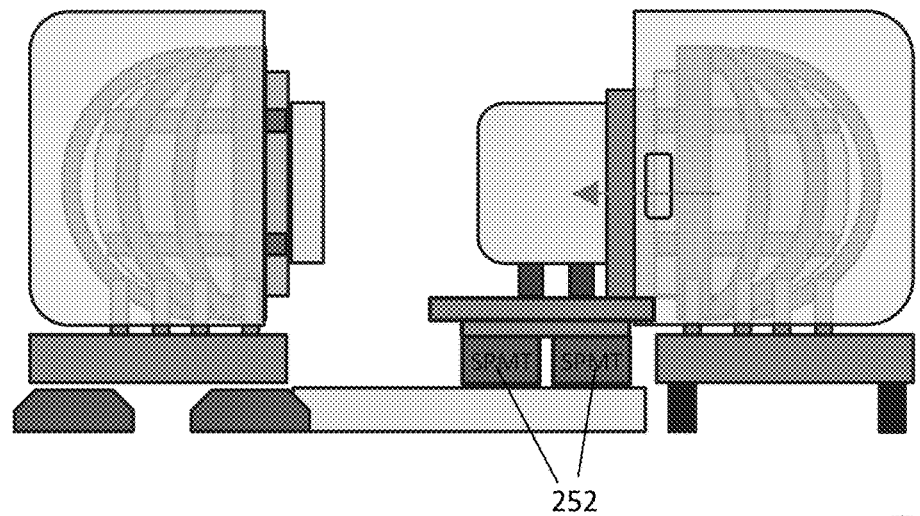
Figure 11D:
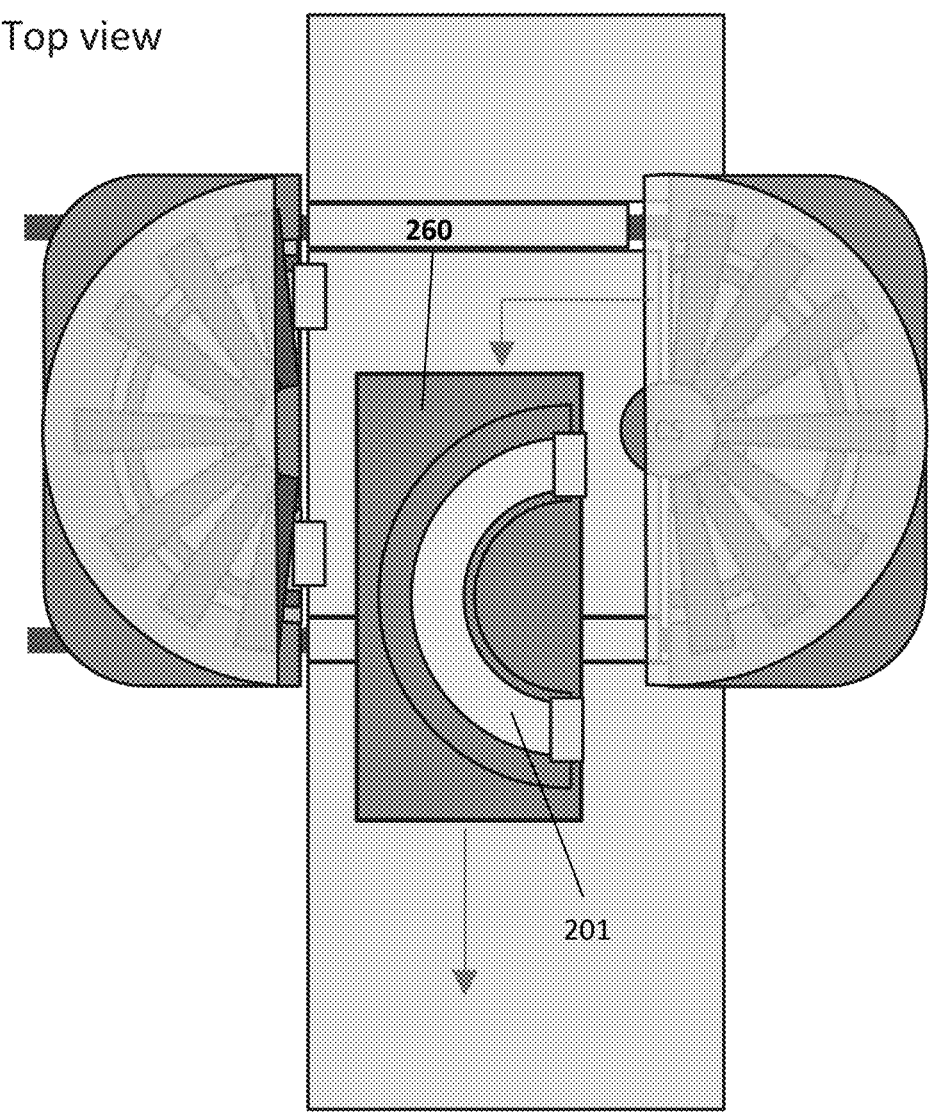
Figure 11D:
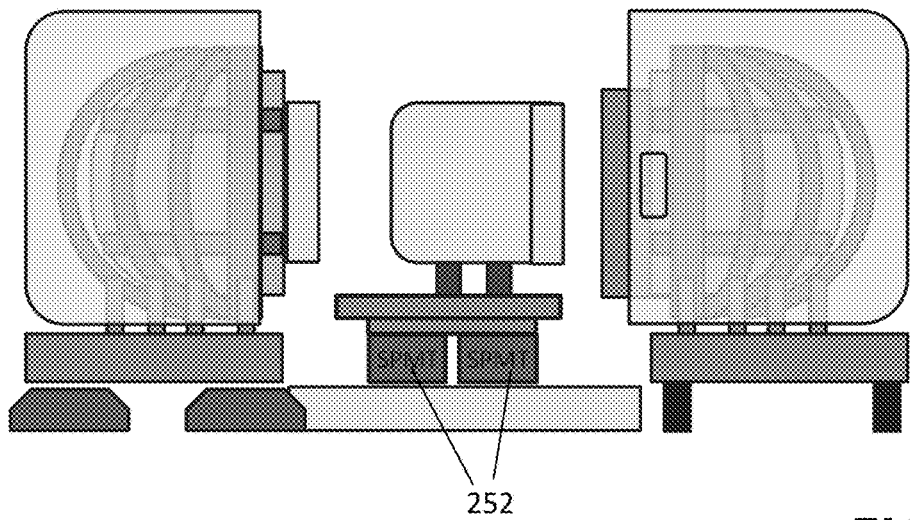
Figure 11E:
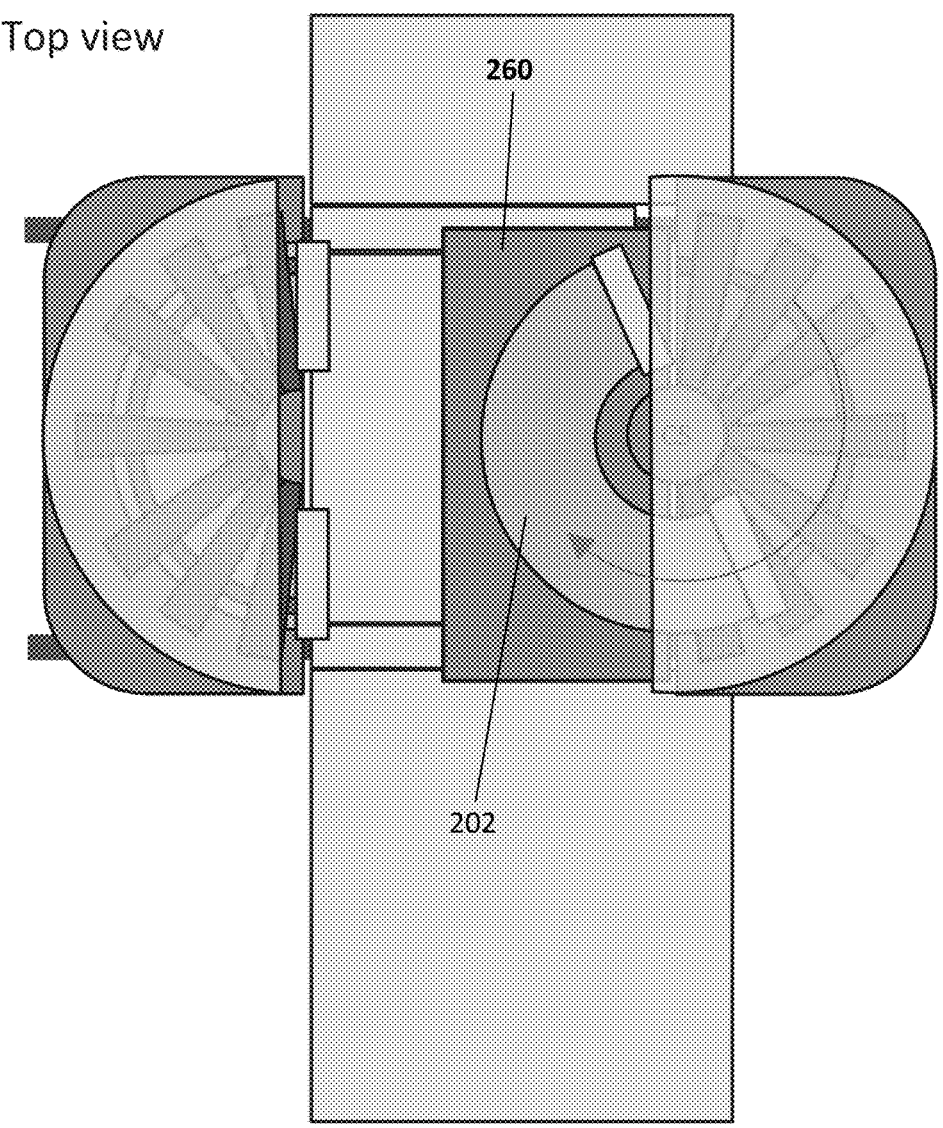
Figure 11E:
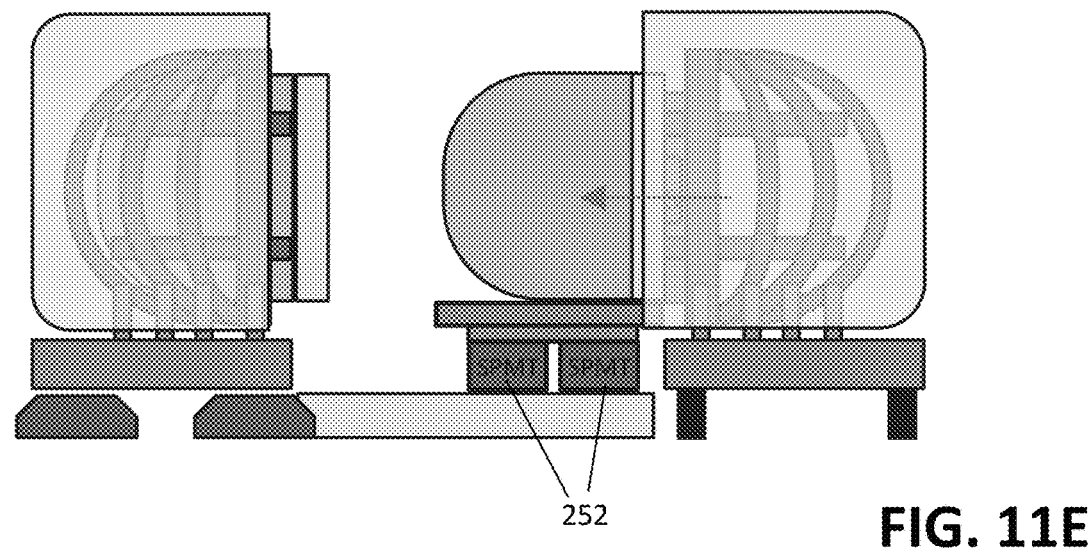
Figure 11F:
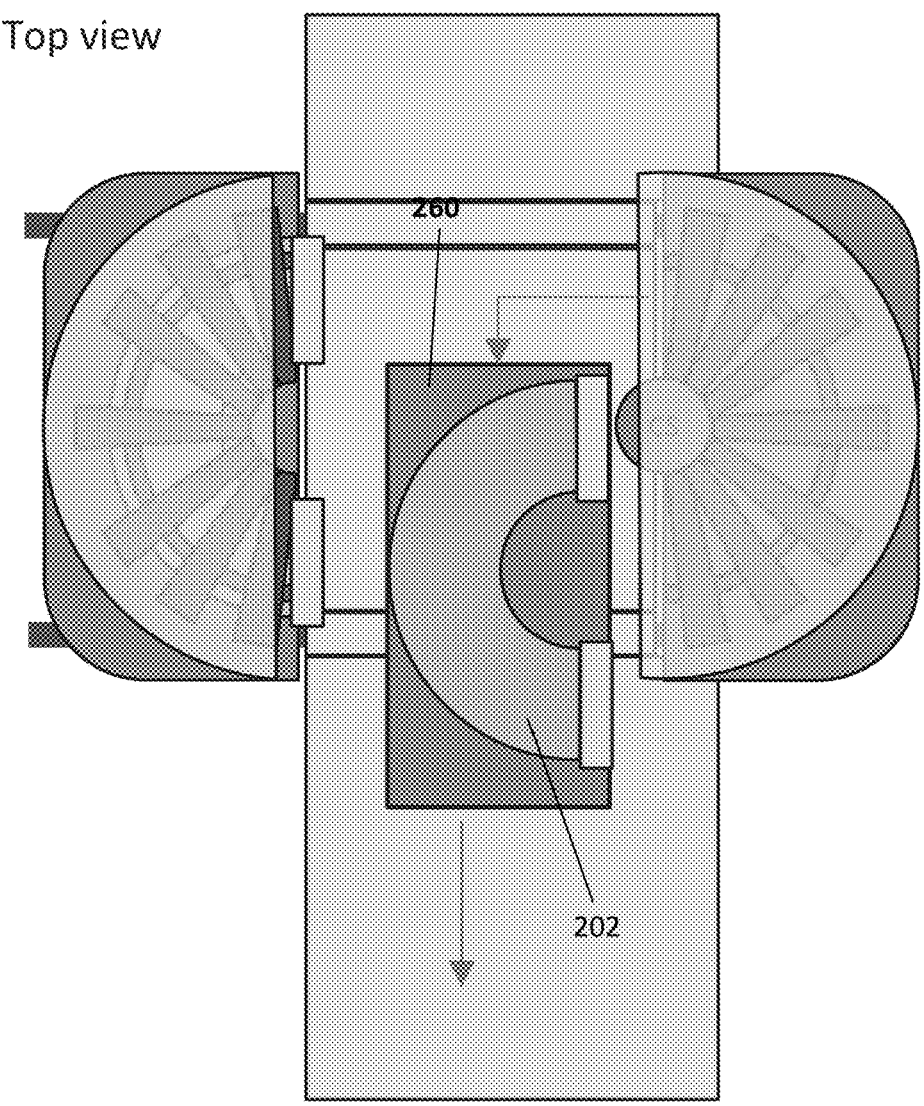
Figure 11F:
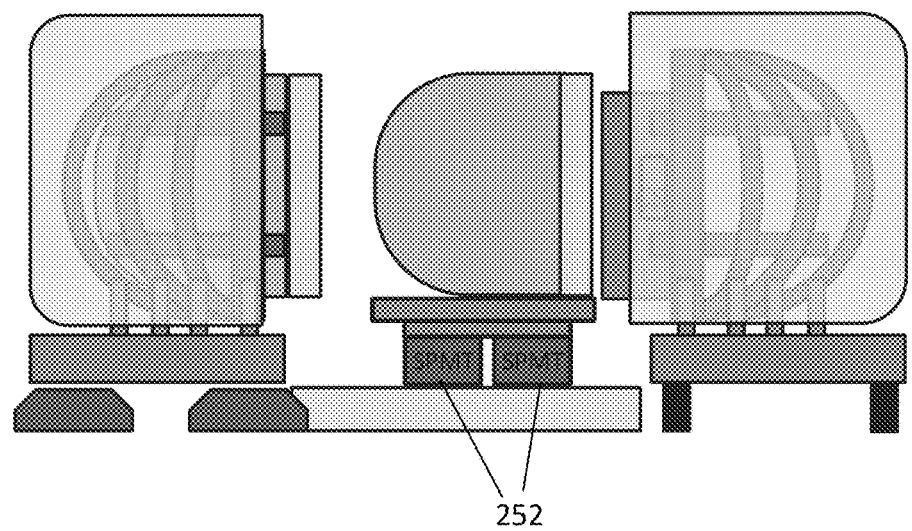

Returning to FIG. 11B, the transport robot 260 may be configured and operated as described above to remove a portion of a vacuum vessel (or portion of a combination vacuum vessel and blanket tank) from the tokamak. Stages in this process are shown in FIGS. 11C-11D for the separate blanket tank and vacuum vessel configuration, and in FIGS. 11E-11F for the combination blanket tank and vacuum vessel configuration. As shown in FIG. 11C, for instance, the portion of the vacuum vessel 201 is moved onto the transport robot 260. Following completion of this motion, the one or more SPMTs 252 are driven away from the tokamak, as shown in FIG. 11D. Similarly, as shown in FIG. 11E, the portion of the blanket tank 202 (and vacuum vessel 201 within it) is moved onto the transport robot 260. Following completion of this motion, the one or more SPMTs 252 are driven away from the tokamak, as shown in FIG. 11F.

The process depicted in FIGS. 11B-11D (or FIGS. 11C and 11E-11F in the case of the combination blanket tank and vacuum vessel configuration) may be performed twice to remove the vacuum vessel from both sides of the tokamak.

Subsequently, the process depicted in FIGS. 11B-11D (or FIGS. 11B and 11E-11F in the case of the combination blanket tank and vacuum vessel configuration) may be repeated in reverse to install portions of a new vacuum vessel (or new combination vacuum vessel and blanket tank). In particular, the transport robot 260 may be driven to one side of the tokamak (e.g., after picking up the new vacuum vessel from a staging area) and the new vacuum vessel portion may be aligned with the tokamak portion to prepare for its insertion. In some embodiments, this alignment process may comprise operating the SPMTs 252 to move and/or rotate the transport robot 260. Alignment may be detected based on sensor data produced by one or more sensors (which may include imaging devices). In some embodiments, the alignment process may comprise moving the transport robot so that one or more alignment features on the transport robot 260 and/or on the vacuum vessel mate with complementary features on the tokamak, thereby producing and/or allowing detection of a desired alignment.

Subsequently, the new portion of the vacuum vessel may be rotated into the tokamak using the same process described above for removal (e.g., actuating the transport robot to rotate the semi-annular plate holding the vacuum vessel). Supports to hold the vacuum vessel may then be engaged within the tokamak, either actively by actuating one or more supports, or passively, by engaging the supports through gradually lowering the vacuum vessel onto the supports). It may be noted that the skid-jacks supporting one side of the tokamak may remain engaged and supporting the side of the tokamak during the above-described processes of removing the vacuum vessel and inserted a replacement vacuum vessel.

Having described an illustrative process of removing and replacing a vacuum vessel of a tokamak, FIGS. 15A-15D relate to acts of rejoining portions of a tokamak.

According to some embodiments, prior to rejoining the portions of the tokamak, any covers placed over the tracks 240 and 241 may be removed (e.g., by a remotely operable manipulator vehicle).

Figure 15A:
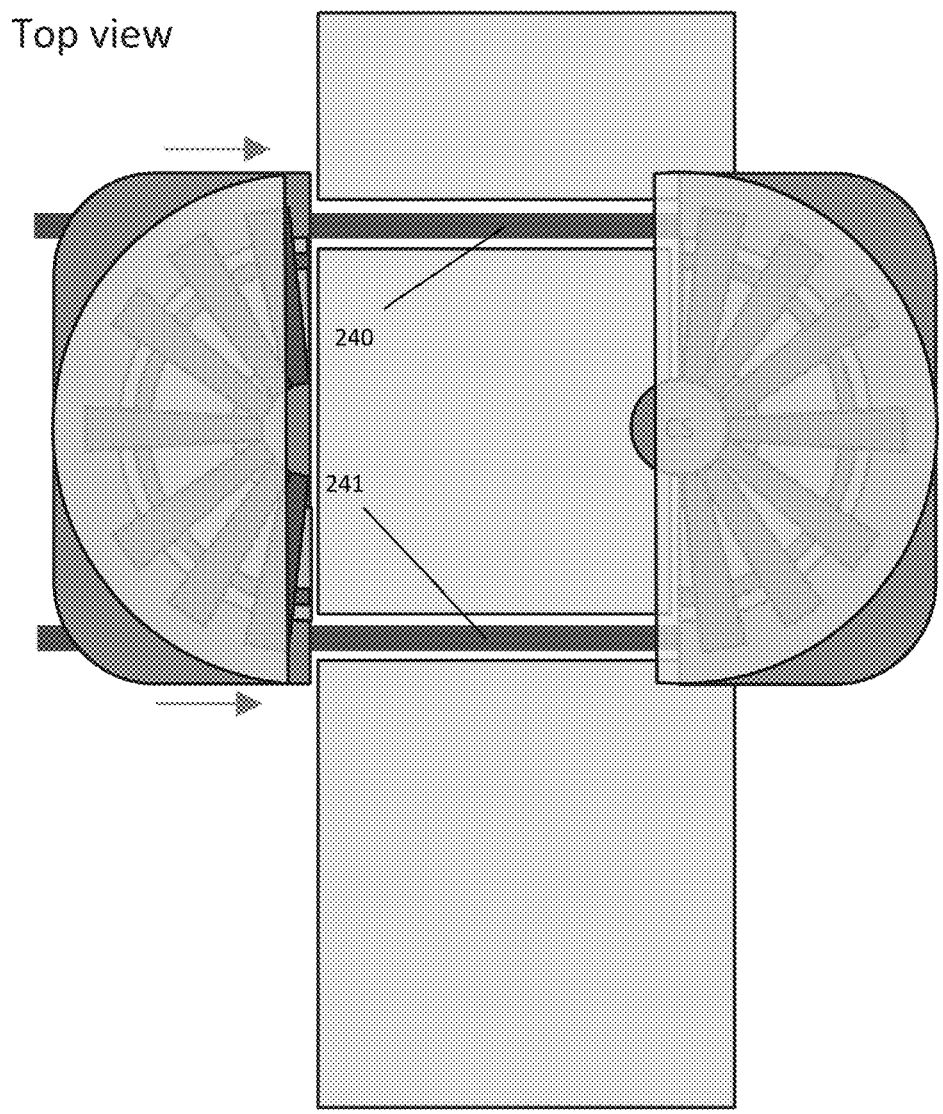
FIGS. 15A-15D depict illustrative acts of rejoining portions of a tokamak, according to some embodiments.
Figure 15A:
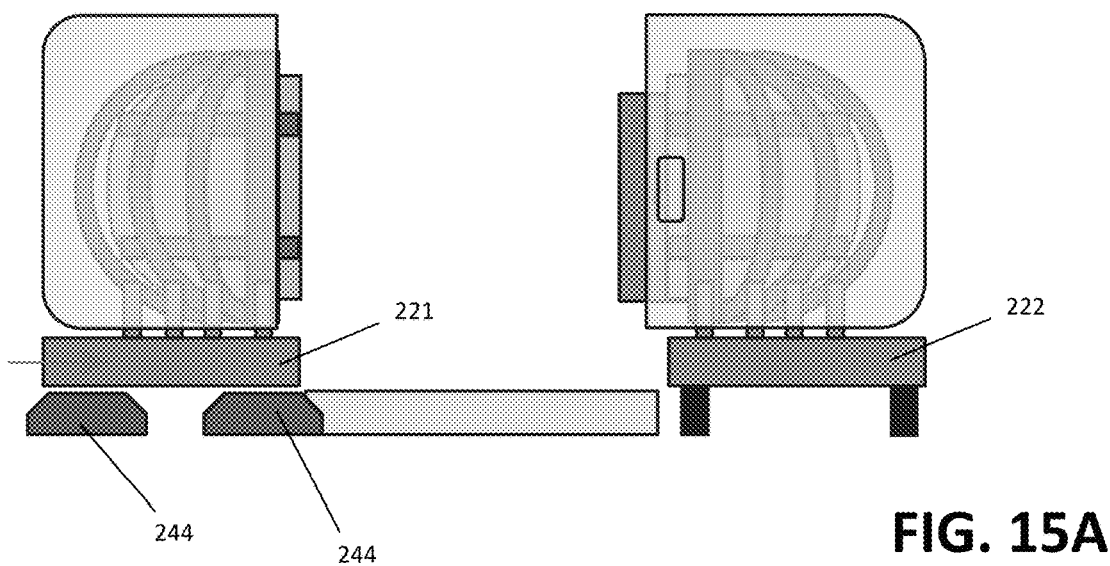
Figure 15B:
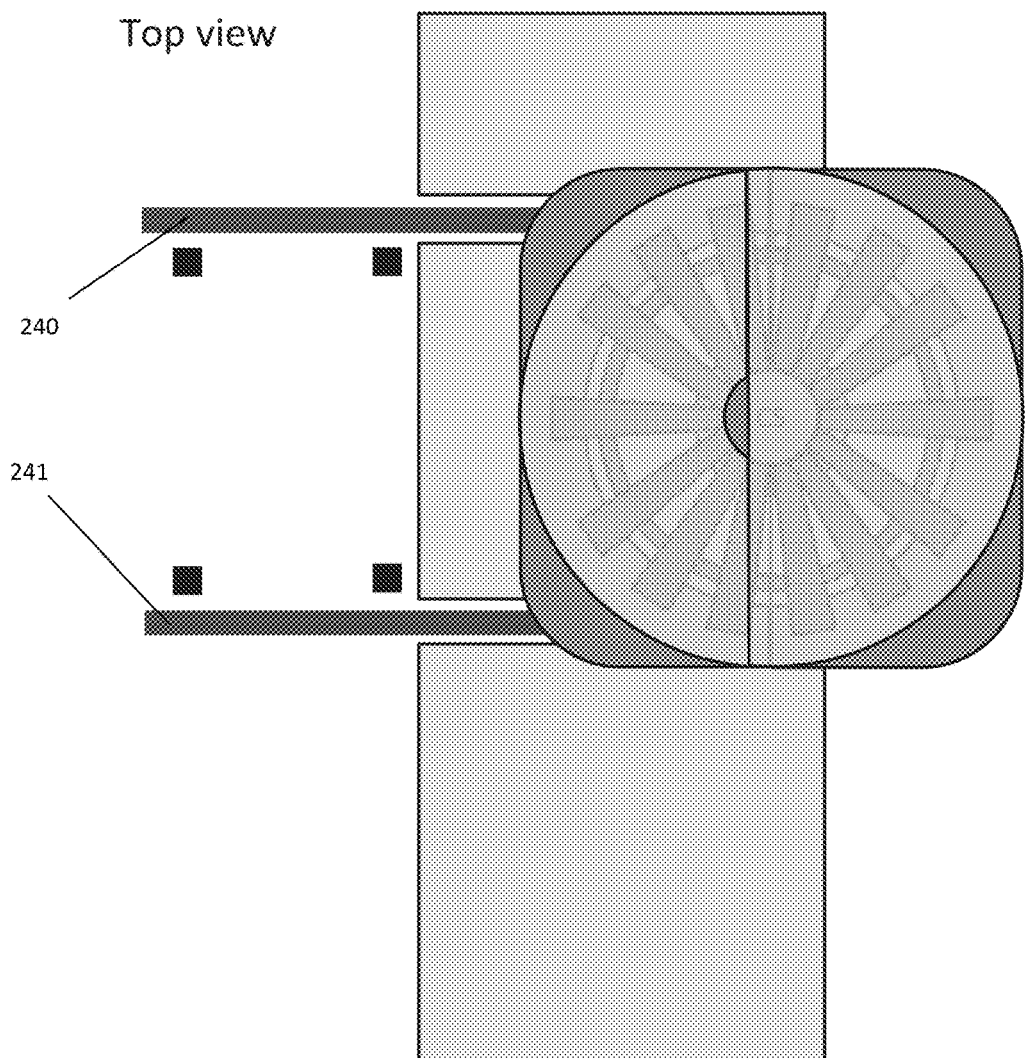
Figure 15B:
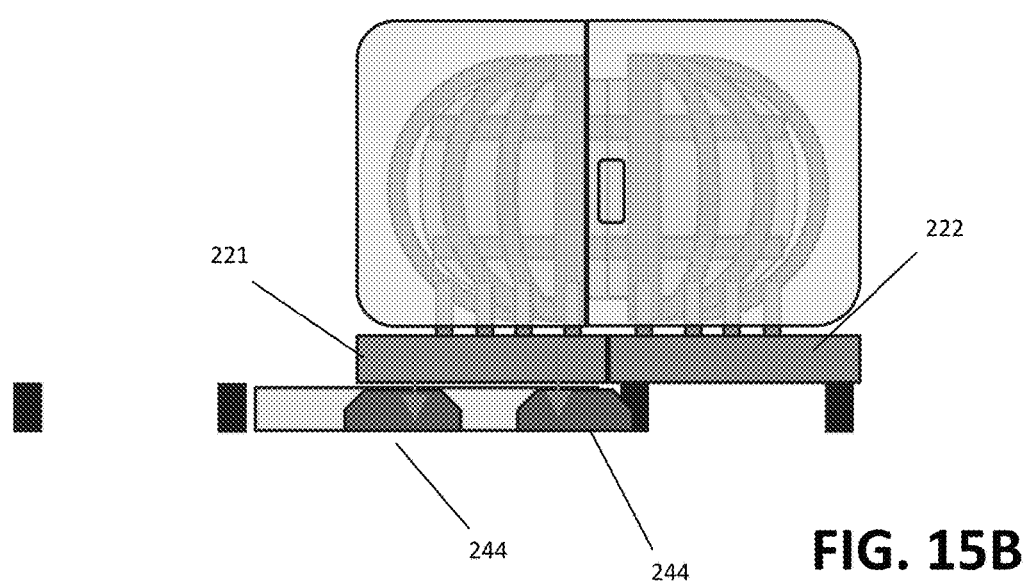

FIGS. 15A-15B depict the skid-jacks 243 and 244 being operated to move along the tracks 240 and 241 to thereby move the two halves of the tokamak together. In some embodiments, the tokamak hall may comprise one or more sensors (e.g., cameras, lidar surveyors, load sensors) and confirmation that the tokamak half supported by the skid-jacks has been moved into the desired location next to the other tokamak half may be confirmed based on sensor data received from one or more such sensors. In reverse of the process described in relation to FIG. 7E, the skid-jacks 243 and 244 may be operated to lower the platform 221 (e.g., by retracting pistons 244*b* on both skid-jacks in a synchronized manner). In some cases, the platform 221 may be lowered by a distance of a few centimeters. Subsequently, the skid-jacks may be maneuvered away from the platform 221. In some cases, the tracks 240 and 241 may extend out of the tokamak hall into another room (e.g., an antechamber) with a shielded door between the tokamak hall and the other room. In such cases, after the skid-jacks have been operated to move out of the tokamak hall into the other room, a door between that room and the tokamak hall may be closed. Personnel may then enter the room and remove the skid-jacks from the tracks while the door is closed, thereby providing radiation safety to the personnel. Alternatively, the skid-jacks can be operated to move into the tokamak hall and removed from the tracks using a suitable automated or remotely controllable device.

Figure 15C:
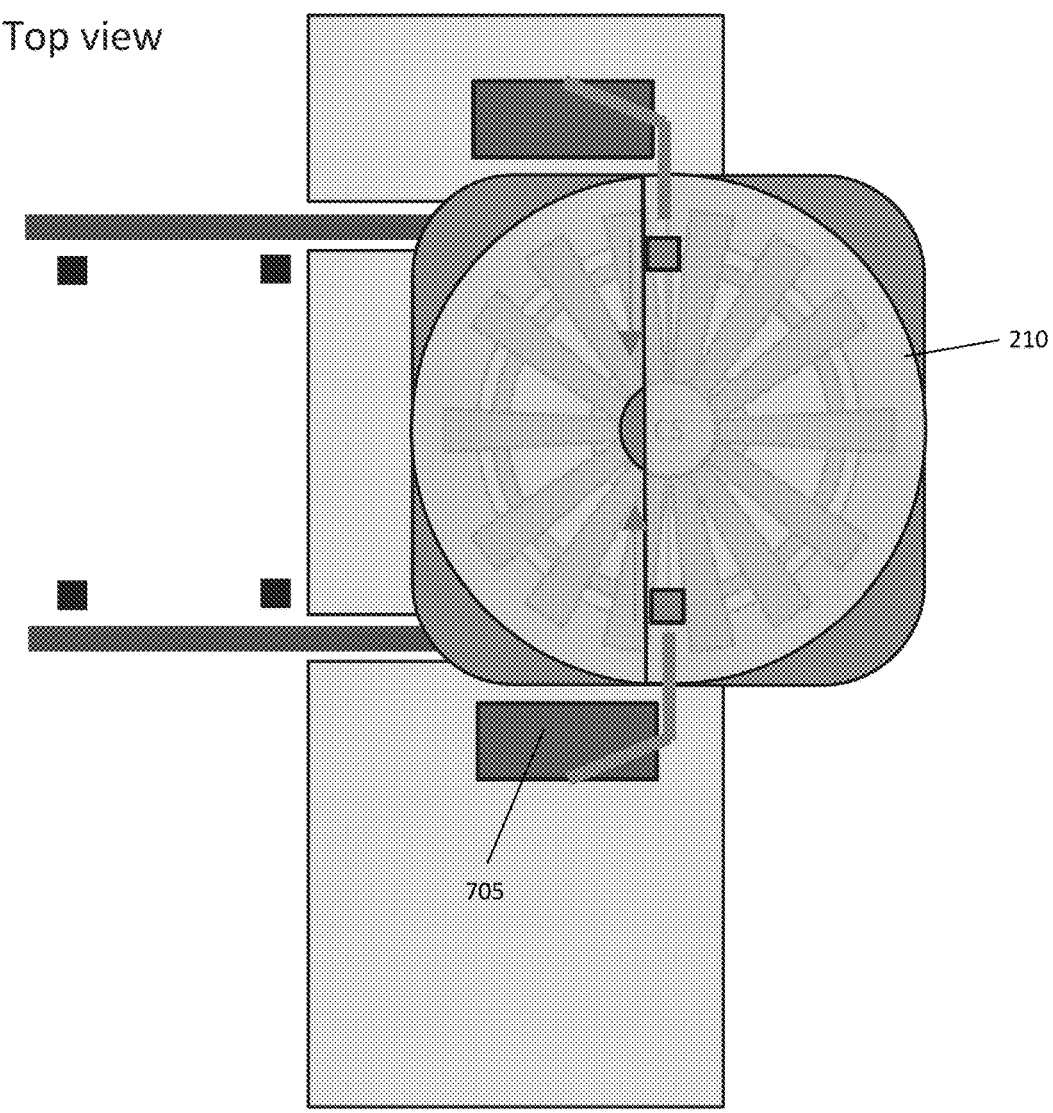
Figure 15C:
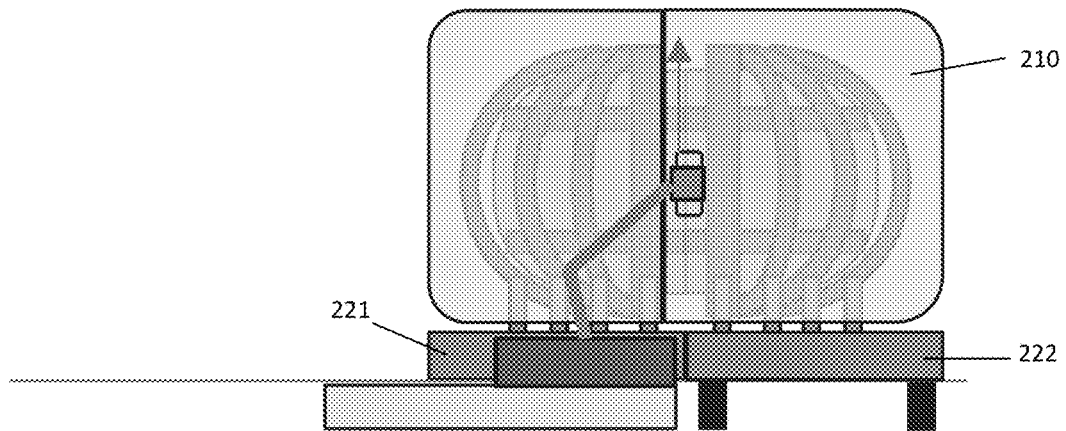

FIG. 15C depicts robots 705 (each of which may be the same or a different robot used to split the tokamak as described in relation to FIGS. 7A-7C) that may be operated to perform one or more operations to join (or rejoin) components of the tokamak. During this process, alignment of one or more components within the tokamak (e.g., vacuum vessel portions, blanket tank portions, etc.) may be performed. In some embodiments, such alignment may comprise actuating one or more struts on which the one or more components are arranged to produce a desired position and/or rotation of the component(s).

According to some embodiments, the robots 705 may be operated to couple structures that couple the toroidal field coils on one side of the tokamak to toroidal field coils on the other side of the tokamak, thereby mechanically joining the toroidal field coils into a single group. According to some embodiments, this act may comprise utilizing a robot arm (e.g., an arm of robot 705) to insert a robotic shuttle through the cryostat and onto a toroidal field coil joint. The shuttle may be operated to traverse the joint poloidally, tightening fasteners along the path. In the example of FIG. 15C, two robots may be arranged to each insert a separate robotic shuttle onto separate toroidal field coils.

As described above, the tokamak may comprise one or more poloidal field magnets that comprise one or more joints at which the poloidal field magnet may be demounted and remounted, thereby allowing the poloidal field magnets to be split and rejoined without significantly comprising the electrical characteristics of the poloidal field magnets. According to some embodiments, the robots 705 may be operated to join and/or lock poloidal field joints on the poloidal field magnets (e.g., the joints described above in relation to FIGS. 6A-6E).

According to some embodiments, in the case of the "separate" blanket tank and vacuum vessel configuration shown in FIG. 4A, the robots 705, each having a remotely maneuverable arm, are controlled to join (e.g., weld) the two portions of the vacuum vessel into a single vacuum vessel, and to weld the two portions of the blanket tank into a single blanket tank. Each of robots 705 may join one seam of the vacuum vessel and one seam of the blanket tank. This act may comprise joining (e.g., welding) the two portions of the blanket tank together along each of the two seams. In some embodiments, the blanket tank may comprise a pair of rails located on either side of the seam for welding, and the arm of a robot 705 may place a welding shuttle (which may for instance be a combination cutting/welding shuttle that was previously used to cut the blanket tank) onto the rails. The welding shuttle may then be operated to weld the blanket tank while traversing along the rails, poloidally around the exterior of the blanket tank. The robots 705, whether prior to or after joining the two portions of the blanket tank, may be operated to perform joining (e.g., welding) of the two portions of the vacuum vessel together along each of the two seams. In some embodiments, the vacuum vessel may comprise a pair of rails located on either side of the seam for welding, and the arm of a robot 705 may place a welding shuttle (which may for instance be a combination cutting/welding shuttle that was previously used to cut the vacuum vessel) onto the rails. The welding shuttle may then be operated to weld the vacuum vessel while traversing along the rails, poloidally around the exterior of the vacuum vessel. As with the cutting process described in relation to FIGS. 9A and 9B, welding of the vacuum vessel may be performed from either within the interior or exterior of the vacuum vessel. It may be appreciated that any descriptions above relating to cutting of the vacuum vessel using a cutting shuttle also apply to welding the vacuum vessel with a welding shuttle.

In the case of the "combination" blanket tank and vacuum vessel configuration shown in FIG. 4B, joining the two portions of the vacuum vessel into a single vacuum vessel comprises attaching fasteners to join the blanket tank and vacuum vessel portions together. For instance, in this case, the robots 705 may each deploy a nut-driving shuttle as described above in relation to FIG. 4C, which may be operated to join the two portions of the combination blanket tank and vacuum vessel by traversing the seam between the two portions and threading nuts on captive studs as it travels poloidally around the seam.

Figure 15D:
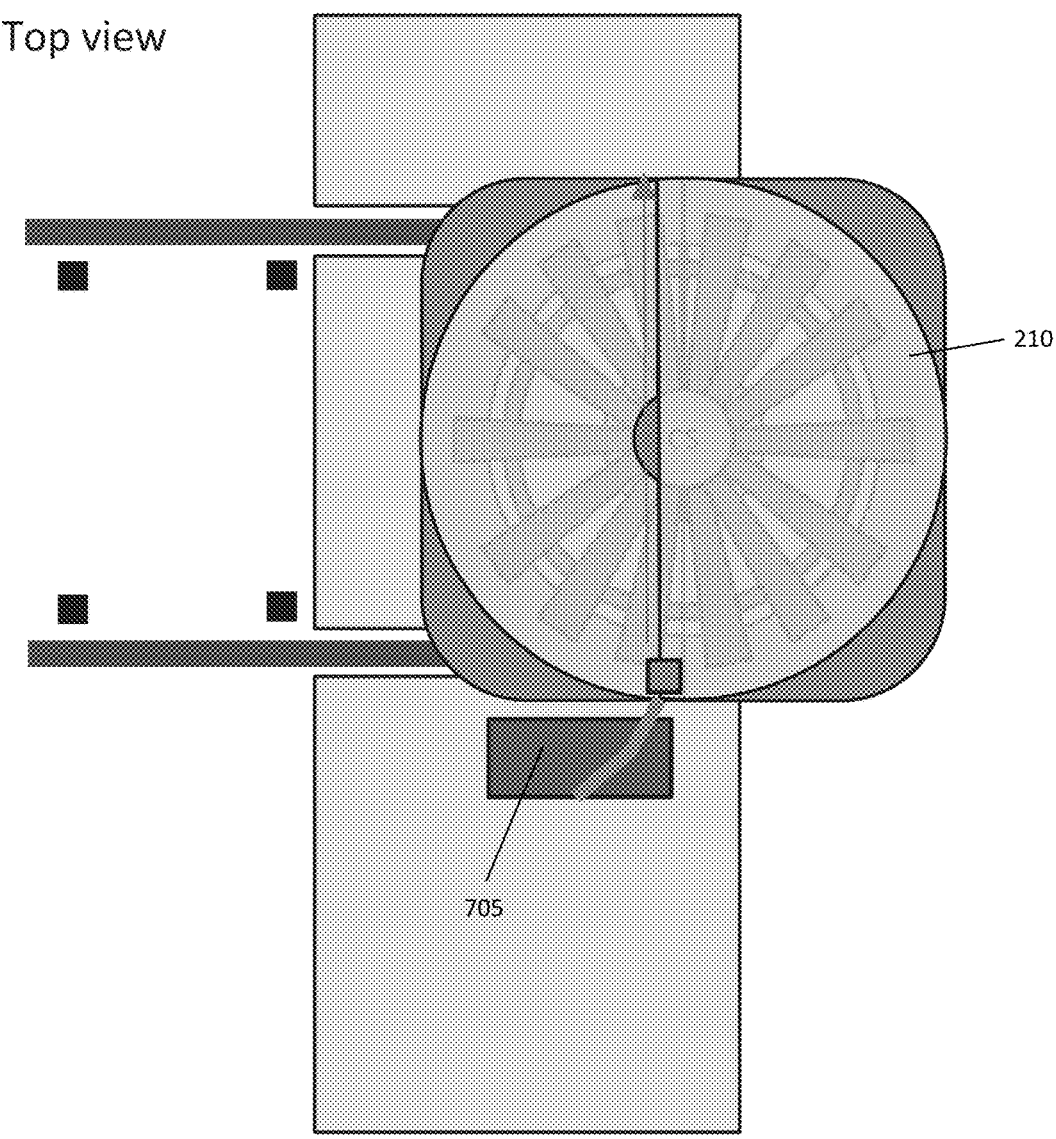
Figure 15D:
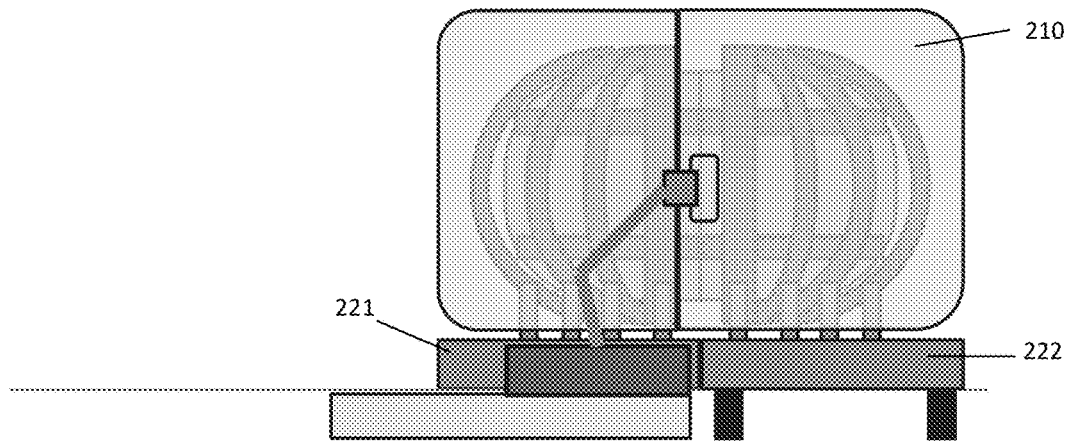

As shown in FIG. 15D, robot 705 may be operated to join together the two halves of the cryostat 210. The robot 705 may for instance comprise a robotic arm and a welding tool coupled to the robotic arm. In some cases, the robotic arm may comprise a combination cutting and cutting tool, wherein the cutter was previously used to cut the cryostat earlier in the maintenance process (e.g., in the process described in relation to FIG. 7A).

According to some embodiments, the cryostat 210 may comprise a track along (or proximate to) the meridional axis of the tokamak (or cryostat) to which a welding robot may be attached and traverse. For instance, the robot 705 may place a welding robot on the track by manipulating a robotic arm. The track may, for example, include one or more rails along which the welding robot can be driven. In some embodiments, the welding robot may include one or more cameras that produce sensor data (e.g., image data) indicative of whether welding of the cryostat has been performed correctly, and which can be analyzed to determine a quality of a weld.

FIG. 16 depicts an illustrative tokamak system suitable for practicing aspects of the invention described herein, according to some embodiments. System 1600 comprises a tokamak 1601 arranged within a tokamak hall 1602. The tokamak 1601 is arranged over tracks 240 and 241, on which jack-skids 243 and 244 are arranged. The skid-jacks 243 and 244, when operated, can travel along the tracks 240 and 241, and may exit the tokamak hall when the door 1604 is open, as described above. System 1600 comprises other components described above, including one or more of each of robot 705, mobile robot 251, transport robot 260 and SPMTs 252.

One or more controllers 1610 are arranged outside of the tokamak hall and configured to control any operations of the components of system 1600 in any of the ways described above. The dashed lines in FIG. 16 represent any suitable combination of wired and/or wireless communication between the controller(s) 1610 and the other components of system 1600, via which commands, sensor data and/or any other suitable data may be transmitted to cause or effect the above-described maintenance operations. It may be appreciated that in some instances one or more of the components of system 1600 other than the controller(s) 1610 may themselves include one or more controllers, and that controller(s) 1610 are provided to indicate that at least some control of the components of the system occurs outside of the tokamak hall, and such control is not limited to only occurring outside of the tokamak hall. For example, the controller(s) 1610 may be configured to: operate the skid-jacks 243 and 244 to move along the tracks 240 and 241; to operate the door 1604 to open and close to allow the skid-jacks 1614 to exit or enter the tokamak hall; to control the robot 705 to place a cutting and/or welding shuttle on the cryostat, vacuum vessel and/or blanket tank of the tokamak 1601; to control the mobile robot 251 to cap portions of the vacuum vessel (or combination blanket tank and vacuum vessel); control the transport robot 260 to remove a portion of a vacuum vessel from the tokamak or insert a portion of a replacement vacuum vessel into the tokamak; and/or to control the SPMTs 252 to drive any of the transport robot 260, mobile robot 251 and/or robot 705 to a desired location relative to the tokamak 1601 or a portion thereof.

System 1600 also comprises sensors 1620, which may include, but are not limited to, one or more optical sensors (e.g., cameras, infra-red cameras, ultraviolet cameras, optical displacement sensors), radiation sensors (e.g., Geiger counters, tritium sensors), force sensors (e.g., load sensors, tension sensors), position sensors (e.g., limit switch, beam-break, lidar), or combinations thereof. Monitoring of any of the above-described processes may be performed using such sensors, including confirming that a step in the maintenance process has completed successfully before proceeding with a subsequent step. Examples of such monitoring are described above, but monitoring operations should not be considered to be limited to those particular examples.

The controller(s) 1610 can be implemented in any of numerous ways. For example, the controller(s) may be implemented using hardware, software, or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semi-custom circuitry resulting from configuring a programmable logic device (such as an FPGA). As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Various aspects of the present invention may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Embodiment 1: A method of removing a portion of a vacuum vessel from a portion of a tokamak, the method comprising operating a device to move alongside the portion of the tokamak, the device comprising a semi-annular plate comprising a rack, a plurality of jacks arranged over the semi-annular plate, and at least one mechanism configured to rotate the semi-annular plate in a circle, operating the at least one mechanism to rotate the semi-annular plate beneath the portion of the vacuum vessel within the portion of the tokamak, raising the plurality of jacks of the device to support the weight of the portion of the vacuum vessel, and operating the at least one mechanism to rotate the semi-annular plate out of the portion of the tokamak, thereby removing the portion of the vacuum vessel from the portion of the tokamak.

Embodiment 2: The method of Embodiment 1, wherein the semi-annular plate is arranged over a plurality of rollers.

Embodiment 3: The method of any of Embodiments 1-2, wherein the semi-annular plate is arranged over a Polytetrafluoroethylene (PTFE) surface.

Embodiment 4: The method of any of Embodiments 1-3, wherein the portion of the tokamak is arranged on a platform, and wherein the method further comprises, prior to operating the at least one mechanism to rotate the semi-annular plate out of the portion of the tokamak: operating one or more skidding systems to move beneath the platform supporting the portion of the tokamak, operating one or more jacks of the one or more skidding systems to raise and support the platform.

Embodiment 5: The method of any of Embodiments 1-4, wherein one or more skidding systems include one or more self propelled modular transporters (SPMTs).

Embodiment 6: The method of any of Embodiments 1-5, further comprising, subsequent to operating the one or more jacks of the one or more skidding systems to raise and support the platform, operating the skidding system to move the portion of the tokamak a sufficient amount for the device to be moved alongside the portion of the tokamak.

Embodiment 7: The method of any of Embodiments 1-6, wherein the semi-annular plate of the device comprises a rack, and wherein the at least one mechanism configured to rotate the semi-annular plate in a circle comprises at least one actuatable pinion gear engaged with the rack on the plate.

Embodiment 8: The method of any of Embodiments 1-7, wherein the semi-annular plate of the device comprises a rack, and wherein the at least one mechanism configured to rotate the semi-annular plate in a circle comprises at least one actuatable dog that may be engaged with the rack on the plate.

Embodiment 9: The method of any of Embodiments 1-8, further comprising disengaging a plurality of supports that support the weight of the portion of the vacuum vessel subsequent to raising the plurality of jacks of the device to support the weight of the portion of the vacuum vessel.

Embodiment 10: The method of any of Embodiments 1-9, wherein operating the at least one mechanism to rotate the semi-annular plate beneath the portion of the vacuum vessel within the portion of the tokamak comprises moving the semi-annular plate between the portion of the vacuum vessel and a track.

Embodiment 11: The method of any of Embodiments 1-10, wherein the track is part of, or otherwise coupled to, a blanket tank arranged within the portion of the tokamak.

Embodiment 12: The method of any of Embodiments 1-11, wherein the track is part of, or otherwise coupled to, a toroidal field coil arranged within the portion of the tokamak.

Embodiment 13: The method of any of Embodiments 1-12, wherein the portion of the tokamak comprises a portion of a combination blanket tank and vacuum vessel that comprises the portion of the vacuum vessel as a first interior volume and a portion of a blanket tank as a second interior volume.

Embodiment 14: The method of any of Embodiments 1-13, wherein operating the at least one mechanism to rotate the semi-annular plate beneath the portion of the vacuum vessel comprises operating the at least one mechanism to rotate the semi-annular plate beneath the portion of the combination blanket tank and vacuum vessel.

Embodiment 15: The method of any of Embodiments 1-14, wherein removing the portion of the vacuum vessel from the portion of the tokamak comprises removing the portion of the combination blanket tank and vacuum vessel from the portion of the tokamak.

Embodiment 16: The method of any of Embodiments 1-15, further comprising operating the device to move away from the portion of the tokamak while carrying the portion of the vacuum vessel.

Embodiment 17: The method of any of Embodiments 1-16, wherein the portion of the tokamak comprises a plurality of toroidal field magnets.

Embodiment 18: A device for removing a portion of a vacuum vessel from a tokamak, the device comprising one or more self-propelled modular transporters (SPMTs), a semi-annular plate comprising a rack, a plurality of jacks arranged over the semi-annular plate and configured to be actuated to raise a load on the device, and at least one actuatable pinion gear engaged with the rack on the semi-annular plate, wherein actuating the at least one actuatable pinion gear causes the semi-annular plate to rotate in a circle about its radial center, extending the semi-annular plate over the side of the device.

Embodiment 19: The device of Embodiment 18, further comprising a plurality of rollers arranged over the one or more SPMTs, and wherein the semi-annular plate is arranged over the plurality of rollers.

Embodiment 20: The device of any of Embodiments 18-19, further comprising a Polytetrafluoroethylene (PTFE) surface, and wherein the semi-annular plate is arranged over the PTFE surface.

Embodiment 21: The device of any of Embodiments 18-20, further comprising at least one arcuate side wall adjacent to the semi-annular plate that limits radial motion of the semi-annular plate during its motion.

Embodiment 22: The device of any of Embodiments 18-21, wherein at least one of an inner side and an outer side of the semi-annular plate comprises a low-friction bumper.

Embodiment 23: The device of any of Embodiments 18-22, further comprising one or more cameras configured to capture images of the semi-annular plate when rotated over the side of the device and arranged beneath a portion of a vacuum vessel of a tokamak.

Embodiment 24: The device of any of Embodiments 18-23, further comprising one or more mechanical alignment features configured to mate with one or more mechanical features on a tokamak.

Embodiment 25: The device of any of Embodiments 18-24, wherein the at least one actuatable pinion gear may be actuated to cause the semi-annular plate to extend fully over the side of the device, such that the semi-annular plate is no longer over the plurality of rollers.

Some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of removing a portion of a vacuum vessel from a portion of a tokamak, the method comprising:
    operating a device to move alongside the portion of the tokamak, the device comprising:
        a semi-annular plate comprising a rack;
        a plurality of jacks arranged over the semi-annular plate; and
        at least one mechanism configured to rotate the semi-annular plate in a circle;
    operating the at least one mechanism to rotate the semi-annular plate beneath the portion of the vacuum vessel within the portion of the tokamak;
    raising the plurality of jacks of the device to support the weight of the portion of the vacuum vessel; and
    operating the at least one mechanism to rotate the semi-annular plate out of the portion of the tokamak, thereby removing the portion of the vacuum vessel from the portion of the tokamak.

2. The method of claim 1, wherein the semi-annular plate is arranged over a plurality of rollers.

3. The method of claim 1, wherein the semi-annular plate is arranged over a Polytetrafluoroethylene (PTFE) surface.

4. The method of claim 1, wherein the portion of the tokamak is arranged on a platform, and wherein the method further comprises, prior to operating the at least one mechanism to rotate the semi-annular plate out of the portion of the tokamak:
    operating one or more skidding systems to move beneath the platform supporting the portion of the tokamak;
    operating one or more second jacks of the one or more skidding systems to raise and support the platform.

5. The method of claim 4, wherein one or more skidding systems include one or more self propelled modular transporters (SPMTs).

6. The method of claim 4, further comprising, subsequent to operating the one or more jacks of the one or more skidding systems to raise and support the platform, operating the skidding system to move the portion of the tokamak a sufficient amount for the device to be moved alongside the portion of the tokamak.

7. The method of claim 1, wherein the semi-annular plate of the device comprises a rack, and wherein the at least one mechanism configured to rotate the semi-annular plate in a circle comprises at least one actuatable pinion gear engaged with the rack on the plate.

8. The method of claim 1, wherein the semi-annular plate of the device comprises a rack, and wherein the at least one mechanism configured to rotate the semi-annular plate in a circle comprises at least one actuatable dog that may be engaged with the rack on the plate.

9. The method of claim 1, further comprising disengaging a plurality of supports that support the weight of the portion of the vacuum vessel subsequent to raising the plurality of jacks of the device to support the weight of the portion of the vacuum vessel.

10. The method of claim 1, wherein operating the at least one mechanism to rotate the semi-annular plate beneath the portion of the vacuum vessel within the portion of the tokamak comprises moving the semi-annular plate between the portion of the vacuum vessel and a track.

11. The method of claim 10, wherein the track is part of, or otherwise coupled to, a blanket tank arranged within the portion of the tokamak.

12. The method of claim 10, wherein the track is part of, or otherwise coupled to, a toroidal field coil arranged within the portion of the tokamak.

13. The method of claim 1, wherein the portion of the tokamak comprises a portion of a combination blanket tank and vacuum vessel that comprises the portion of the vacuum vessel as a first interior volume and a portion of a blanket tank as a second interior volume.

14. The method of claim 13, wherein operating the at least one mechanism to rotate the semi-annular plate beneath the portion of the vacuum vessel comprises operating the at least one mechanism to rotate the semi-annular plate beneath the portion of the combination blanket tank and vacuum vessel.

15. The method of claim 13, wherein removing the portion of the vacuum vessel from the portion of the tokamak comprises removing the portion of the combination blanket tank and vacuum vessel from the portion of the tokamak.

16. The method of claim 1, further comprising operating the device to move away from the portion of the tokamak while carrying the portion of the vacuum vessel.

17. The method of claim 1, wherein the portion of the tokamak comprises a plurality of toroidal field magnets.

18. A device for removing a portion of a vacuum vessel from a tokamak, the device comprising:
    one or more self-propelled modular transporters (SPMTs);
    a semi-annular plate comprising a rack;
    a plurality of jacks arranged over the semi-annular plate and configured to be actuated to raise a load on the device; and
    at least one actuatable pinion gear engaged with the rack on the semi-annular plate,
    wherein actuating the at least one actuatable pinion gear causes the semi-annular plate to rotate in a circle about a radial center of the semi-annular plate, extending the semi-annular plate over a side of the device.

19. The device of claim 18, further comprising a plurality of rollers arranged over the one or more SPMTs, and wherein the semi-annular plate is arranged over the plurality of rollers.

20. The device of claim 19, wherein the at least one actuatable pinion gear may be actuated to cause the semi-annular plate to extend fully over the side of the device, such that the semi-annular plate is no longer over the plurality of rollers.

21. The device of claim 18, further comprising a Polytetrafluoroethylene (PTFE) surface, and wherein the semi-annular plate is arranged over the PTFE surface.

22. The device of claim 18, further comprising at least one arcuate side wall adjacent to the semi-annular plate that limits radial motion of the semi-annular plate during motion of the semi-annular plate.

23. The device of claim 18, wherein at least one of an inner side and an outer side of the semi-annular plate comprises a low-friction bumper.

24. The device of claim 18, further comprising one or more cameras configured to capture images of the semi-annular plate when rotated over the side of the device and arranged beneath a portion of a vacuum vessel of a tokamak.

25. The device of claim 18, further comprising one or more mechanical alignment features configured to mate with one or more mechanical features on a tokamak.

* * * * *